(12) United States Patent
Tang et al.

(10) Patent No.: US 12,510,739 B2
(45) Date of Patent: Dec. 30, 2025

(54) FOLDED OPTICAL SYSTEM, IMAGE CAPTURING UNIT AND ELECTRONIC DEVICE

(71) Applicant: LARGAN PRECISION CO., LTD., Taichung (TW)

(72) Inventors: Hsiang-Chi Tang, Taichung (TW); I-Hsuan Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 622 days.

(21) Appl. No.: 17/948,143

(22) Filed: Sep. 19, 2022

(65) Prior Publication Data
US 2024/0053588 A1 Feb. 15, 2024

(30) Foreign Application Priority Data
Aug. 9, 2022 (TW) .................. 111129874

(51) Int. Cl.
*G02B 13/00* (2006.01)
*G02B 9/14* (2006.01)
*H04N 23/55* (2023.01)

(52) U.S. Cl.
CPC .......... *G02B 13/0065* (2013.01); *G02B 9/14* (2013.01); *G02B 13/0035* (2013.01); *H04N 23/55* (2023.01)

(58) Field of Classification Search
CPC .............. G02B 13/004; G02B 13/0065; G02B 13/0035
See application file for complete search history.

(56) References Cited

U.S. PATENT DOCUMENTS

| 5,822,127 A | 10/1998 | Chen et al. |
| 6,396,639 B1 | 5/2002 | Togino et al. |
(Continued)

FOREIGN PATENT DOCUMENTS

| CN | 1171110 C | 10/2004 |
| CN | 204405926 U | 6/2015 |
(Continued)

OTHER PUBLICATIONS

TW Office Action dated Mar. 5, 2025 as received in Application No. 113122664.
(Continued)

*Primary Examiner* — Ephrem Z Mebrahtu
(74) *Attorney, Agent, or Firm* — Maschoff Brennan

(57) ABSTRACT

A folded optical system includes an optical folding assembly and lens elements. The optical folding assembly has a first transmissive surface, a first reflective surface, a second reflective surface substantially the same interface as the first transmissive surface, a third reflective surface and a second transmissive surface sequentially along an optical path. The optical path reaches the first reflective surface via the first transmissive surface along a first optical axis to be sequentially redirected to a second optical axis, a third optical axis, and a fourth optical axis respectively by the first reflective surface, the second reflective surface, and the third reflective surface and reaches an image surface via the second transmissive surface. The lens elements at least include a first lens element located on the first optical axis. The first lens element with positive refractive power has a light incident surface being convex in a paraxial region thereof.

25 Claims, 28 Drawing Sheets

(56) References Cited

U.S. PATENT DOCUMENTS

| | | |
|---|---|---|
| 6,462,881 B2 | 10/2002 | Takeyama |
| 6,876,390 B1 | 4/2005 | Nagata |
| 7,352,521 B2 | 4/2008 | Matsunaga |
| 7,791,822 B2 | 9/2010 | Shimo |
| 8,233,204 B1 | 7/2012 | Robbins et al. |
| 9,345,402 B2 | 5/2016 | Gao |
| 9,435,689 B2 | 9/2016 | Comstock, II et al. |
| 9,977,247 B1 | 5/2018 | Brown et al. |
| 10,416,458 B2 | 9/2019 | Schultz et al. |
| 10,809,506 B2 | 10/2020 | Amano |
| 10,901,221 B2 | 1/2021 | Gao et al. |
| 10,983,317 B2 | 4/2021 | Cheng et al. |
| 10,996,448 B2 | 5/2021 | Amano |
| 11,300,799 B2 | 4/2022 | Lavi et al. |
| 12,192,606 B2 | 1/2025 | Huh et al. |
| 2018/0067290 A1 | 3/2018 | Takahashi |
| 2018/0267271 A1* | 9/2018 | Tseng .................. H04M 1/0264 |
| 2019/0018247 A1 | 1/2019 | Gao et al. |
| 2021/0026128 A1 | 1/2021 | Sitter |
| 2021/0096338 A1 | 4/2021 | Saiga |
| 2021/0232038 A1 | 7/2021 | Kobayashi |
| 2021/0364751 A1 | 11/2021 | Huh et al. |
| 2022/0091373 A1 | 3/2022 | Saiga et al. |
| 2022/0146752 A1 | 5/2022 | Kleindienst et al. |
| 2022/0171168 A1 | 6/2022 | Jung et al. |
| 2022/0311917 A1 | 9/2022 | Yang et al. |
| 2023/0288685 A1 | 9/2023 | Uchida et al. |
| 2024/0019667 A1* | 1/2024 | Chang ................ G02B 13/0065 |
| 2024/0019681 A1 | 1/2024 | Lin et al. |

FOREIGN PATENT DOCUMENTS

| | | |
|---|---|---|
| CN | 114355707 A | 4/2022 |
| CN | 216901122 U | 7/2022 |
| CN | 216901127 U | 7/2022 |
| CN | 115103045 A | 9/2022 |
| TW | 202144852 A | 12/2021 |
| WO | 2010/121227 A1 | 10/2010 |
| WO | 2023134651 A1 | 7/2023 |
| WO | 2023/229150 A1 | 11/2023 |
| WO | 2023/229174 A1 | 11/2023 |
| WO | 2023/245545 A1 | 12/2023 |

OTHER PUBLICATIONS

TW Office Action dated Jul. 10, 2023 as received in Application No. 111129874.

Extended European Search Report dated Aug. 28, 2023 as received in Application No. 22200473.1.

VN Office Action dated May 5, 2025 as received in Application No. 1-2023-04319.

* cited by examiner

FOLDED OPTICAL SYSTEM, IMAGE CAPTURING UNIT AND ELECTRONIC DEVICE

RELATED APPLICATIONS

This application claims priority to Taiwan Application 111129874, filed on Aug. 9, 2022, which is incorporated by reference herein in its entirety.

BACKGROUND

Technical Field

The present disclosure relates to a folded optical system, an image capturing unit and an electronic device, more particularly to a folded optical system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

In recent years, electronic products trend to be light and thin, such that it is difficult for a conventional photographing lens to simultaneously meet the requirements of high-specification and compactness, especially a small lens featuring a large aperture, a telephoto function or the like. However, as the optical zoom requirement becomes stricter (e.g., increasing the optical zoom magnification, etc.), the conventional telephoto lens becomes unable to catch the technology requirements and thus have problems such as an overly long total length, an overly small aperture, insufficient quality and inability in compactness. Therefore, it needs to introduce different optical features or a folded optical axis configuration to overcome the abovementioned problems. Moreover, due to thickness limitation of electronic devices, the lens barrels or several lens elements in some optical lenses will be cut for removing the parts thereof unused in imaging, such that the lens size in a specific direction is reduced. Further, a reflective element can be additionally introduced for achieving a size-reduced device, allowing the lens to have a sufficient optical total track length for featuring a telephoto function with a long focal length.

SUMMARY

According to one aspect of the present disclosure, a folded optical system includes an optical folding assembly and a plurality of lens elements.

The optical folding assembly has a first transmissive surface, a first reflective surface, a second reflective surface, a third reflective surface and a second transmissive surface sequentially along a travelling direction of light on an optical path. The first transmissive surface and the second reflective surface are substantially a same interface. The optical path reaches the first reflective surface via the first transmissive surface along a first optical axis, the optical path along the first optical axis is redirected to a second optical axis by the first reflective surface, the optical path along the second optical axis is redirected to a third optical axis by the second reflective surface, the optical path along the third optical axis is redirected to a fourth optical axis by the third reflective surface, and the optical path reaches an image surface via the second transmissive surface along the fourth optical axis.

Each of the plurality of lens elements has a light incident surface and a light emitting surface sequentially along the travelling direction of light on the optical path. The plurality of lens elements at least include a first lens element. The first lens element is located on the first optical axis, the first lens element has positive refractive power, and the light incident surface of the first lens element is convex in a paraxial region thereof.

According to another aspect of the present disclosure, a folded optical system includes an optical folding assembly and a plurality of lens elements.

The optical folding assembly has a first transmissive surface, a first reflective surface, a second reflective surface, a third reflective surface and a second transmissive surface sequentially along a travelling direction of light on an optical path. The first transmissive surface and the second reflective surface are substantially a same interface. The optical path reaches the first reflective surface via the first transmissive surface along a first optical axis, the optical path along the first optical axis is redirected to a second optical axis by the first reflective surface, the optical path along the second optical axis is redirected to a third optical axis by the second reflective surface, the optical path along the third optical axis is redirected to a fourth optical axis by the third reflective surface, and the optical path reaches an image surface via the second transmissive surface along the fourth optical axis. The first optical axis is substantially parallel to a normal direction of the image surface.

Each of the plurality of lens elements has a light incident surface and a light emitting surface sequentially along the travelling direction of light on the optical path. The plurality of lens elements at least includes a first lens element and a second lens element sequentially along the travelling direction of light on the optical path. The first lens element and the second lens element are located on the first optical axis, the first lens element has positive refractive power, and the second lens element has negative refractive power.

The optical folding assembly is located among the plurality of lens elements, or the optical folding assembly is located between the plurality of lens elements and the image surface along the travelling direction of light on the optical path.

Each of the plurality of lens elements is located on the first optical axis or the fourth optical axis.

When an axial distance along the first optical axis, the second optical axis, the third optical axis and the fourth optical axis between the light incident surface of the first lens element and the image surface is TL, and a focal length of the folded optical system is f, the following condition is satisfied:

$$0.90 < TL/f < 2.00.$$

According to another aspect of the present disclosure, an image capturing unit includes one of the aforementioned folded optical systems and an image sensor, wherein the image sensor is disposed on the image surface of the folded optical system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A folded optical system includes an optical folding assembly and a plurality of lens element and can be applied to an image capturing unit and an electronic device. With the arrangement of the optical folding assembly, it is favorable for flexibly arranging the space of the folded optical system, thereby reducing the size of the folded optical system.

Preferably, the optical folding assembly has a first transmissive surface, a first reflective surface, a second reflective surface, a third reflective surface and a second transmissive surface sequentially along a travelling direction of light on an optical path. Preferably, the optical path reaches the first reflective surface via the first transmissive surface along a first optical axis, the optical path along the first optical axis is redirected to a second optical axis by the first reflective surface, the optical path along the second optical axis is redirected to a third optical axis by the second reflective surface, the optical path along the third optical axis is redirected to a fourth optical axis by the third reflective surface, and the optical path reaches an image surface via the second transmissive surface along the fourth optical axis.

Preferably, the first transmissive surface and the second reflective surface are substantially the same interface. Preferably, the first transmissive surface, the second reflective surface and the second transmissive surface can be substantially the same plane, and a normal direction of the said plane can be substantially parallel to the first optical axis. Therefore, it is favorable for obtaining a proper balance between reduction in the thickness and the manufacturing difficulty of the folded optical system, thereby improving manufacturing yield rate thereof. Preferably, the first optical axis can be substantially parallel to a normal direction of the image surface. Therefore, it is favorable for increasing the stability and reducing the sensitivity of the folded optical system.

Preferably, the optical path is redirected three times by the optical folding assembly, and the angle between each two adjacent optical axes can be varied depending on actual requirements such as space arrangement. Preferably, the first reflective surface and the third reflective surface can be specular or can have a reflection coating, which can be used for redirecting the optical path by specular reflection. As for the second reflective surface, the principle of total reflection can be used for redirecting the optical path. Preferably, each of the reflective surfaces and the transmissive surfaces of the optical folding assembly can be a flat surface, a spherical surface, an aspheric surface, an axisymmetric freeform surface or a non-axisymmetric freeform surface. In this specification, a Q2D freeform asphere, which may be simplified to "Q2D" hereinafter, can be a type of the non-axisymmetric freeform surface.

Figure 25:
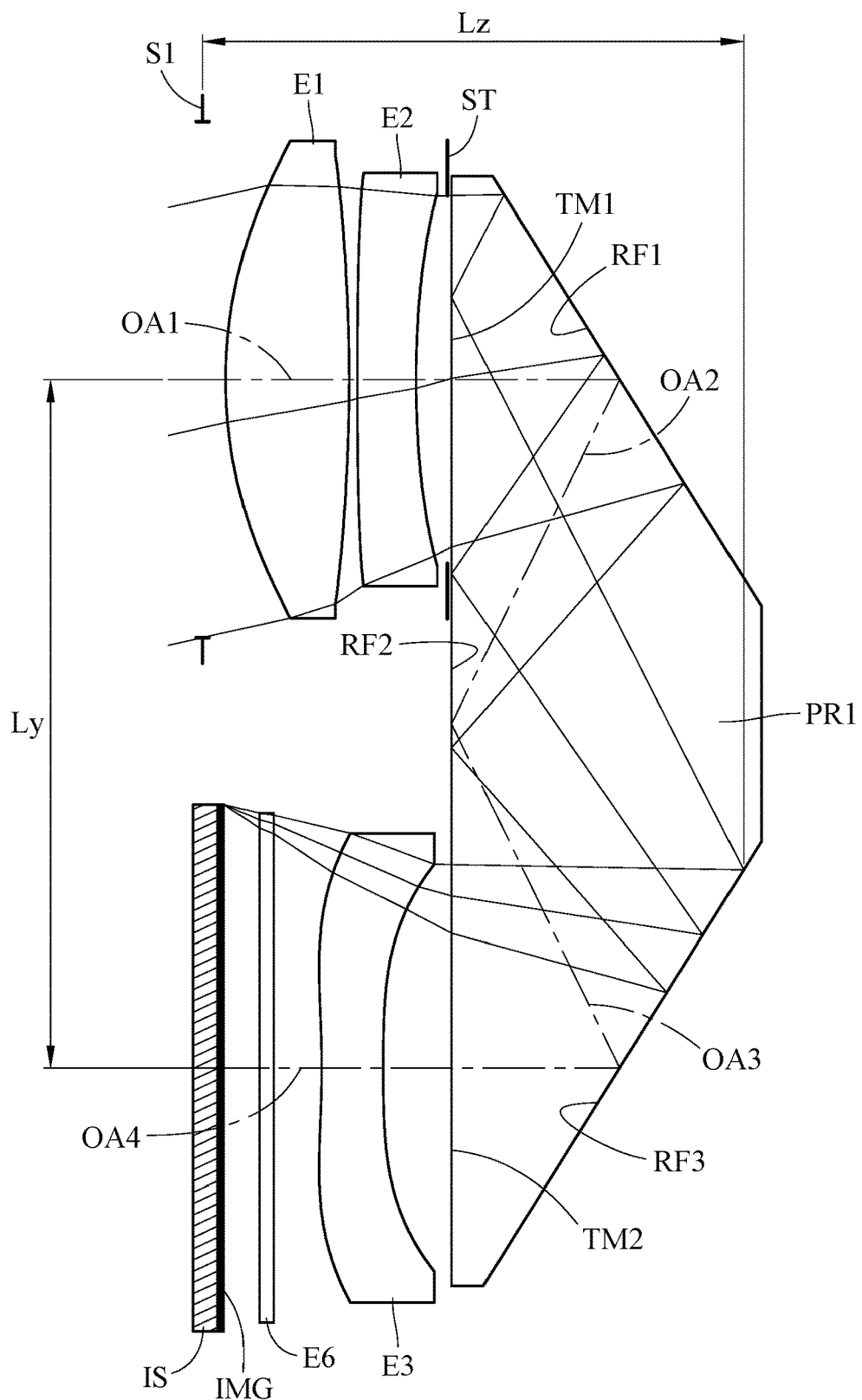
FIG. 25 shows a schematic view of Ly and Lz according to the 1st embodiment of the present disclosure.
Figure 26:
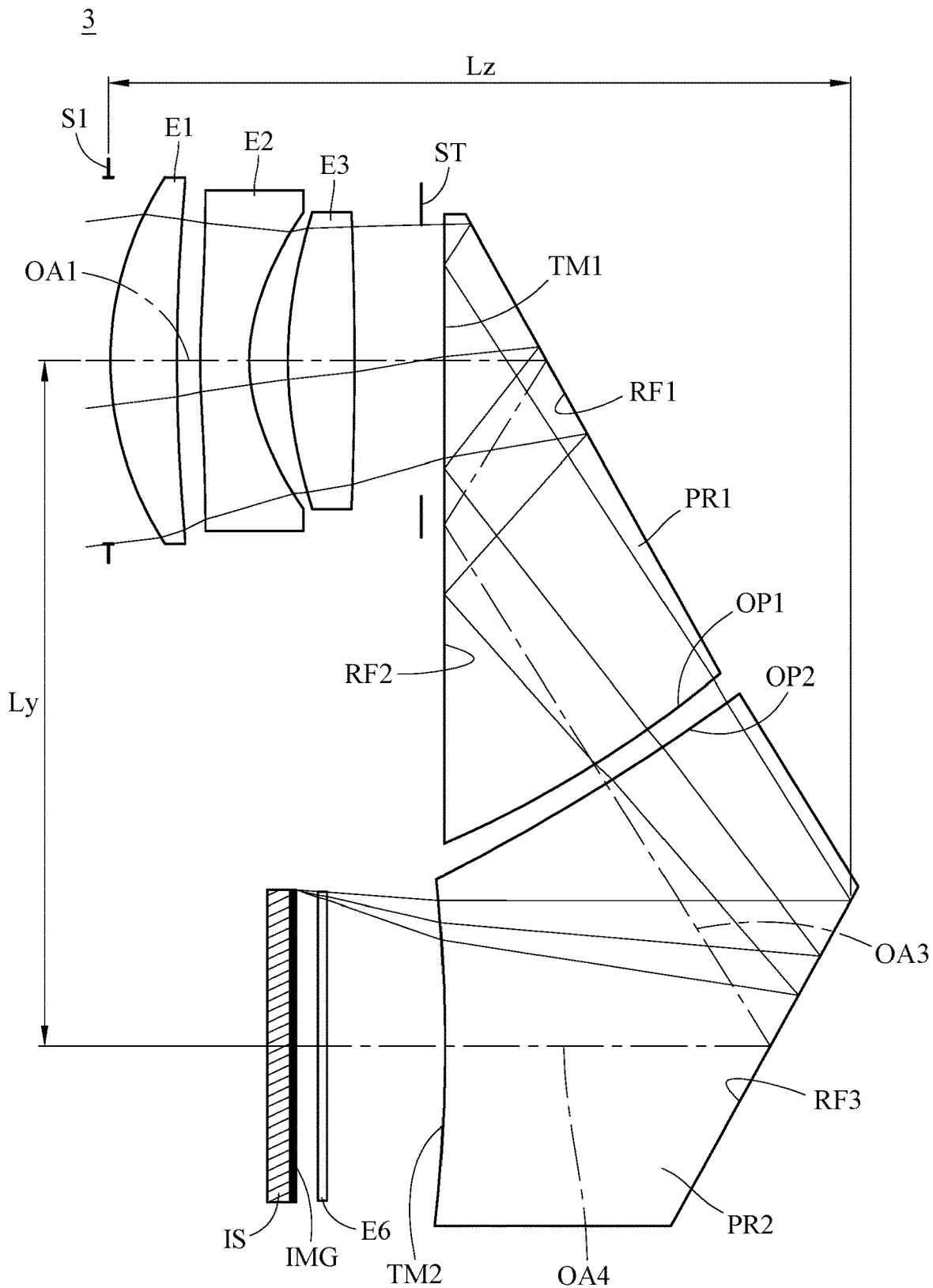
FIG. 26 shows a schematic view of Ly and Lz according to the 3rd embodiment of the present disclosure.

Preferably, the optical folding assembly can at least include a prism, and the prism can have the second reflective surface. Preferably, the optical folding assembly can also be constituted by single prism. Preferably, the optical folding assembly can be located among the plurality of lens elements, or the optical folding assembly can be located between the plurality of lens elements and the image surface along the travelling direction of light on the optical path. Please refer to FIG. 25, which shows the optical folding assembly including one prism PR1 according to the 1st embodiment of the present disclosure, and the optical folding assembly is located among the lens elements (E1, E2 and E3). Please refer to FIG. 26, which shows the optical folding assembly including two prisms PR1 and PR2 according to the 3rd embodiment of the present disclosure, and the optical folding assembly is located between a group of the lens elements (E1, E2 and E3) and the image surface IMG along the travelling direction of light on the optical path.

Preferably, there may be one or more additional surfaces located between adjacent two of the first transmissive surface, the first reflective surface, the second reflective surface, the third reflective surface and the second transmissive surface. For example, when the optical folding assembly includes two prisms, there may be two additional surfaces which the optical path passes through and are located between the second reflective surface and the third reflective surface. Please refer to FIG. 26, which shows the first corresponsive surface OP1 and the second corresponsive surface OP2 which the optical path passes through and are located between the second reflective surface RF2 and the third reflective surface RF3 according to the 3rd embodiment of the present disclosure.

Preferably, the material of the prism used as the optical folding assembly can be selected based on design requirements, such as glass or plastic. In addition, by definition of this specification, the prism with an optical path folding function doesn't belong to the said plurality of lens elements.

Preferably, each of the lens elements can be located on the first optical axis or the fourth optical axis. In other words, there may be no lens element disposed on the second optical axis or the third optical axis. Therefore, it is favorable for providing sufficient space for the optical folding assembly to perform optical path folding in the folded optical system, thereby facilitating product thinness.

Preferably, each of the lens elements has a light incident surface and a light emitting surface sequentially along the travelling direction of light on the optical path. Preferably, the lens elements at least include a first lens element, and there is no additional lens element disposed between the first lens element and an imaged object. Preferably, the lens elements can further include a second lens element at a light emitting side of the first lens element along the travelling direction of light on the optical path. That is, the lens elements at least include the first lens element and the second lens element sequentially along the travelling direction of light on the optical path. Preferably, the lens elements can further include a last lens element located closest to the image surface than one or more remaining lens elements, the last lens element is located at light emitting sides of the one or more remaining lens elements along the travelling direction of light on the optical path, and there is no additional lens element disposed between the last lens element and the image surface. In other words, the last lens element is the third lens element when the plurality of lens elements include a total of three lens elements; the last lens element is the fourth lens element when the plurality of lens elements include a total of four lens elements; and the last lens element is the fifth lens element when the plurality of lens elements include a total of five lens elements.

Preferably, the first lens element is located on the first optical axis. Preferably, the first lens element has positive refractive power. Therefore, it is favorable for reducing the length of the folded optical system along the first optical axis, thereby reducing the thickness of the overall electronic device along the first optical axis. Preferably, the light incident surface of the first lens element can be convex in a paraxial region thereof. Therefore, it is favorable for reducing the incident angle on the light incident surface of the first lens element at the off-axis field of view, thereby reducing the opening size of the electronic device.

Preferably, the second lens element can be located on the first optical axis. Preferably, the second lens element can have negative refractive power. Therefore, it is favorable for balancing the refractive power distribution at the light incident side of the folded optical system so as to obtain a proper balance between reduction in thickness and improvement of image quality of the folded optical system. Preferably, the light emitting surface of the second lens element can be concave in a paraxial region thereof. Therefore, it is favorable for effectively correcting aberrations generated by the first lens element so as to improve image quality.

Preferably, at least one of the lens elements can be made of plastic material, and the light incident surface and the light emitting surface thereof can be both aspheric. Therefore, it is favorable for effectively reducing manufacturing cost and increasing design flexibility, thereby improving image quality and increasing mass-production possibility.

Preferably, at least one of the lens elements can have a refractive index larger than 1.63. Therefore, it is favorable for effectively balancing the material distribution of lens elements, thereby reducing the total size and correcting aberrations of the folded optical system.

When an axial distance along the first optical axis, the second optical axis, the third optical axis and the fourth optical axis between the light incident surface of the first lens element and the image surface is TL, and a focal length of the folded optical system is f, the following condition can be preferably satisfied: $0.90<TL/f<2.00$. Therefore, it is favorable for effectively balancing the ratio of the optical total track length to the focal length of the folded optical system so as to meet product application requirements. Moreover, the following condition can also be preferably satisfied: $1.10<TL/f<1.60$. Moreover, the following condition can also be preferably satisfied: $1.20<TL/f<1.55$.

When a curvature radius of the light incident surface of the first lens element is R1, and a curvature radius of the light emitting surface of the first lens element is R2, the following condition can be preferably satisfied: $-1.50<R1/R2<0.90$. Therefore, it is favorable for adjusting the lens shape of the first lens element, thereby enhancing the optical path control ability of the light incident surface of the first lens element. Moreover, the following condition can also be preferably satisfied: $-1.00<R1/R2<0.80$.

When a focal length of the first lens element is f1, and a focal length of the second lens element is f2, the following condition can be preferably satisfied: $-5.00<f2/f1<-0.03$. Therefore, it is favorable for combining the first lens element and the second lens element to correct aberrations such as spherical aberration. Moreover, the following condition can also be preferably satisfied: $-4.50<f2/f1<-0.10$.

In the case of the second lens element located on the first optical axis, when a distance parallel to the first optical axis between a maximum effective radius position of the light incident surface of the second lens element and a maximum effective radius position of the light emitting surface of the second lens element is ET2, and a central thickness of the second lens element on the first optical axis is CT2, the following condition can be preferably satisfied: 0.95<ET2/CT2<3.50. Therefore, it is favorable for adjusting the ratio of the edge thickness to the central thickness of the second lens element, thereby obtaining a proper balance between reduction in manufacturing difficulty and reduction in stray light inside the lens element. Moreover, the following condition can also be preferably satisfied: 1.00<ET2/CT2<3.20. Please refer to FIG. 28, which shows a schematic view of ET2 according to the 1st embodiment of the present disclosure.

When the axial distance along the first optical axis, the second optical axis, the third optical axis and the fourth optical axis between the light incident surface of the first lens element and the image surface is TL, and a distance perpendicular to the first optical axis between a maximum effective radius position of the light incident surface of the first lens element and the first optical axis is Y11, the following condition can be preferably satisfied: 3.80<TL/Y11<15.00. Therefore, it is favorable for effectively controlling the ratio of the optical total track length to the size of the light incident surface of the first lens element of the folded optical system and also effectively shrinking the opening of the lens such that the lens is applicable to various electronic devices. Moreover, the following condition can also be preferably satisfied: 5.00<TL/Y11<13.00. Please refer to FIG. 28, which shows a schematic view of Y11 according to the 1st embodiment of the present disclosure.

When half of a maximum field of view of the folded optical system is HFOV, the following condition can be preferably satisfied: 2.00 [deg.]<HFOV<18.00 [deg.]. Therefore, it is favorable for having a proper field of view of the folded optical system for the telephoto application. Moreover, the following condition can also be preferably satisfied: 4.00 [deg.]<HFOV<16.50 [deg.]. Moreover, the following condition can also be preferably satisfied: 5.00 [deg.]<HFOV<15.80 [deg.].

When an axial distance along at least one of the first optical axis, the second optical axis, the third optical axis and the fourth optical axis between the light incident surface of the first lens element and the light emitting surface of the last lens element is TD, and the focal length of the folded optical system is f, the following condition can be preferably satisfied: 0.60<TD/f<1.80. Therefore, it is favorable for adjusting the lens distribution among the folded optical system so as to effectively utilize the space in the thickness direction of the electronic device. Moreover, the following condition can also be preferably satisfied: 0.90<TD/f<1.70. Please be noted that if the last lens element is located on the first optical axis, the definition of TD is an axial distance along the first optical axis between the light incident surface of the first lens element and the light emitting surface of the last lens element; if the last lens element is located on the fourth optical axis, the definition of TD is an axial distance along the first optical axis, the second optical axis, the third optical axis and the fourth optical axis between the light incident surface of the first lens element and the light emitting surface of the last lens element.

When a distance perpendicular to the first optical axis between an axial vertex of the light incident surface of the first lens element on the first optical axis and an intersection point of the image surface and the fourth optical axis is Ly, and a maximum displacement of the optical path parallel to the first optical axis from a surface through which the optical path extends into the folded optical system to the image surface is Lz, the following condition can be preferably satisfied: 0.60<Ly/Lz<1.50. Therefore, it is favorable for adjusting the ratio of the width to the thickness of the folded optical system, thereby controlling the appearance of the folded optical system for the internal configuration of the product. Moreover, the following condition can also be preferably satisfied: 0.70<Ly/Lz<1.30. According to the present disclosure, the said surface through which the optical path extends into the folded optical system can be the surface of an aperture stop, the surface of a stop, or the light incident surface of the first lens element. Please refer to FIG. 25, which shows a schematic view of Ly and Lz according to the 1st embodiment of the present disclosure. Please refer to FIG. 26, which shows a schematic view of Ly and Lz according to the 3rd embodiment of the present disclosure.

When the maximum displacement of the optical path parallel to the first optical axis from the surface through which the optical path extends into the folded optical system to the image surface is Lz, the following condition can be preferably satisfied: 5.00 [mm]<Lz<11.00 [mm]. Therefore, it is favorable for adjusting the length of the folded optical system in the direction along the first optical axis, thereby facilitating thinness of the folded optical system for various and diverse application. Moreover, the following condition can also be preferably satisfied: 5.50 [mm]<Lz<10.00 [mm].

When a refractive index of the prism which has the second reflective surface is Np, the following condition can be preferably satisfied: 1.53<Np<1.95. Therefore, it is favorable for having sufficient difference in refractive indices between the prism and air, which can adjust the critical angle for ensuring the total reflection able to be generated on the second reflective surface. Moreover, the following condition can also be preferably satisfied: 1.60<Np<1.95. Moreover, the following condition can also be preferably satisfied: 1.70<Np<1.90.

Figure 27:
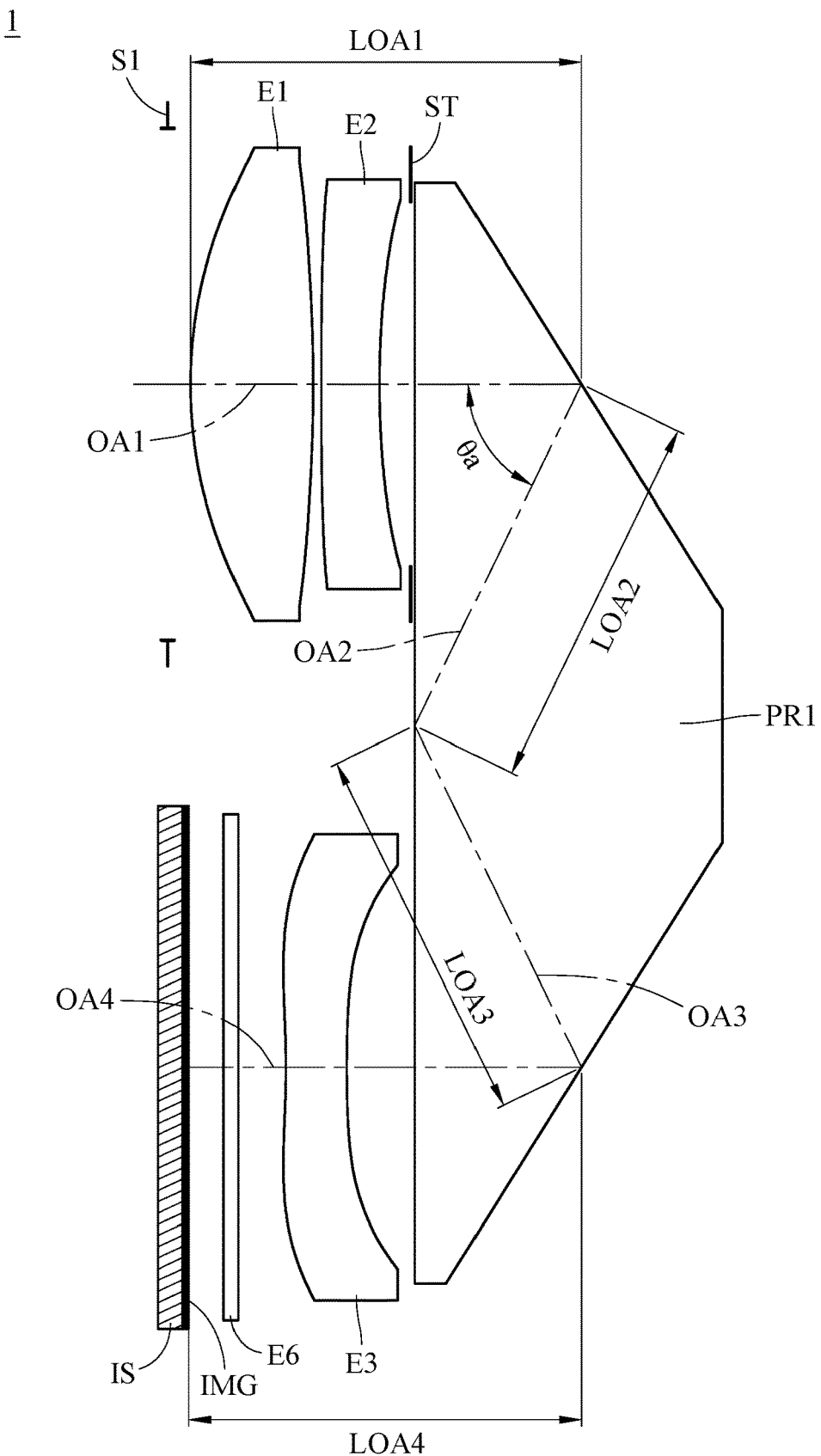
FIG. 27 shows a schematic view of LOA1, LOA2, LOA3, LOA4 and θa according to the 1st embodiment of the present disclosure.

When an angle between the first optical axis and the second optical axis is θa, the following condition can be preferably satisfied: 40.0 [deg.]<θa<76.0 [deg.]. Therefore, it is favorable for adjusting the angle between the first optical axis and the second optical axis, thereby preventing failure at generating total reflection on the second reflective surface due to an overly small angle therebetween and also preventing a large size of the folded optical system due to an overly large angle therebetween. Moreover, the following condition can also be preferably satisfied: 46.0 [deg.]<θa<72.0 [deg.]. Please refer to FIG. 27, which shows a schematic view of θa according to the 1st embodiment of the present disclosure.

When a curvature radius of the light incident surface of the second lens element is R3, and a curvature radius of the light emitting surface of the second lens element is R4, the following condition can be preferably satisfied: −0.05<(R3−R4)/(R3+R4)<3.00. Therefore, it is favorable for adjusting the lens shape and the refractive power of the second lens element, thereby adjusting the optical path so as to improve image quality. Moreover, the following condition can also be preferably satisfied: 0.01<(R3−R4)/(R3+R4)<2.50.

When the focal length of the folded optical system is f, and the maximum displacement of the optical path parallel to the first optical axis from the surface through which the optical path extends into the folded optical system to the image surface is Lz, the following condition can be preferably satisfied: 1.50<f/Lz<3.50. Therefore, it is favorable for adjusting the ratio of the focal length of the folded optical system and the length of the folded optical system in the direction along the first optical axis, thereby reducing the thickness of the folded optical system. Moreover, the following condition can also be preferably satisfied: $1.65<f/Lz<3.00$.

When the focal length of the folded optical system is f, and a composite focal length of one or more of the lens elements located on the first optical axis is fG1, the following condition can be preferably satisfied: $0.50<f/fG1<2.00$. Therefore, it is favorable for adjusting refractive power of one or more lens elements located on the first optical axis, thereby reducing the thickness of the optical folding assembly in the direction along the first optical axis. Moreover, the following condition can also be preferably satisfied: $0.75<f/fG1<1.60$. Moreover, the following condition can also be preferably satisfied: $1.00$ $f/fG1<1.50$.

When an axial distance along the first optical axis between the light incident surface of the first lens element and the first reflective surface is LOA1, an axial distance along the second optical axis between the first reflective surface and the second reflective surface is LOA2, an axial distance along the third optical axis between the second reflective surface and the third reflective surface is LOA3, and an axial distance along the fourth optical axis between the third reflective surface and the image surface is LOA4, the following condition can be preferably satisfied: $0.55<(LOA2+LOA3)/(LOA1+LOA4)<1.00$. Therefore, it is favorable for adjusting the ratio of light travelling distances among the optical axes, thereby maintaining a long focal length for supplying sufficient magnification while reducing the thickness of the folded optical system. Moreover, the following condition can also be preferably satisfied: $0.58<(LOA2+LOA3)/(LOA1+LOA4)<0.98$. Moreover, the following condition can also be preferably satisfied: $0.60<(LOA2+LOA3)/(LOA1+LOA4)<0.95$. Please refer to FIG. 27, which shows a schematic view of LOA1, LOA2, LOA3 and LOA4 according to the 1st embodiment of the present disclosure.

When the focal length of the first lens element is f1, and a central thickness of the first lens element on the first optical axis is CT1, the following condition can be preferably satisfied: $2.50<f1/CT1<15.00$. Therefore, it is favorable for adjusting the ratio of the focal length to the thickness of the first lens element, such that the first lens element is able to provide sufficient convergence ability for the folded optical system. Moreover, the following condition can also be preferably satisfied: $2.80<f1/CT1<13.00$. Moreover, the following condition can also be preferably satisfied: $3.00<f1/CT1<10.00$.

When an f-number of the folded optical system is Fno, the following condition can be preferably satisfied: $2.00<Fno<4.00$. Therefore, it is favorable for obtaining a proper balance between illuminance and the depth of field so as to increase light incident amount for improvement in image quality and prevent vignetting at the image periphery. Moreover, the following condition can also be preferably satisfied: $2.10<Fno<3.60$.

When the distance perpendicular to the first optical axis between the maximum effective radius position of the light incident surface of the first lens element and the first optical axis is Y11, and a maximum image height of the folded optical system is (which can be half of a diagonal length of an effective photosensitive area of the image sensor) ImgH, the following condition can be preferably satisfied: $0.40<Y11/ImgH<2.00$. Therefore, it is favorable for adjusting the size of light beam, thereby reducing the opening of the folded optical system for an aesthetic appearance of the electronic device while increasing light absorption area of the image sensor for improvement in image quality. Moreover, the following condition can also be preferably satisfied: $0.50<Y11/ImgH<1.80$.

Figure 28:
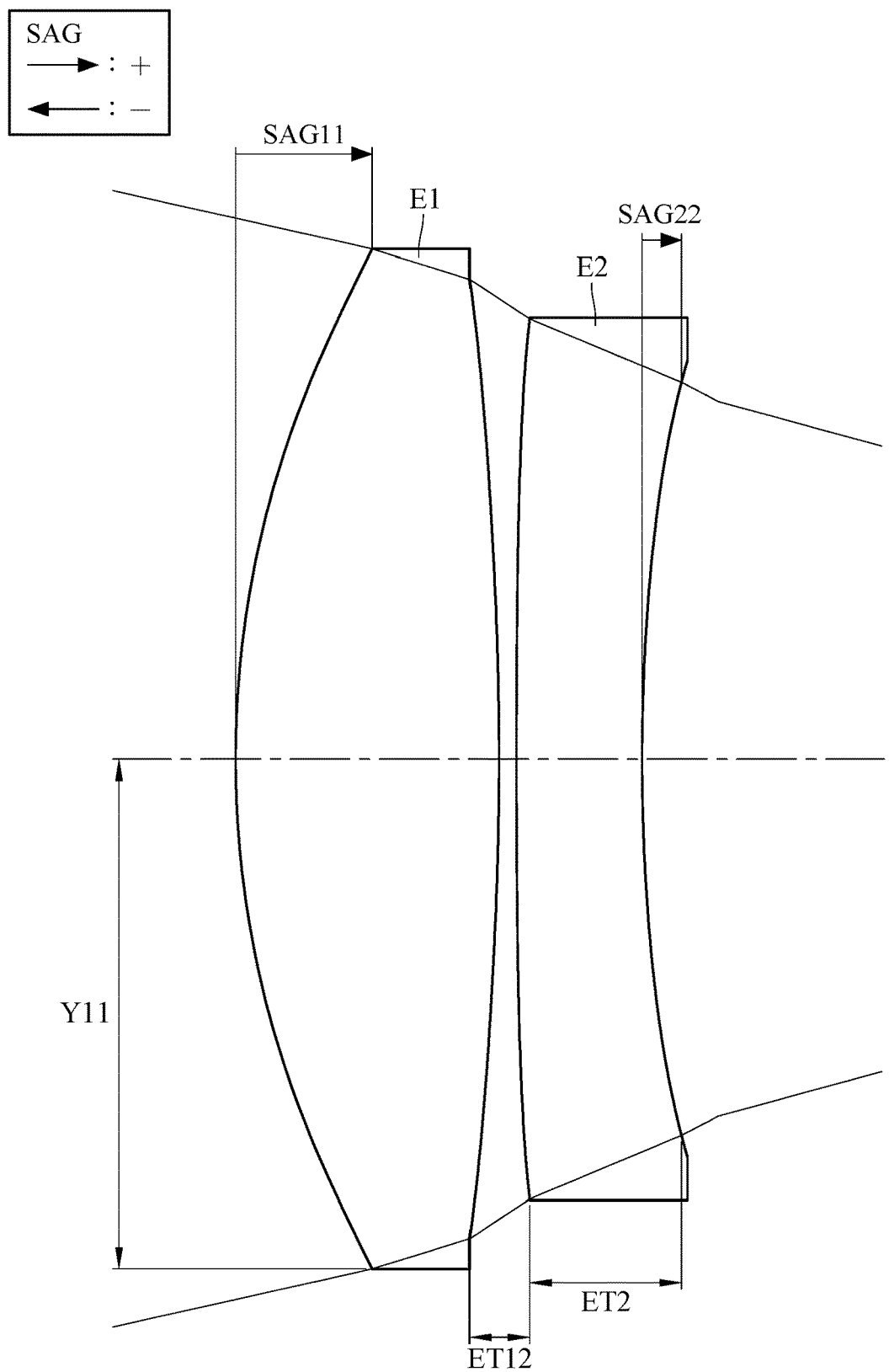
FIG. 28 shows a schematic view of ET2, ET12, SAG11, SAG22 and Y11 according to the 1st embodiment of the present disclosure.

In the case of the second lens element located on the first optical axis, when a displacement parallel to the first optical axis from the axial vertex to the maximum effective radius position on the light incident surface of the first lens element is SAG11, a displacement parallel to the first optical axis from an axial vertex to the maximum effective radius position on the light emitting surface of the second lens element is SAG22, and a distance parallel to the first optical axis between a maximum effective radius position of the light emitting surface of the first lens element and the maximum effective radius position of the light incident surface of the second lens element is ET12, the following condition can be preferably satisfied: $1.60<(SAG11+SAG22)/ET12<13.00$. Therefore, it is favorable for adjusting the ratio of the peripheral lens shape to the peripheral interval of the first two lenses at the light incident side, thereby having sufficient refractive powers at the lens peripheries for correction in off-axis aberrations while preventing an overly long interval between the lenses, such that the length of the folded optical system along the first optical axis can be reduced and bias error thereof can be prevented. Moreover, the following condition can also be preferably satisfied: $1.80<(SAG11+SAG22)/ET12<12.00$. Moreover, the following condition can also be preferably satisfied: $2.50<(SAG11+SAG22)/ET12<11.50$. Please refer to FIG. 28, which shows a schematic view of SAG11 and SAG22 according to the 1st embodiment of the present disclosure. Please be noted that the definitions of SAG11 and SAG22 are vectors, each of which has a positive value if the displacement thereof goes along the optical path or has a negative value if the displacement thereof goes against the optical path. Each of SAG11 and SAG22 as shown in FIG. 28 is a vector going along the optical path, so each of them has a positive value.

According to the present disclosure, the aforementioned features and conditions can be utilized in numerous combinations so as to achieve corresponding effects.

According to the present disclosure, the lens elements of the folded optical system can be made of either glass or plastic material. When the lens elements are made of glass material, the refractive power distribution of the folded optical system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the folded optical system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof. In addition, unless otherwise stated, the aspheric surface in the embodiments can refer to an axisymmetric aspheric surface, and the freeform surface in the embodiments can refer to a non-axisymmetric aspheric surface.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of a light incident surface and a light emitting surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, the image surface of the folded optical system, based on the corresponding image sensor, can be flat or curved, especially a curved surface being concave facing towards the light incident side of the folded optical system.

According to the present disclosure, an image correction unit, such as a field flattener, can be optionally disposed between the lens element closest to the light emitting side of the folded optical system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave light incident surface and a planar light emitting surface, and the thin transparent element is disposed near the image surface.

According to the present disclosure, the folded optical system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the folded optical system and the image surface to produce a telecentric effect, and thereby improves the image-sensing efficiency of an image sensor (for example, CCD or CMOS). A middle stop disposed between the first lens element and the image surface is favorable for enlarging the viewing angle of the folded optical system and thereby provides a wider field of view for the same.

According to the present disclosure, the folded optical system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the folded optical system can include one or more optical elements for limiting the form of light passing through the folded optical system. Each optical element can be, but not limited to, a filter, a polarizer, etc., and each optical element can be, but not limited to, a single-piece element, a composite component, a thin film, etc. The optical element can be located at the light incident side or the light emitting side of the folded optical system or between any two adjacent lens elements so as to allow light in a specific form to pass through, thereby meeting application requirements.

According to the above description of the present disclosure, the following specific embodiments are provided for further explanation.

1st Embodiment

Figure 1:
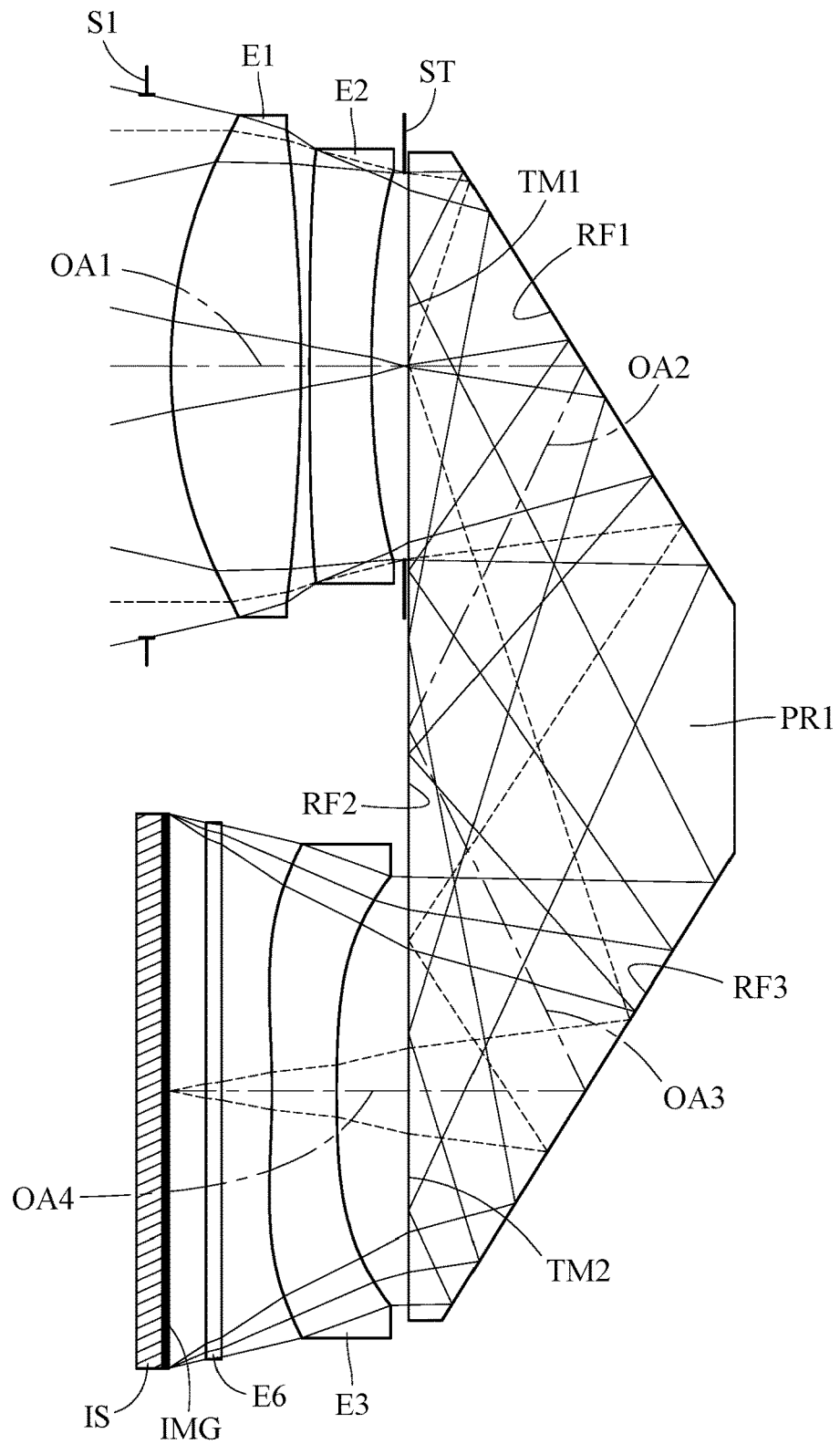
FIG. 1 is a schematic view of an image capturing unit according to the 1st embodiment of the present disclosure.
Figure 2:
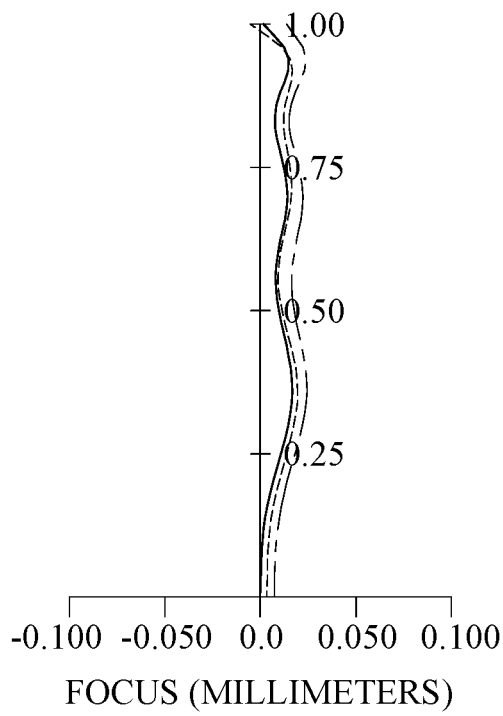
FIG. 2 shows spherical aberration curves and astigmatic field curves of the image capturing unit according to the 1st embodiment.
Figure 2:
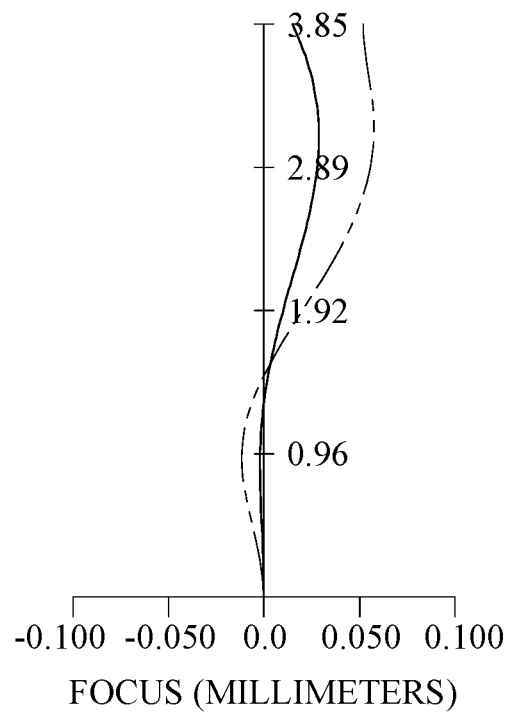

FIG. 1 is a schematic view of an image capturing unit according to the 1st embodiment of the present disclosure. FIG. 2 shows, in order from left to right, spherical aberration curves and astigmatic field curves of the image capturing unit according to the 1st embodiment. In FIG. 1, the image capturing unit 1 includes the folded optical system (its reference numeral is omitted) of the present disclosure and an image sensor IS. The folded optical system includes, in order from a light incident side to a light emitting side along a travelling direction of light on an optical path, a stop S1, a first lens element E1, a second lens element E2, an aperture stop ST, an optical folding assembly (its reference numeral is omitted), a third lens element E3, a filter E6 and an image surface IMG. Moreover, the said optical folding assembly includes a prism PR1 made of glass material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes three lens elements (E1, E2 and E3) with no additional lens element disposed between each of the adjacent three lens elements. Further, the first lens element E1 and the second lens element E2 are located on the first optical axis OA1, and the third lens element E3 is located on the fourth optical axis OA4.

The first lens element E1 with positive refractive power has a light incident surface being convex in a paraxial region thereof and a light emitting surface being convex in a paraxial region thereof. The first lens element E1 is made of plastic material and has the light incident surface and the light emitting surface being both aspheric.

The second lens element E2 with negative refractive power has a light incident surface being convex in a paraxial region thereof and a light emitting surface being concave in a paraxial region thereof. The second lens element E2 is made of plastic material and has the light incident surface and the light emitting surface being both aspheric.

The third lens element E3 with negative refractive power has a light incident surface being concave in a paraxial region thereof and a light emitting surface being concave in a paraxial region thereof. The third lens element E3 is made of glass material and has the light incident surface and the light emitting surface being both aspheric.

Among the three lens elements (E1, E2 and E3), the second lens element E2 and the third lens element E3 each have a refractive index larger than 1.63.

The filter E6 is made of glass material and located between the third lens element E3 and the image surface IMG, and will not affect the focal length of the folded optical system. The image sensor IS is disposed on or near the image surface IMG of the folded optical system.

The equation of the axisymmetric aspheric surface profiles of the aforementioned lens elements of the 1st embodiment is expressed as follows:

$$Z = \frac{Y^2/R}{1+\sqrt{1-(k+1)(Y/R)^2}} + \sum_j (Ai) \times (Y^i),$$

where,
Z is the displacement in parallel with an optical axis where the aspheric surface is located from an axial vertex on the aspheric surface to a point at a distance of Y from the optical axis on the aspheric surface;
Y is the vertical distance from the point on the aspheric surface to the optical axis where the aspheric surface is located;
R is the curvature radius;
k is the conic coefficient; and
Ai is the i-th aspheric coefficient, and in the embodiments, i may be, but is not limited to, 4, 6, 8, 10, 12, 14, 16 and 18.

In the folded optical system of the image capturing unit 1 according to the 1st embodiment, when a focal length of the folded optical system is f, an f-number of the folded optical system is Fno, and half of a maximum field of view of the folded optical system is HFOV, these parameters have the following values: f=16.93 millimeters (mm), Fno=2.59, HFOV=12.6 degrees (deg.).

When a curvature radius of the light incident surface of the first lens element E1 is R1, and a curvature radius of the light emitting surface of the first lens element E1 is R2, the following condition is satisfied: R1/R2=−0.28.

When a curvature radius of the light incident surface of the second lens element E2 is R3, and a curvature radius of the light emitting surface of the second lens element E2 is R4, the following condition is satisfied: (R3−R4)/(R3+R4)=0.78.

When a focal length of the first lens element E1 is f1, and a focal length of the second lens element E2 is f2, the following conditions are satisfied: f1=9.91 [mm]; f2=−26.00 [mm]; and f2/f1=−2.62.

When the focal length of the folded optical system is f, and a composite focal length of one or more of the lens elements located on the first optical axis OA1 is fG1, the following condition is satisfied: f/fG1=1.16. In this embodiment, the first lens element E1 and the second lens element E2 are located on the first optical axis OA1, and thus fG1 is the composite focal length of the first lens element E1 and the second lens element E2.

When the focal length of the first lens element E1 is f1, and a central thickness of the first lens element E1 on the first optical axis OA1 is CT1, the following condition is satisfied: f1/CT1=5.51.

When an axial distance along the first optical axis OA1, the second optical axis OA2, the third optical axis OA3 and the fourth optical axis OA4 between the light incident surface of the first lens element E1 and the light emitting surface of the third lens element E3 is TD, and the focal length of the folded optical system is f, the following condition is satisfied: TD/f=1.26.

When an axial distance along the first optical axis OA1, the second optical axis OA2, the third optical axis OA3 and the fourth optical axis OA4 between the light incident surface of the first lens element E1 and the image surface IMG is TL, and the focal length of the folded optical system is f, the following condition is satisfied: TL/f=1.34.

When the focal length of the folded optical system is f, and a maximum displacement of the optical path parallel to the first optical axis OA1 from a surface through which the optical path extends into the folded optical system to the image surface IMG is Lz, the following condition is satisfied: f/Lz=2.14. In this embodiment, the optical path extends into the folded optical system through a surface on the stop S1, and thus Lz is the maximum displacement of the optical path parallel to the first optical axis OA1 from the stop S1 to the image surface IMG.

When a distance perpendicular to the first optical axis OA1 between an axial vertex of the light incident surface of the first lens element E1 on the first optical axis OA1 and an intersection point of the image surface IMG and the fourth optical axis OA4 is Ly, and the maximum displacement of the optical path parallel to the first optical axis OA1 from the surface through which the optical path extends into the folded optical system to the image surface IMG is Lz, the following condition is satisfied: Ly/Lz=1.27.

When the maximum displacement of the optical path parallel to the first optical axis OA1 from the surface through which the optical path extends into the folded optical system to the image surface IMG is Lz, the following condition is satisfied: Lz=7.90 [mm].

When the axial distance along the first optical axis OA1, the second optical axis OA2, the third optical axis OA3 and the fourth optical axis OA4 between the light incident surface of the first lens element E1 and the image surface IMG is TL, and a distance perpendicular to the first optical axis OA1 between a maximum effective radius position of the light incident surface of the first lens element E1 and the first optical axis OA1 is Y11, the following condition is satisfied: TL/Y11=6.52.

When a distance parallel to the first optical axis OA1 between a maximum effective radius position of the light incident surface of the second lens element E2 and a maximum effective radius position of the light emitting surface of the second lens element E2 is ET2, and a central thickness of the second lens element E2 on the first optical axis OA1 is CT2, the following condition is satisfied: ET2/CT2=1.26.

When the distance perpendicular to the first optical axis OA1 between the maximum effective radius position of the light incident surface of the first lens element E1 and the first optical axis OA1 is Y11, and a maximum image height of the folded optical system is ImgH, the following condition is satisfied: Y11/ImgH=0.91.

When a displacement parallel to the first optical axis OA1 from the axial vertex to the maximum effective radius position on the light incident surface of the first lens element E1 is SAG11, a displacement parallel to the first optical axis OA1 from an axial vertex to the maximum effective radius position on the light emitting surface of the second lens element E2 is SAG22, and a distance parallel to the first optical axis OA1 between a maximum effective radius position of the light emitting surface of the first lens element E1 and the maximum effective radius position of the light incident surface of the second lens element E2 is ET12, the following condition is satisfied: (SAG11+SAG22)/ET12=3.02.

When an axial distance along the first optical axis OA1 between the light incident surface of the first lens element E1 and the first reflective surface RF1 is LOA1, an axial distance along the second optical axis OA2 between the first reflective surface RF1 and the second reflective surface RF2 is LOA2, an axial distance along the third optical axis OA3 between the second reflective surface RF2 and the third reflective surface RF3 is LOA3, and an axial distance along the fourth optical axis OA4 between the third reflective surface RF3 and the image surface IMG is LOA4, the following condition is satisfied: (LOA2+LOA3)/(LOA1+LOA4)=0.97.

When a refractive index of the prism PR1 is Np, the following condition is satisfied: Np=1.773.

When an angle between the first optical axis OA1 and the second optical axis OA2 is $\theta a$, the following condition is satisfied: $\theta a$=64.0 [deg.].

The detailed optical data of the 1st embodiment are shown in Table 1A and the aspheric surface data are shown in Table 1B below.

TABLE 1A

1st Embodiment
f = 16.93 mm, Fno = 2.59, HFOV = 12.6 deg.

| Surface # | | Curvature Radius | | Thickness | Material | Index | Abbe # | Refractive Power | Refractive/ Reflective |
|---|---|---|---|---|---|---|---|---|---|
| 0 | Object | Plano | | Infinity | | | | | Refractive |
| 1 | Stop | Plano | | 0.337 | | | | | Refractive |
| 2 | Lens 1 | 6.7590 | Convex (ASP) | 1.800 | Plastic | 1.544 | 56.0 | Positive | Refractive |
| 3 | | −24.1911 | Convex (ASP) | 0.120 | | | | | Refractive |
| 4 | Lens 2 | 120.6375 | Convex (ASP) | 0.860 | Plastic | 1.639 | 23.5 | Negative | Refractive |
| 5 | | 14.5554 | Concave (ASP) | 0.457 | | | | | Refractive |
| 6 | Ape. Stop | Plano | | 0.060 | | | | | Refractive |
| 7 | Prism | Plano | | 2.453 | Glass | 1.773 | 49.6 | | Refractive |
| 8 | | Plano | | −5.596 | | | | | Reflective |
| 9 | | Plano | | 5.596 | | | | | Reflective |
| 10 | | Plano | | −2.453 | | | | | Reflective |
| 11 | | Plano | | −1.000 | | | | | Refractive |
| 12 | Lens 3 | 24.8377 | Concave (ASP) | −0.900 | Glass | 1.923 | 18.9 | Negative | Refractive |
| 13 | | −12.8518 | Concave (ASP) | −0.700 | | | | | Refractive |
| 14 | Filter | Plano | | −0.210 | Glass | 1.517 | 64.2 | — | Refractive |
| 15 | | Plano | | −0.514 | | | | | Refractive |
| 16 | Image | Plano | | — | | | | | Refractive |

Note:
Reference wavelength is 587.6 nm (d-line).
An effective radius of the stop S1 (Surface 1) is 3.771 mm.
The first reflective surface RF1 (Surface 8) redirects the optical path along the first optical axis OA1 counterclockwise to the second optical axis OA2 by 64°.
The second reflective surface RF2 (Surface 9) redirects the optical path along the second optical axis OA2 clockwise to the third optical axis OA3 by 128°.
The third reflective surface RF3 (Surface 10) redirects the optical path along the third optical axis OA3 counterclockwise to the fourth optical axis OA4 by 64°.

TABLE 1B

Aspheric Coefficients

| Surface # | 2 | 3 | 4 | 5 |
|---|---|---|---|---|
| k = | 6.20446E−02 | −1.69647E+01 | 4.04006E+01 | −3.02372E+01 |
| A4 = | −1.846764E−04 | 2.302986E−04 | 1.608597E−04 | 1.239785E−03 |
| A6 = | 1.843572E−04 | 1.302143E−04 | 1.110340E−04 | 4.390305E−04 |
| A8 = | −6.354926E−05 | −3.372934E−05 | 7.807283E−06 | −2.513110E−04 |
| A10 = | 1.147513E−05 | 2.592126E−06 | −7.171866E−06 | 8.972481E−05 |
| A12 = | −1.188253E−06 | −7.058401E−08 | 1.050370E−06 | −1.906851E−05 |
| A14 = | 6.377670E−08 | 2.040261E−09 | −5.389195E−08 | 2.353763E−06 |

TABLE 1B-continued

| Aspheric Coefficients | | | | |
|---|---|---|---|---|
| A16 = | −1.402104E−09 | −1.559981E−10 | 5.568640E−10 | −1.544132E−07 |
| A18 = | — | — | 1.335533E−11 | 4.147574E−09 |

| Surface # | 12 | 13 |
|---|---|---|
| k = | 4.13461E+01 | −9.90000E+01 |
| A4 = | 9.019447E−03 | 6.628793E−03 |
| A6 = | −2.548123E−04 | −1.592639E−04 |

In Table 1A, the curvature radius and the thickness are shown in millimeters (mm). Surface numbers 0-16 represent the surfaces sequentially arranged from the light incident side to the light emitting side along the direction of the optical path. In Table 1B, k represents the conic coefficient of the equation of the axisymmetric aspheric surface profiles. A4-A18 represent the axisymmetric aspheric coefficients ranging from the 4th order to the 18th order. The tables presented below for each embodiment are the corresponding schematic parameter and aberration curves, and the definitions of the tables are the same as Table 1A and Table 1 B of the 1st embodiment. Therefore, an explanation in this regard will not be provided again.

2nd Embodiment

Figure 3:
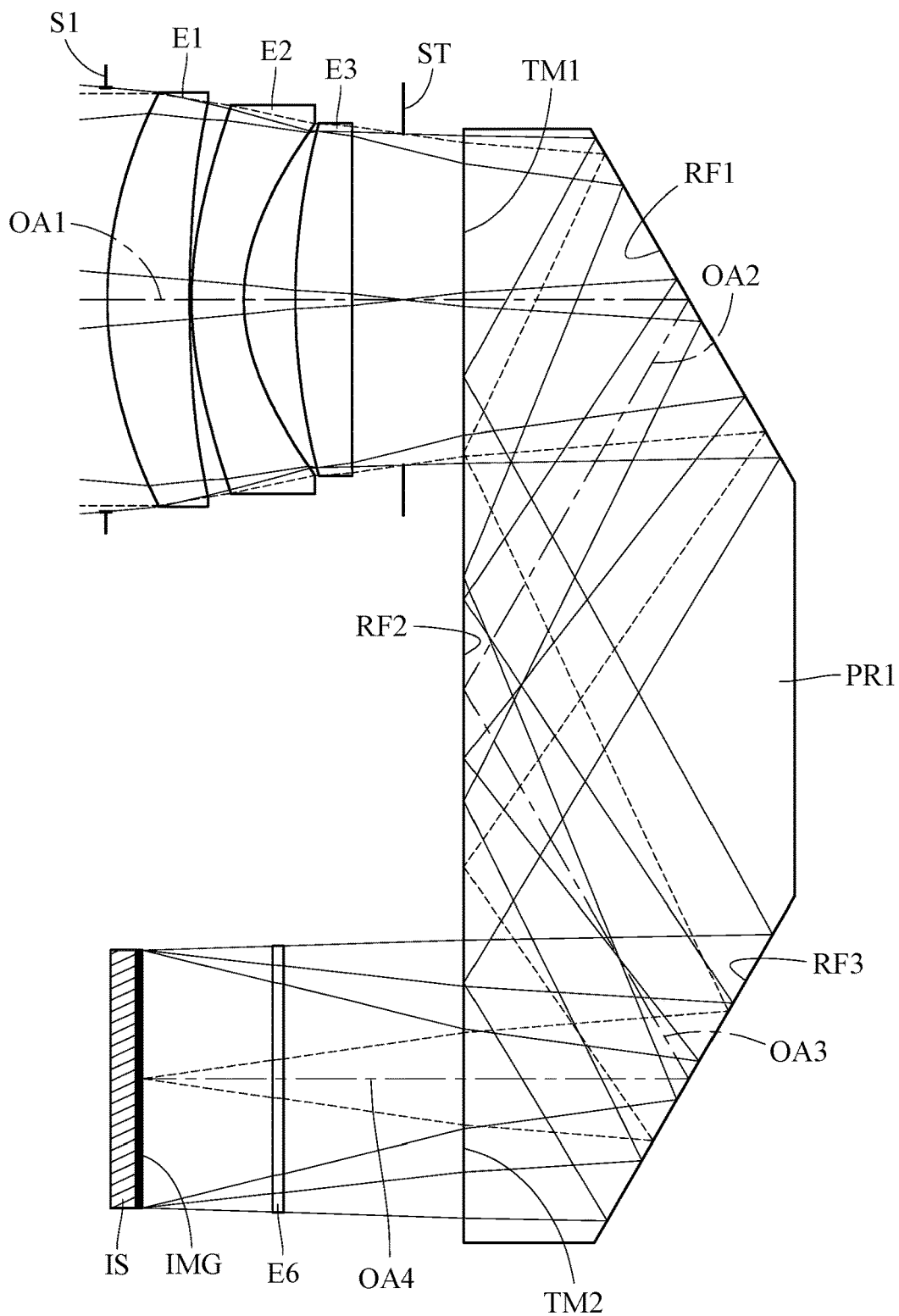
FIG. 3 is a schematic view of an image capturing unit according to the 2nd embodiment of the present disclosure.
Figure 4:
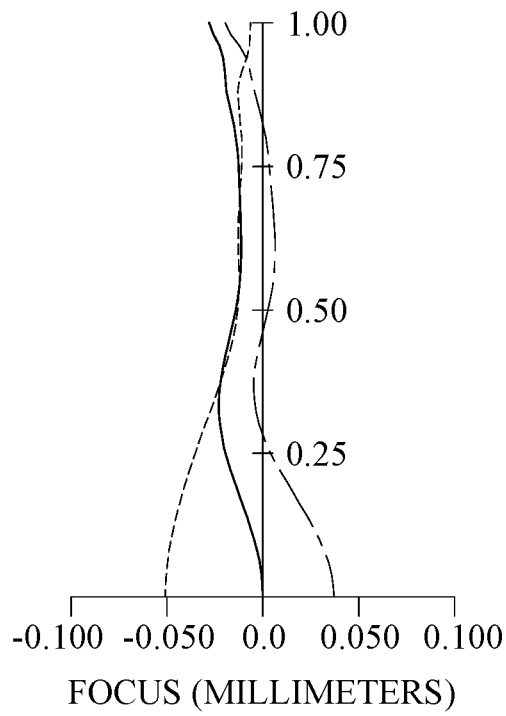
FIG. 4 shows spherical aberration curves and astigmatic field curves of the image capturing unit according to the 2nd embodiment.
Figure 4:
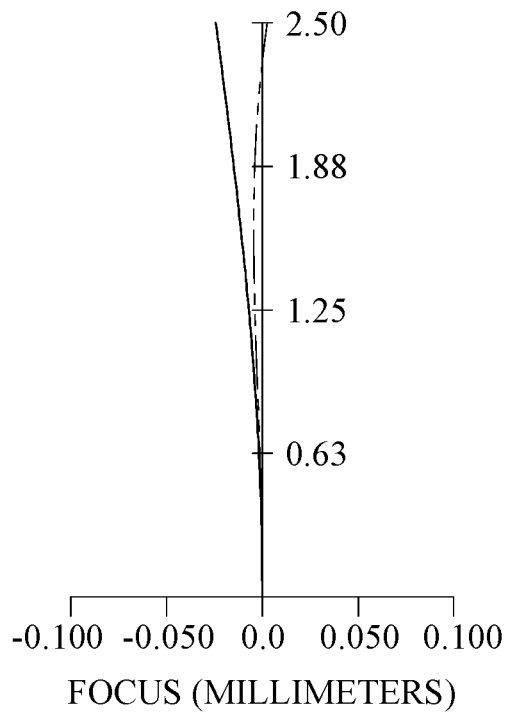

FIG. 3 is a schematic view of an image capturing unit according to the 2nd embodiment of the present disclosure. FIG. 4 shows, in order from left to right, spherical aberration curves and astigmatic field curves of the image capturing unit according to the 2nd embodiment. In FIG. 3, the image capturing unit 2 includes the folded optical system (its reference numeral is omitted) of the present disclosure and an image sensor IS. The folded optical system includes, in order from a light incident side to a light emitting side along a travelling direction of light on an optical path, a stop S1, a first lens element E1, a second lens element E2, a third lens element E3, an aperture stop ST, an optical folding assembly (its reference numeral is omitted), a filter E6 and an image surface IMG. Moreover, the said optical folding assembly includes a prism PR1 made of glass material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes three lens elements (E1, E2 and E3) with no additional lens element disposed between each of the adjacent three lens elements. Further, the first lens element E1, the second lens element E2 and the third lens element E3 are located on the first optical axis OA1.

The first lens element E1 with positive refractive power has a light incident surface being convex in a paraxial region thereof and a light emitting surface being concave in a paraxial region thereof. The first lens element E1 is made of plastic material and has the light incident surface and the light emitting surface being both aspheric.

The second lens element E2 with negative refractive power has a light incident surface being convex in a paraxial region thereof and a light emitting surface being concave in a paraxial region thereof. The second lens element E2 is made of plastic material and has the light incident surface and the light emitting surface being both aspheric.

The third lens element E3 with positive refractive power has a light incident surface being convex in a paraxial region thereof and a light emitting surface being concave in a paraxial region thereof. The third lens element E3 is made of glass material and has the light incident surface and the light emitting surface being both spherical.

Among the three lens elements (E1, E2 and E3), the third lens element E3 has a refractive index larger than 1.63.

The filter E6 is made of glass material and located between the prism PR1 and the image surface IMG, and will not affect the focal length of the folded optical system. The image sensor IS is disposed on or near the image surface IMG of the folded optical system.

The detailed optical data of the 2nd embodiment are shown in Table 2A and the aspheric surface data are shown in Table 2B below.

TABLE 2A

2nd Embodiment
f = 27.72 mm, Fno = 3.46, HFOV = 5.2 deg.

| Surface # | | Curvature Radius | | Thickness | Material | Refractive Index | Abbe # | Refractive Power | Refractive/ Reflective |
|---|---|---|---|---|---|---|---|---|---|
| 0 | Object | Plano | | Infinity | | | | | Refractive |
| 1 | Stop | Plano | | 0.030 | | | | | Refractive |
| 2 | Lens 1 | 7.7161 | Convex (ASP) | 1.600 | Plastic | 1.566 | 37.4 | Positive | Refractive |

TABLE 2A-continued

2nd Embodiment
f = 27.72 mm, Fno = 3.46, HFOV = 5.2 deg.

| Surface # | | Curvature Radius | Thickness | Material | Index | Abbe # | Refractive Power | Refractive/ Reflective |
|---|---|---|---|---|---|---|---|---|
| 3 | | 19.5486 Concave (ASP) | 0.040 | | | | | Refractive |
| 4 | Lens 2 | 6.7867 Convex (ASP) | 1.006 | Plastic | 1.614 | 26.0 | Negative | Refractive |
| 5 | | 3.5529 Concave (ASP) | 1.004 | | | | | Refractive |
| 6 | Lens 3 | 13.1054 Convex (SPH) | 1.100 | Glass | 1.804 | 46.6 | Positive | Refractive |
| 7 | | 597.1277 Concave (SPH) | 1.000 | | | | | Refractive |
| 8 | Ape. Stop | Plano | 1.173 | | | | | Refractive |
| 9 | Prism | Plano | 4.369 | Glass | 1.773 | 49.6 | | Refractive |
| 10 | | Plano | −8.737 | | | | | Reflective |
| 11 | | Plano | 8.737 | | | | | Reflective |
| 12 | | Plano | −4.369 | | | | | Reflective |
| 13 | | Plano | −3.505 | | | | | Refractive |
| 14 | Filter | Plano | −0.210 | Glass | 1.517 | 64.2 | — | Refractive |
| 15 | | Plano | −2.527 | | | | | Refractive |
| 16 | Image | Plano | — | | | | | |

Note:
Reference wavelength is 587.6 nm (d-line).
An effective radius of the stop S1 (Surface 1) is 4.117 mm.
The first reflective surface RF1 (Surface 10) redirects the optical path along the first optical axis OA1 counterclockwise to the second optical axis OA2 by 60°.
The second reflective surface RF2 (Surface 11) redirects the optical path along the second optical axis OA2 clockwise to the third optical axis OA3 by 120°.
The third reflective surface RF3 (Surface 12) redirects the optical path along the third optical axis OA3 counterclockwise to the fourth optical axis OA4 by 60°.

TABLE 2B

Aspheric Coefficients

| Surface # | 2 | 3 | 4 | 5 |
|---|---|---|---|---|
| k = | −7.80859E−01 | 1.22544E+01 | −6.48701E−01 | −4.40783E−01 |
| A4 = | −1.861784E−04 | −3.729955E−03 | −5.752370E−03 | −4.626669E−03 |
| A6 = | −1.470422E−04 | 9.623107E−04 | 1.245725E−03 | 2.515020E−04 |
| A8 = | 3.702173E−05 | −1.168753E−04 | −1.679354E−04 | −3.529870E−05 |
| A10 = | −4.357871E−06 | 6.458143E−06 | 1.150222E−05 | 1.470570E−06 |
| A12 = | 2.855582E−07 | −4.942572E−08 | −3.056440E−07 | 1.323973E−07 |
| A14 = | −9.901863E−09 | −9.626817E−09 | −3.806991E−09 | −1.626046E−08 |
| A16 = | 1.405939E−10 | 2.837932E−10 | 2.533848E−10 | 4.652700E−10 |

In the 2nd embodiment, the equation of the axisymmetric aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Schematic Parameters | |
|---|---|
| f [mm] | 27.72 |
| Fno | 3.46 |
| HFOV [deg.] | 5.2 |
| R1/R2 | 0.39 |
| (R3 − R4)/(R3 + R4) | 0.31 |
| f1 [mm] | 21.47 |
| f2 [mm] | −13.78 |
| f2/f1 | −0.64 |
| f/fG1 | 1.00 |
| f1/CT1 | 13.42 |
| TD/f | 0.17 |
| TL/f | 1.42 |
| f/Lz | 2.12 |

TABLE 2C-continued

| Schematic Parameters | |
|---|---|
| Ly/Lz | 1.16 |
| Lz [mm] | 13.09 |
| TL/Y11 | 9.79 |
| ET2/CT2 | 1.61 |
| Y11/ImgH | 1.61 |
| (SAG11 + SAG22)/ET12 | 5.39 |
| (LOA2 + LOA3)/(LOA1 + LOA4) | 0.80 |
| Np | 1.773 |
| θa [deg.] | 60.0 |

3rd Embodiment

Figure 5:
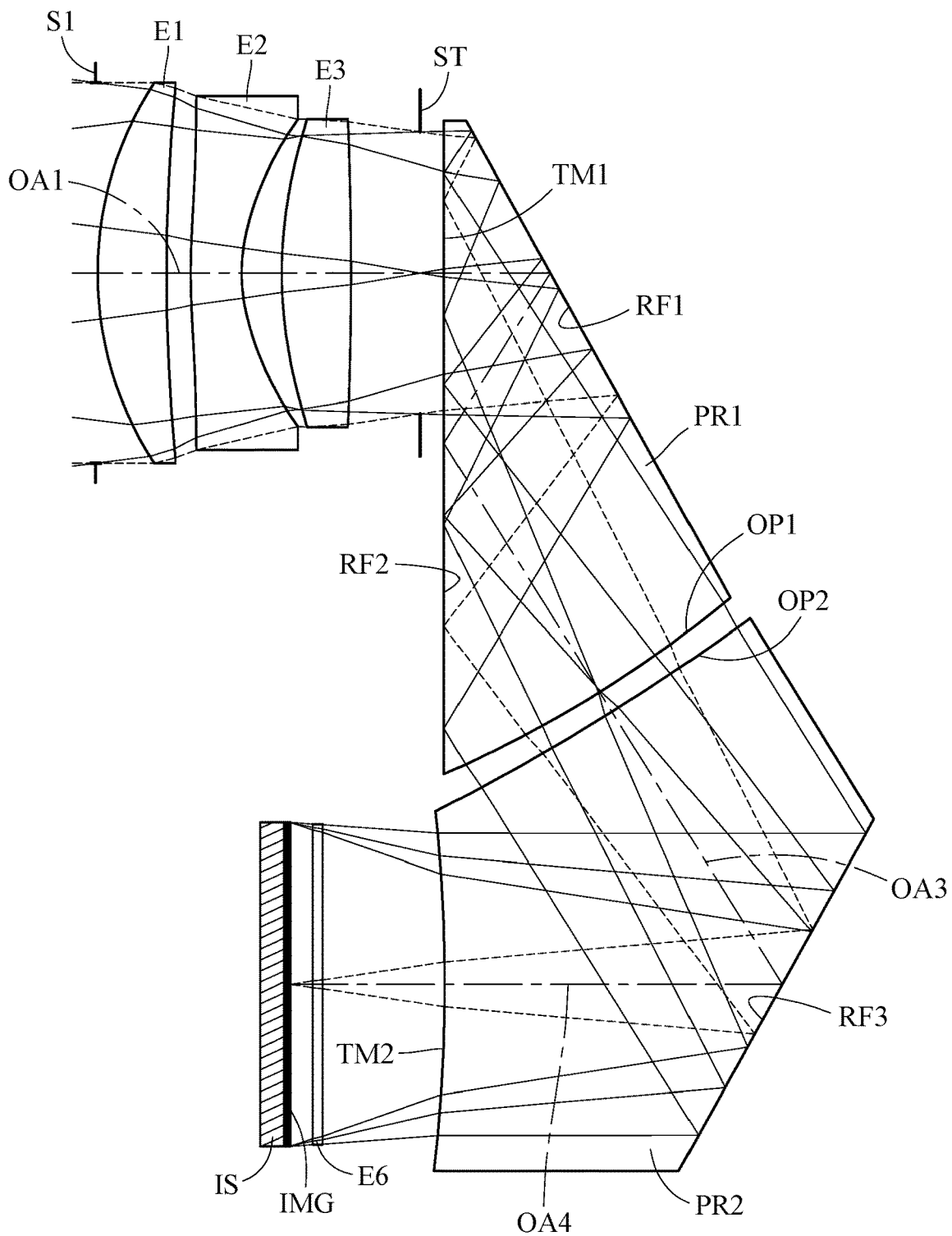
FIG. 5 is a schematic view of an image capturing unit according to the 3rd embodiment of the present disclosure.
Figure 6:
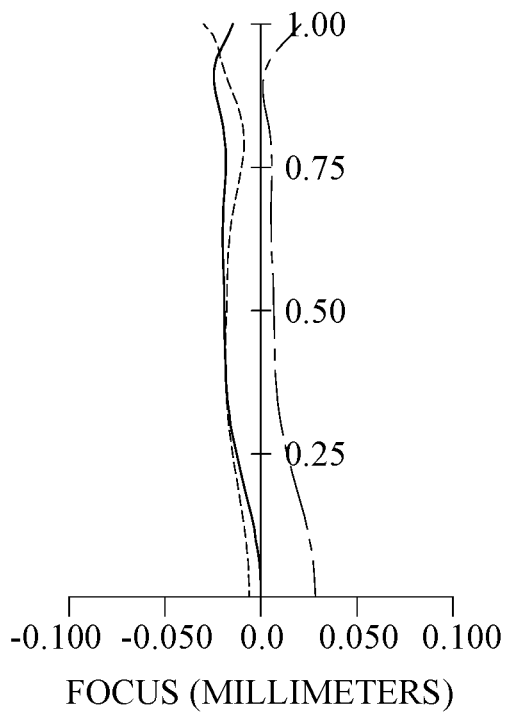
FIG. 6 shows spherical aberration curves and astigmatic field curves of the image capturing unit according to the 3rd embodiment.
Figure 6:
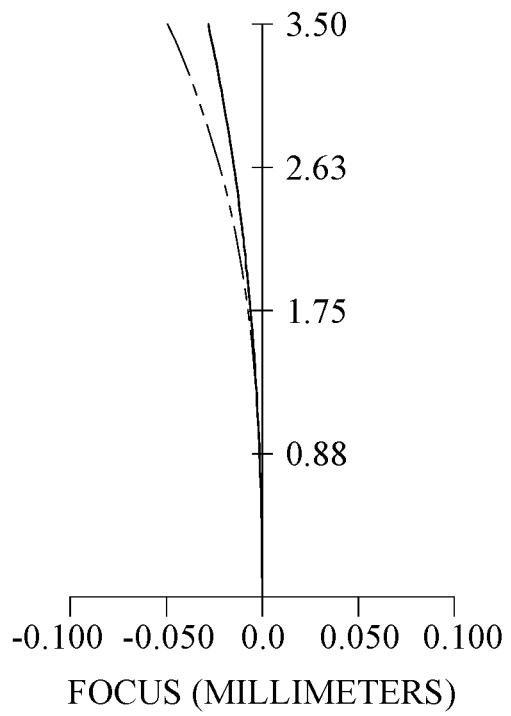

FIG. 5 is a schematic view of an image capturing unit according to the 3rd embodiment of the present disclosure. FIG. 6 shows, in order from left to right, spherical aberration curves and astigmatic field curves of the image capturing unit according to the 3rd embodiment. In FIG. 5, the image capturing unit 3 includes the folded optical system (its reference numeral is omitted) of the present disclosure and an image sensor IS. The folded optical system includes, in order from a light incident side to a light emitting side along a travelling direction of light on an optical path, a stop S1, a first lens element E1, a second lens element E2, a third lens element E3, an aperture stop ST, an optical folding assembly (its reference numeral is omitted), a filter E6 and an image surface IMG. Moreover, the said optical folding assembly includes a prism PR1 made of glass material and a prism PR2 made of glass material. The prism PR1 has a first transmissive surface TM1, a first reflective surface RF1, a second reflective surface RF2 and a first corresponsive surface OP1 sequentially along the travelling direction of light on the optical path. The prism PR2 has a second corresponsive surface OP2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 passes through the first corresponsive surface OP1 and the second corresponsive surface OP2 and then is redirected to a fourth optical axis OA4 by the third reflective surface RF3, and the optical path reaches the image surface IMG via the second transmissive surface TM2 along the fourth optical axis OA4.

The first transmissive surface TM1 and the second reflective surface RF2 are substantially the same plane. The first corresponsive surface OP1 is a spherical and convex surface facing towards the second corresponsive surface OP2. The second corresponsive surface OP2 is a spherical and concave surface facing towards the first corresponsive surface OP1. The second transmissive surface TM2 is a spherical concave surface facing towards the image surface IMG. The first optical axis OA1 is substantially parallel to a normal direction of the said plane where the first transmissive surface TM1 and the second reflective surface RF2 are located. The first optical axis OA1 is also substantially parallel to a normal direction of the image surface IMG. The folded optical system includes three lens elements (E1, E2 and E3) with no additional lens element disposed between each of the adjacent three lens elements. Further, the first lens element E1, the second lens element E2 and the third lens element E3 are located on the first optical axis OA1.

The first lens element E1 with positive refractive power has a light incident surface being convex in a paraxial region thereof and a light emitting surface being concave in a paraxial region thereof. The first lens element E1 is made of glass material and has the light incident surface and the light emitting surface being both spherical.

The second lens element E2 with negative refractive power has a light incident surface being convex in a paraxial region thereof and a light emitting surface being concave in a paraxial region thereof. The second lens element E2 is made of plastic material and has the light incident surface and the light emitting surface being both aspheric.

The third lens element E3 with positive refractive power has a light incident surface being convex in a paraxial region thereof and a light emitting surface being convex in a paraxial region thereof. The third lens element E3 is made of plastic material and has the light incident surface and the light emitting surface being both aspheric.

Among the three lens elements (E1, E2 and E3), the first lens element E1 has a refractive index larger than 1.63.

The filter E6 is made of glass material and located between the prism PR2 and the image surface IMG, and will not affect the focal length of the folded optical system. The image sensor IS is disposed on or near the image surface IMG of the folded optical system.

The detailed optical data of the 3rd embodiment are shown in Table 3A and the aspheric surface data are shown in Table 3B3 below.

TABLE 3A

3rd Embodiment
f = 28.01 mm, Fno = 3.40, HFOV = 7.1 deg.

| Surface # | | Curvature Radius | | Thickness | Material | Index | Abbe # | Refractive Power | Refractive/ Reflective |
|---|---|---|---|---|---|---|---|---|---|
| 0 | Object | Plano | | Infinity | | | | | Refractive |
| 1 | Stop | Plano | | 0.042 | | | | | Refractive |
| 2 | Lens 1 | 7.5037 | Convex (SPH) | 1.500 | Glass | 1.699 | 30.1 | Positive | Refractive |
| 3 | | 43.0702 | Concave (SPH) | 0.524 | | | | | Refractive |
| 4 | Lens 2 | 15.4181 | Convex (ASP) | 1.091 | Plastic | 1.614 | 25.6 | Negative | Refractive |
| 5 | | 3.7417 | Concave (ASP) | 0.870 | | | | | Refractive |
| 6 | Lens 3 | 9.1725 | Convex (ASP) | 1.500 | Plastic | 1.534 | 55.9 | Positive | Refractive |
| 7 | | −83.3333 | Convex (ASP) | 1.500 | | | | | Refractive |
| 8 | Ape. Stop | Plano | | 0.509 | | | | | Refractive |
| 9 | Prism | Plano | | 2.300 | Glass | 1.623 | 58.2 | | Refractive |
| 10 | | Plano | | −4.340 | | | | | Reflective |
| 11 | | Plano | | 6.360 | | | | | Reflective |
| 12 | | −25.8272 | (SPH) | 0.500 | | | | | Refractive |
| 13 | Prism | −50.1182 | (SPH) | 6.957 | Glass | 1.801 | 35.0 | | Refractive |
| 14 | | Plano | | −7.300 | | | | | Reflective |
| 15 | | 35.7810 | (SPH) | −2.648 | | | | | Refractive |
| 16 | Filter | Plano | | −0.210 | Glass | 1.517 | 64.2 | — | Refractive |
| 17 | | Plano | | −0.487 | | | | | Refractive |
| 18 | Image | Plano | | — | | | | | Refractive |

Note:
Reference wavelength is 587.6 nm (d-line).
An effective radius of the stop S1 (Surface 1) is 4.118 mm.
The first reflective surface RF1 (Surface 10) redirects the optical path along the first optical axis OA1 counterclockwise to the second optical axis OA2 by 58°.
The second reflective surface RF2 (Surface 11) redirects the optical path along the second optical axis OA2 clockwise to the third optical axis OA3 by 116°.
The third reflective surface RF3 (Surface 14) redirects the optical path along the third optical axis OA3 counterclockwise to the fourth optical axis OA4 by 58°.

TABLE 3B

Aspheric Coefficients

| Surface # | 4 | 5 | 6 | 7 |
|---|---|---|---|---|
| k = | −1.10321E+00 | −6.63613E−01 | −2.68837E+00 | −9.79158E+01 |
| A4 = | −4.579259E−03 | −7.164188E−03 | −1.175415E−03 | −3.308421E−04 |
| A6 = | 4.711033E−04 | 8.246542E−04 | 1.953736E−04 | 8.034081E−05 |
| A8 = | −3.800566E−05 | −7.832643E−05 | −9.846200E−06 | −5.198280E−06 |
| A10 = | 2.283863E−06 | 5.951966E−06 | — | — |
| A12 = | −9.299750E−08 | −3.459988E−07 | — | — |
| A14 = | 2.250639E−09 | 1.248037E−08 | — | — |
| A16 = | −2.396239E−11 | −1.950373E−10 | — | — |

In the 3rd embodiment, the equation of the axisymmetric aspheric surface profiles of the aforementioned lens elements is the same as the equation of the 1 st embodiment. Also, the definitions of these parameters shown in Table 3O are the same as those stated in the 1 st embodiment with corresponding values for the 3rd embodiment, so an explanation in this regard will not be provided again.

Moreover, these parameters can be calculated from Table 3A and Table 3B3 as the following values and satisfy the following conditions:

TABLE 3C

Schematic Parameters

| f [mm] | 28.01 |
|---|---|
| Fno | 3.40 |
| HFOV [deg.] | 7.1 |
| R1/R2 | 0.17 |
| (R3 − R4)/(R3 + R4) | 0.61 |
| f1 [mm] | 12.78 |
| f2 [mm] | −8.34 |
| f2/f1 | −0.65 |
| f/fG1 | 0.96 |
| f1/CT1 | 8.52 |
| TD/f | 0.20 |
| TL/f | 1.38 |
| f/Lz | 1.68 |
| Ly/Lz | 0.92 |
| Lz [mm] | 16.67 |
| TL/Y11 | 9.37 |
| ET2/CT2 | 2.01 |
| Y11/ImgH | 1.18 |
| (SAG11 + SAG22)/ET12 | 5.36 |
| (LOA2 + LOA3)/(LOA1 + LOA4) | 0.89 |
| Np | 1.623 |
| θa [deg.] | 58.0 |

4th Embodiment

Figure 7:
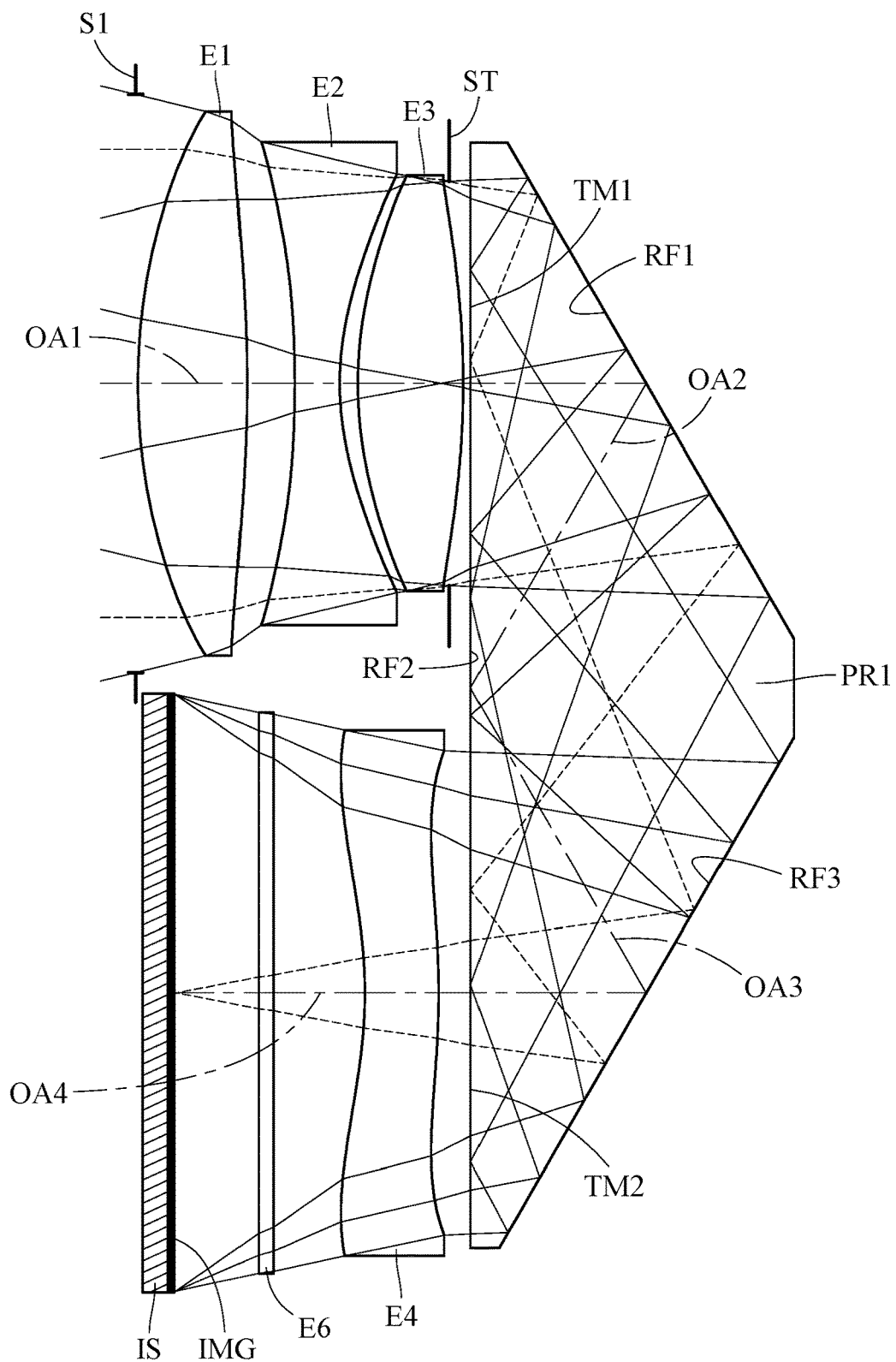
FIG. 7 is a schematic view of an image capturing unit according to the 4th embodiment of the present disclosure.
Figure 8:
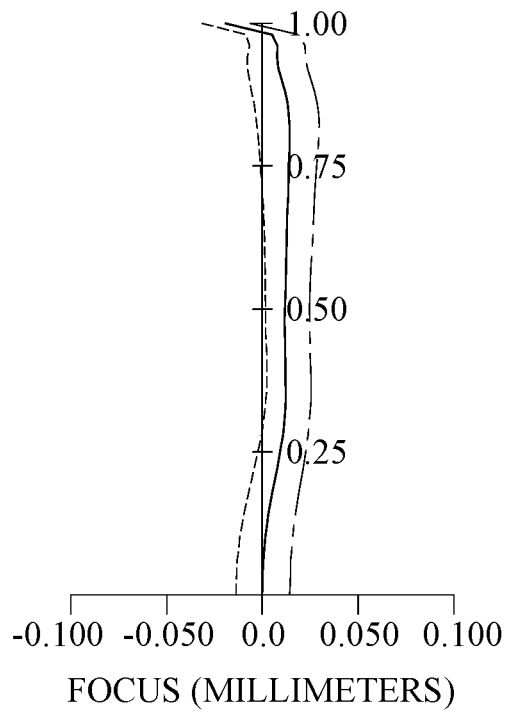
FIG. 8 shows spherical aberration curves and astigmatic field curves of the image capturing unit according to the 4th embodiment.
Figure 8:
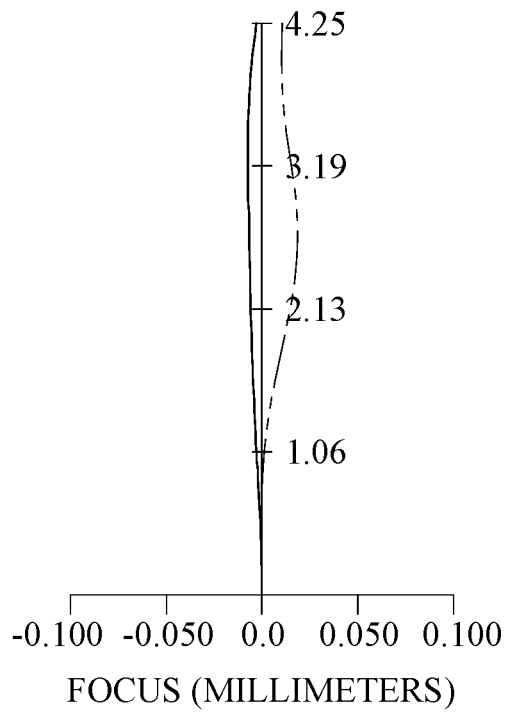

FIG. 7 is a schematic view of an image capturing unit according to the 4th embodiment of the present disclosure. FIG. 8 shows, in order from left to right, spherical aberration curves and astigmatic field curves of the image capturing unit according to the 4th embodiment. In FIG. 7, the image capturing unit 4 includes the folded optical system (its reference numeral is omitted) of the present disclosure and an image sensor IS. The folded optical system includes, in order from a light incident side to a light emitting side along a travelling direction of light on an optical path, a stop S1, a first lens element E1, a second lens element E2, a third lens element E3, an aperture stop ST, an optical folding assembly (its reference numeral is omitted), a fourth lens element E4, a filter E6 and an image surface IMG. Moreover, the said optical folding assembly includes a prism PR1 made of glass material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes four lens elements (E1, E2, E3 and E4) with no additional lens element disposed between each of the adjacent four lens elements. Further, the first lens element E1, the second lens element E2 and the third lens element E3 are located on the first optical axis OA1, and the fourth lens element E4 is located on the fourth optical axis OA4.

The first lens element E1 with positive refractive power has a light incident surface being convex in a paraxial region thereof and a light emitting surface being convex in a paraxial region thereof. The first lens element E1 is made of plastic material and has the light incident surface and the light emitting surface being both aspheric.

The second lens element E2 with negative refractive power has a light incident surface being concave in a paraxial region thereof and a light emitting surface being concave in a paraxial region thereof. The second lens element E2 is made of plastic material and has the light incident surface and the light emitting surface being both aspheric.

The third lens element E3 with positive refractive power has a light incident surface being convex in a paraxial region thereof and a light emitting surface being convex in a paraxial region thereof. The third lens element E3 is made of plastic material and has the light incident surface and the light emitting surface being both aspheric.

The fourth lens element E4 with negative refractive power has a light incident surface being convex in a paraxial region thereof and a light emitting surface being concave in a paraxial region thereof. The fourth lens element E4 is made of glass material and has the light incident surface and the light emitting surface being both aspheric.

Among the four lens elements (E1, E2, E3 and E4), the fourth lens element E4 has a refractive index larger than 1.63.

The filter E6 is made of glass material and located between the fourth lens element E4 and the image surface IMG, and will not affect the focal length of the folded optical system. The image sensor IS is disposed on or near the image surface IMG of the folded optical system.

The detailed optical data of the 4th embodiment are shown in Table 4A and the aspheric surface data are shown in Table 4B3 below.

TABLE 4A

4th Embodiment
f = 17.49 mm, Fno = 2.63, HFOV = 13.5 deg.

| Surface # | | Curvature Radius | | Thickness | Material | Index | Abbe # | Refractive Power | Refractive/ Reflective |
|---|---|---|---|---|---|---|---|---|---|
| 0 | Object | | Plano | Infinity | | | | | Refractive |
| 1 | Stop | | Plano | 0.030 | | | | | Refractive |
| 2 | Lens 1 | 8.5628 | Convex (ASP) | 1.550 | Plastic | 1.562 | 44.6 | Positive | Refractive |
| 3 | | −21.1843 | Convex (ASP) | 0.676 | | | | | Refractive |
| 4 | Lens 2 | −19.1253 | Concave (ASP) | 0.640 | Plastic | 1.566 | 37.4 | Negative | Refractive |
| 5 | | 4.0995 | Concave (ASP) | 0.260 | | | | | Refractive |
| 6 | Lens 3 | 5.9044 | Convex (ASP) | 1.500 | Plastic | 1.544 | 56.0 | Positive | Refractive |
| 7 | | −12.6718 | Convex (ASP) | −0.200 | | | | | Refractive |
| 8 | Ape. Stop | | Plano | 0.300 | | | | | Refractive |
| 9 | Prism | | Plano | 2.500 | Glass | 1.548 | 45.8 | | Refractive |
| 10 | | | Plano | −5.000 | | | | | Reflective |
| 11 | | | Plano | 5.000 | | | | | Reflective |
| 12 | | | Plano | −2.500 | | | | | Reflective |
| 13 | | | Plano | −0.450 | | | | | Refractive |
| 14 | Lens 4 | −11.5692 | Convex (ASP) | −1.052 | Glass | 1.911 | 35.3 | Negative | Refractive |
| 15 | | −6.5887 | Concave (ASP) | −1.300 | | | | | Refractive |
| 16 | Filter | | Plano | −0.210 | Glass | 1.517 | 64.2 | — | Refractive |
| 17 | | | Plano | −1.194 | | | | | Refractive |
| 18 | Image | | Plano | — | | | | | Refractive |

Note:
Reference wavelength is 587.6 nm (d-line).
An effective radius of the stop S1 (Surface 1) is 4.111 mm.
The first reflective surface RF1 (Surface 10) redirects the optical path along the first optical axis OA1 counterclockwise to the second optical axis OA2 by 60°.
The second reflective surface RF2 (Surface 11) redirects the optical path along the second optical axis OA2 clockwise to the third optical axis OA3 by 120°.
The third reflective surface RF3 (Surface 12) redirects the optical path along the third optical axis OA3 counterclockwise to the fourth optical axis OA4 by 60°.

TABLE 4B

Aspheric Coefficients

| Surface # | 2 | 3 | 4 | 5 |
|---|---|---|---|---|
| k = | 1.23442E+00 | −5.92628E+01 | 3.44669E+00 | −7.15265E−01 |
| A4 = | −3.413420E−04 | −8.413219E−05 | −5.774909E−03 | −7.408648E−03 |
| A6 = | −3.378834E−05 | −2.422050E−04 | 7.168237E−04 | 2.015662E−04 |
| A8 = | 1.247871E−05 | 1.286721E−04 | 2.037909E−04 | 3.577527E−04 |
| A10 = | −1.520306E−06 | −2.627236E−05 | −9.450781E−05 | −1.521777E−04 |
| A12 = | 8.089454E−08 | 2.823827E−06 | 1.674201E−05 | 3.693015E−05 |
| A14 = | −1.449763E−09 | −1.680528E−07 | −1.643364E−06 | −6.163124E−06 |
| A16 = | – | 5.243260E−09 | 9.395796E−08 | 6.748579E−07 |
| A18 = | – | −6.710577E−11 | −2.961129E−09 | −4.177610E−08 |
| A20 = | – | – | 4.032502E−11 | 1.078225E−09 |

| Surface # | 6 | 7 | 14 | 15 |
|---|---|---|---|---|
| k = | −1.74969E+00 | 7.56121E+00 | −1.15660E+00 | −8.13990E+00 |
| A4 = | 1.286131E−03 | 1.122411E−03 | 4.792739E−03 | 2.466227E−03 |
| A6 = | −9.351500E−04 | −1.916555E−05 | −9.552333E−05 | −1.875640E−05 |
| A8 = | 3.343248E−04 | 2.190632E−05 | 3.715757E−06 | 9.471890E−07 |
| A10 = | −1.128307E−04 | −1.567682E−05 | | |
| A12 = | 3.213339E−05 | 5.379903E−06 | | |
| A14 = | −6.228648E−06 | −9.215609E−07 | | |
| A16 = | 7.229629E−07 | 7.863570E−08 | | |
| A18 = | −4.441559E−08 | −2.611292E−09 | | |
| A20 = | 1.100770E−09 | −9.967054E−13 | | |

In the 4th embodiment, the equation of the axisymmetric aspheric surface profiles of the aforementioned lens elements is the same as the equation of the 1 st embodiment. Also, the definitions of these parameters shown in Table 40 are the same as those stated in the 1 st embodiment with corresponding values for the 4th embodiment, so an explanation in this regard will not be provided again.

Moreover, these parameters can be calculated from Table 4A and Table 4B as the following values and satisfy the following conditions:

TABLE 4C

Schematic Parameters

| | |
|---|---|
| f [mm] | 17.49 |
| Fno | 2.63 |
| HFOV [deg.] | 13.5 |
| R1/R2 | −0.40 |
| (R3 − R4)/(R3 + R4) | 1.55 |
| f1 [mm] | 11.06 |
| f2 [mm] | −5.91 |
| f2/f1 | −0.53 |
| f/fG1 | 1.10 |
| f1/CT1 | 7.14 |
| TD/f | 1.21 |
| TL/f | 1.37 |
| f/Lz | 1.91 |
| Ly/Lz | 0.95 |
| Lz [mm] | 9.14 |
| TL/Y11 | 6.18 |
| ET2/CT2 | 3.01 |
| Y11/ImgH | 0.91 |
| (SAG11 + SAG22)/ET12 | 4.28 |
| (LOA2 + LOA3)/(LOA1 + LOA4) | 0.72 |
| Np | 1.548 |
| θa [deg.] | 60.0 |

5th Embodiment

Figure 9:
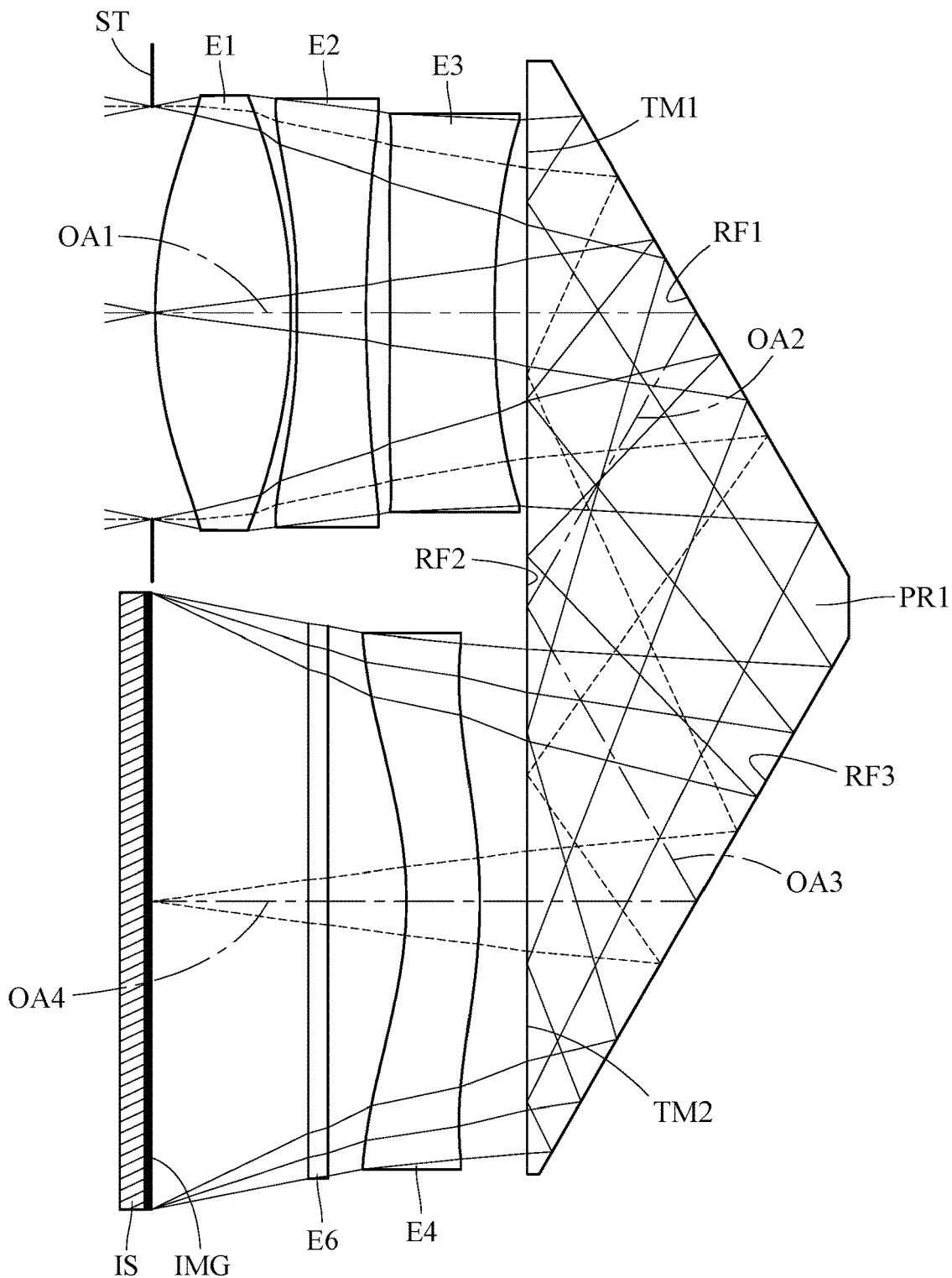
FIG. 9 is a schematic view of an image capturing unit according to the 5th embodiment of the present disclosure.
Figure 10:
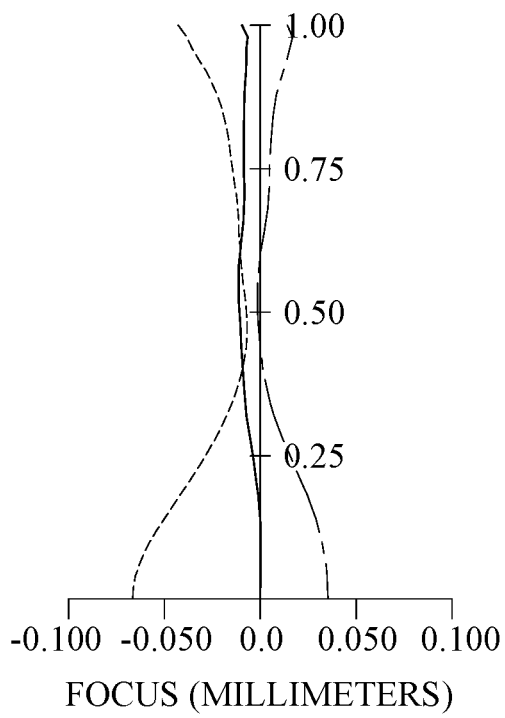
FIG. 10 shows spherical aberration curves and astigmatic field curves of the image capturing unit according to the 5th embodiment.
Figure 10:
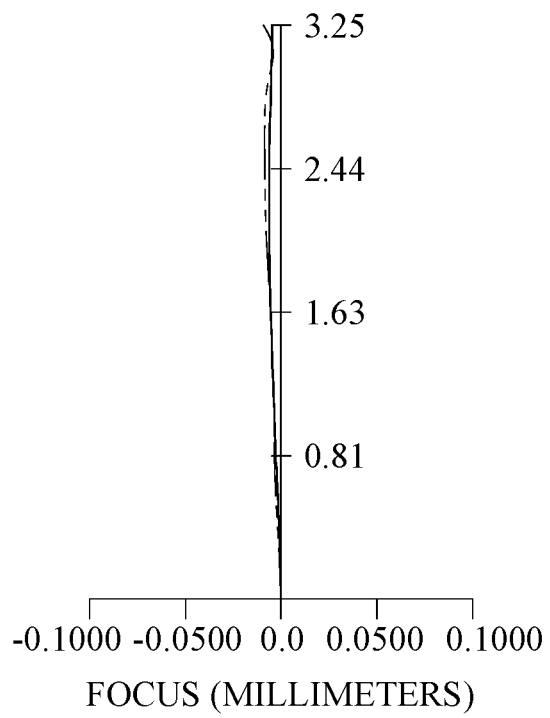

FIG. 9 is a schematic view of an image capturing unit according to the 5th embodiment of the present disclosure. FIG. 10 shows, in order from left to right, spherical aberration curves and astigmatic field curves of the image capturing unit according to the 5th embodiment. In FIG. 9, the image capturing unit 5 includes the folded optical system (its reference numeral is omitted) of the present disclosure and an image sensor IS. The folded optical system includes, in order from a light incident side to a light emitting side along a travelling direction of light on an optical path, an aperture stop ST, a first lens element E1, a second lens element E2, a third lens element E3, an optical folding assembly (its reference numeral is omitted), a fourth lens element E4, a filter E6 and an image surface IMG. Moreover, the said optical folding assembly includes a prism PR1 made of plastic material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes four lens elements (E1, E2, E3 and E4) with no additional lens element disposed between each of the adjacent four lens elements. Further, the first lens element E1, the second lens element E2 and the third lens element E3 are located on the first optical axis OA1, and the fourth lens element E4 is located on the fourth optical axis OA4.

The first lens element E1 with positive refractive power has a light incident surface being convex in a paraxial region thereof and a light emitting surface being convex in a paraxial region thereof. The first lens element E1 is made of plastic material and has the light incident surface and the light emitting surface being both aspheric.

The second lens element E2 with negative refractive power has a light incident surface being convex in a paraxial region thereof and a light emitting surface being concave in a paraxial region thereof. The second lens element E2 is made of plastic material and has the light incident surface and the light emitting surface being both aspheric.

The third lens element E3 with negative refractive power has a light incident surface being concave in a paraxial region thereof and a light emitting surface being concave in a paraxial region thereof. The third lens element E3 is made of plastic material and has the light incident surface and the light emitting surface being both aspheric.

The fourth lens element E4 with negative refractive power has a light incident surface being convex in a paraxial region thereof and a light emitting surface being concave in a paraxial region thereof. The fourth lens element E4 is made of plastic material and has the light incident surface and the light emitting surface being both aspheric.

The filter E6 is made of glass material and located between the fourth lens element E4 and the image surface IMG, and will not affect the focal length of the folded optical system. The image sensor IS is disposed on or near the image surface IMG of the folded optical system.

The detailed optical data of the 5th embodiment are shown in Table 5A and the aspheric surface data are shown in Table 5B3 below.

TABLE 5A

5th Embodiment
f = 15.88 mm, Fno = 3.65, HFOV = 11.4 deg.

| Surface # | | Curvature Radius | | Thickness | Material | Index | Abbe # | Refractive Power | Refractive/ Reflective |
|---|---|---|---|---|---|---|---|---|---|
| 0 | Object | | Plano | Infinity | | | | | Refractive |
| 1 | Ape. Stop | | Plano | 0.030 | | | | | Refractive |
| 2 | Lens 1 | 4.8878 | Convex (ASP) | 1.426 | Plastic | 1.544 | 56.0 | Positive | Refractive |
| 3 | | −12.1905 | Convex (ASP) | 0.066 | | | | | Refractive |
| 4 | Lens 2 | 752.6558 | Convex (ASP) | 0.730 | Plastic | 1.566 | 37.4 | Negative | Refractive |
| 5 | | 9.6614 | Concave (ASP) | 0.254 | | | | | Refractive |
| 6 | Lens 3 | −141.0637 | Concave (ASP) | 1.100 | Plastic | 1.566 | 37.4 | Negative | Refractive |
| 7 | | 11.4822 | Concave (ASP) | 0.343 | | | | | Refractive |
| 8 | Prism | | Plano | 1.790 | Plastic | 1.543 | 56.5 | | Refractive |
| 9 | | | Plano | −3.580 | | | | | Reflective |
| 10 | | | Plano | 3.580 | | | | | Reflective |
| 11 | | | Plano | −1.790 | | | | | Reflective |
| 12 | | | Plano | −0.500 | | | | | Refractive |
| 13 | Lens 4 | −6.0317 | Convex (ASP) | −0.770 | Plastic | 1.544 | 56.0 | Negative | Refractive |
| 14 | | −4.2213 | Concave (ASP) | −0.827 | | | | | Refractive |
| 15 | Filter | | Plano | −0.210 | Glass | 1.517 | 64.2 | — | Refractive |
| 16 | | | Plano | −1.653 | | | | | Refractive |
| 17 | Image | | Plano | — | | | | | Refractive |

Note:
Reference wavelength is 587.6 nm (d-line).
The first reflective surface RF1 (Surface 9) redirects the optical path along the first optical axis OA1 counterclockwise to the second optical axis OA2 by 60°.
The second reflective surface RF2 (Surface 10) redirects the optical path along the second optical axis OA2 clockwise to the third optical axis OA3 by 120°.
The third reflective surface RF3 (Surface 11) redirects the optical path along the third optical axis OA3 counterclockwise to the fourth optical axis OA4 by 60°.

TABLE 5B

Aspheric Coefficients

| Surface # | 2 | 3 | 4 | 5 |
|---|---|---|---|---|
| k = | −1.68300E+00 | 2.17419E+01 | −1.00000E+00 | 4.59480E+00 |
| A4 = | 1.597992E−03 | −9.151251E−02 | −1.140397E−01 | −3.866723E−02 |
| A6 = | −1.054531E−03 | 8.823071E−02 | 9.872078E−02 | 2.741872E−02 |
| A8 = | 1.291350E−03 | −4.801470E−02 | −4.653961E−02 | −1.062726E−02 |
| A10 = | −1.088331E−03 | 1.663959E−02 | 1.191214E−02 | 6.464545E−03 |
| A12 = | 5.697431E−04 | −3.905771E−03 | −1.410492E−03 | −6.729307E−03 |
| A14 = | −1.903268E−04 | 6.498331E−04 | 2.993119E−05 | 4.146135E−03 |
| A16 = | 3.829885E−05 | −7.655437E−05 | −6.493248E−07 | −1.366647E−03 |
| A18 = | −4.224892E−06 | 5.742659E−06 | 2.106161E−06 | 2.433027E−04 |
| A20 = | 1.961966E−07 | −1.983910E−07 | −2.060641E−07 | −2.178277E−05 |
| A22 = | — | — | — | 7.450928E−07 |

| Surface # | 6 | 7 | 13 | 14 |
|---|---|---|---|---|
| k = | −1.00000E+00 | 1.17169E+01 | −1.67437E+01 | −1.44781E+00 |
| A4 = | −9.106848E−03 | 4.144417E−03 | 2.215885E−04 | 1.004230E−02 |
| A6 = | 9.598916E−03 | 7.883459E−05 | 1.461886E−03 | −1.692981E−03 |
| A8 = | −1.532514E−03 | 8.725453E−04 | −5.227100E−04 | 9.180525E−04 |
| A10 = | 5.769506E−04 | −1.226983E−03 | 3.210361E−04 | −3.628594E−04 |
| A12 = | −2.216795E−03 | 7.034292E−04 | −1.597762E−04 | 9.864710E−05 |
| A14 = | 1.707397E−03 | −2.003151E−04 | 4.952069E−05 | −2.101864E−05 |
| A16 = | −5.666027E−04 | 2.442506E−05 | −9.411864E−06 | 3.826266E−06 |
| A18 = | 8.850712E−05 | −1.029259E−08 | 1.073302E−06 | −5.596829E−07 |
| A20 = | −5.346868E−06 | −1.699484E−07 | −6.753332E−08 | 5.651011E−08 |
| A22 = | — | — | 1.804983E−09 | −3.318675E−09 |
| A24 = | — | — | — | 8.395043E−11 |

In the 5th embodiment, the equation of the axisymmetric aspheric surface profiles of the aforementioned lens elements is the same as the equation of the 1 st embodiment. Also, the definitions of these parameters shown in Table 50 are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | |
|---|---|
| f [mm] | 15.88 |
| Fno | 3.65 |
| HFOV [deg.] | 11.4 |
| R1/R2 | −0.40 |
| (R3 − R4)/(R3 + R4) | 0.97 |
| f1 [mm] | 6.61 |
| f2 [mm] | −17.30 |
| f2/f1 | −2.62 |
| f/fG1 | 1.04 |
| f1/CT1 | 4.63 |
| TD/f | 1.00 |
| TL/f | 1.17 |
| f/Lz | 2.22 |
| Ly/Lz | 0.87 |
| Lz [mm] | 7.17 |
| TL/Y11 | 8.17 |
| ET2/CT2 | 1.48 |
| Y11/ImgH | 0.70 |
| (SAG11 + SAG22)/ET12 | 2.05 |
| (LOA2 + LOA3)/(LOA1 + LOA4) | 0.62 |
| Np | 1.543 |
| θa [deg.] | 60.0 |

6th Embodiment

Figure 11:
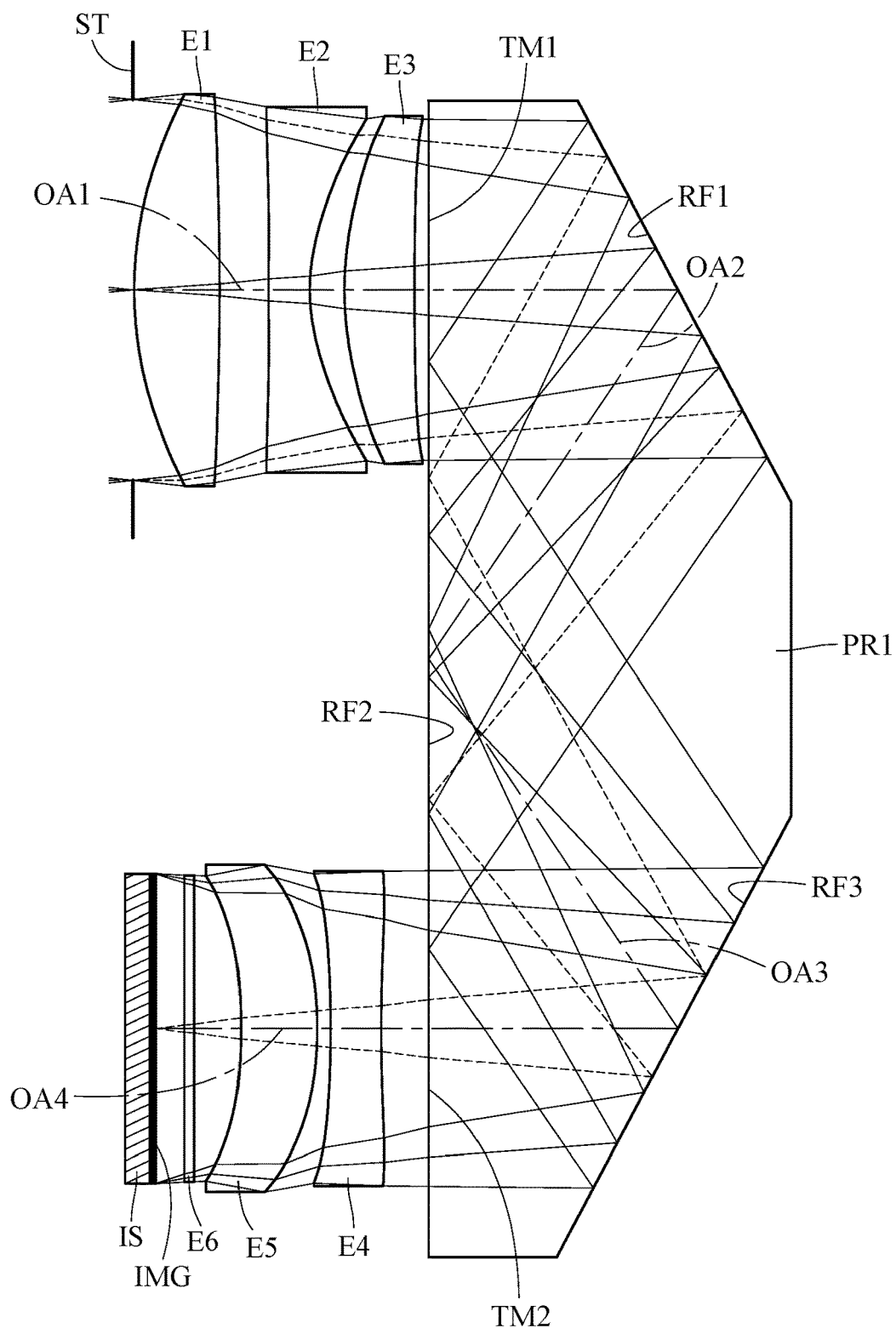
FIG. 11 is a schematic view of an image capturing unit according to the 6th embodiment of the present disclosure.
Figure 12:
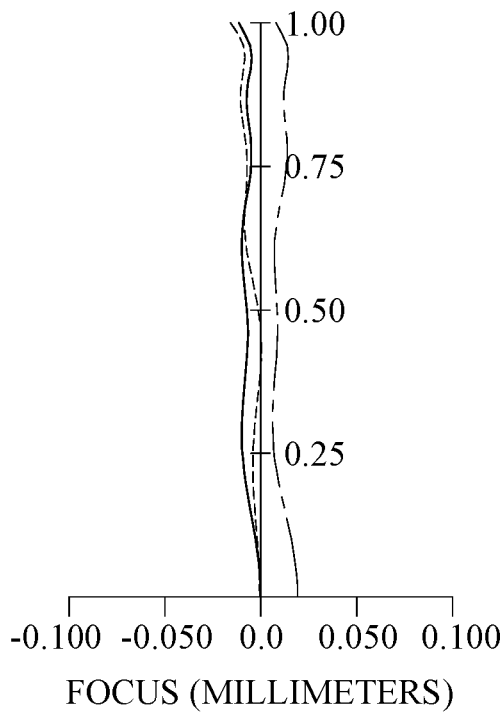
FIG. 12 shows spherical aberration curves and astigmatic field curves of the image capturing unit according to the 6th embodiment.
Figure 12:
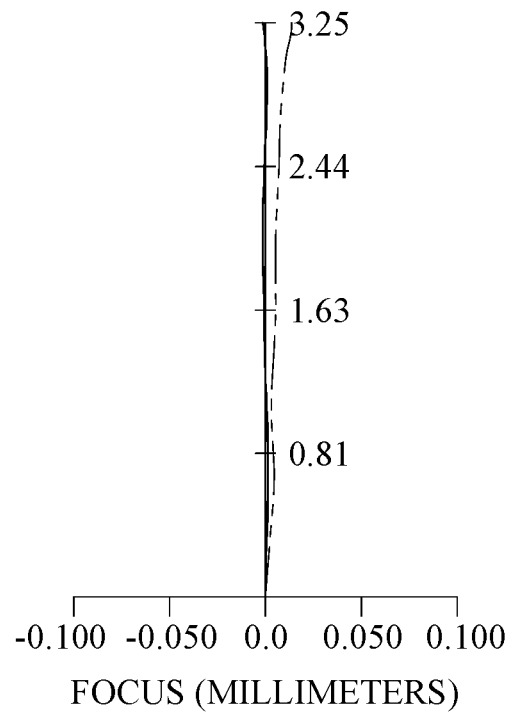

FIG. 11 is a schematic view of an image capturing unit according to the 6th embodiment of the present disclosure. FIG. 12 shows, in order from left to right, spherical aberration curves and astigmatic field curves of the image capturing unit according to the 6th embodiment. In FIG. 11, the image capturing unit 6 includes the folded optical system (its reference numeral is omitted) of the present disclosure and an image sensor IS. The folded optical system includes, in order from a light incident side to a light emitting side along a travelling direction of light on an optical path, an aperture stop ST, a first lens element E1, a second lens element E2, a third lens element E3, an optical folding assembly (its reference numeral is omitted), a fourth lens element E4, a fifth lens element E5, a filter E6 and an image surface IMG. Moreover, the said optical folding assembly includes a prism PR1 made of plastic material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes five lens elements (E1, E2, E3, E4 and E5) with no additional lens element disposed between each of the adjacent five lens elements. Further, the first lens element E1, the second lens element E2 and the third lens element E3 are located on the first optical axis OA1, and the fourth lens element E4 and the fifth lens element E5 are located on the fourth optical axis OA4.

The first lens element E1 with positive refractive power has a light incident surface being convex in a paraxial region thereof and a light emitting surface being convex in a paraxial region thereof. The first lens element E1 is made of plastic material and has the light incident surface and the light emitting surface being both aspheric.

The second lens element E2 with negative refractive power has a light incident surface being convex in a paraxial region thereof and a light emitting surface being concave in a paraxial region thereof. The second lens element E2 is made of plastic material and has the light incident surface and the light emitting surface being both aspheric.

The third lens element E3 with positive refractive power has a light incident surface being convex in a paraxial region thereof and a light emitting surface being concave in a paraxial region thereof. The third lens element E3 is made of plastic material and has the light incident surface and the light emitting surface being both aspheric.

The fourth lens element E4 with negative refractive power has a light incident surface being concave in a paraxial region thereof and a light emitting surface being concave in a paraxial region thereof. The fourth lens element E4 is made of plastic material and has the light incident surface and the light emitting surface being both aspheric.

The fifth lens element E5 with positive refractive power has a light incident surface being convex in a paraxial region thereof and a light emitting surface being concave in a paraxial region thereof. The fifth lens element E5 is made of plastic material and has the light incident surface and the light emitting surface being both aspheric.

Among the five lens elements (E1, E2, E3, E4 and E5), the fourth lens element E4 has a refractive index larger than 1.63.

The filter E6 is made of glass material and located between the fifth lens element E5 and the image surface IMG, and will not affect the focal length of the folded optical system. The image sensor IS is disposed on or near the image surface IMG of the folded optical system.

The detailed optical data of the 6th embodiment are shown in Table 6A and the aspheric surface data are shown in Table 6B below.

TABLE 6A

6th Embodiment
f = 30.87 mm, Fno = 3.86, HFOV = 6.0 deg.

| Surface # | | Curvature Radius | | Thickness | Material | Index | Abbe # | Refractive Power | Refractive/ Reflective |
|---|---|---|---|---|---|---|---|---|---|
| 0 | Object | | Plano | Infinity | | | | | Refractive |
| 1 | Ape. Stop | | Plano | 0.030 | | | | | Refractive |
| 2 | Lens 1 | 7.9817 | Convex (ASP) | 1.800 | Plastic | 1.534 | 55.9 | Positive | Refractive |
| 3 | | −58.1437 | Convex (ASP) | 1.019 | | | | | Refractive |
| 4 | Lens 2 | 56.3930 | Convex (ASP) | 0.866 | Plastic | 1.566 | 37.4 | Negative | Refractive |
| 5 | | 3.9820 | Concave (ASP) | 0.731 | | | | | Refractive |
| 6 | Lens 3 | 6.8105 | Convex (ASP) | 1.474 | Plastic | 1.562 | 44.6 | Positive | Refractive |
| 7 | | 83.3333 | Concave (ASP) | 0.300 | | | | | Refractive |
| 8 | Prism | | Plano | 5.235 | Plastic | 1.534 | 55.9 | | Refractive |
| 9 | | | Plano | −9.361 | | | | | Reflective |
| 10 | | | Plano | 9.361 | | | | | Reflective |
| 11 | | | Plano | −5.235 | | | | | Reflective |
| 12 | | | Plano | −1.000 | | | | | Refractive |
| 13 | Lens 4 | 41.3240 | Concave (ASP) | −1.066 | Plastic | 1.639 | 23.5 | Negative | Refractive |
| 14 | | −28.1557 | Concave (ASP) | −0.280 | | | | | Refractive |
| 15 | Lens 5 | −8.3101 | Convex (ASP) | −1.600 | Plastic | 1.544 | 56.0 | Positive | Refractive |
| 16 | | −13.8292 | Concave (ASP) | −0.980 | | | | | Refractive |
| 17 | Filter | | Plano | −0.210 | Glass | 1.517 | 64.2 | — | Refractive |
| 18 | | | Plano | −0.595 | | | | | Refractive |
| 19 | Image | | Plano | — | | | | | Refractive |

Note:
Reference wavelength is 587.6 nm (d-line).
The first reflective surface RF1 (Surface 9) redirects the optical path along the first optical axis OA1 counterclockwise to the second optical axis OA2 by 56°.
The second reflective surface RF2 (Surface 10) redirects the optical path along the second optical axis OA2 clockwise to the third optical axis OA3 by 112°.
The third reflective surface RF3 (Surface 11) redirects the optical path along the third optical axis OA3 counterclockwise to the fourth optical axis OA4 by 56°.

TABLE 6B

| Aspheric Coefficients | | | | |
|---|---|---|---|---|
| Surface # | 2 | 3 | 4 | 5 |
| k = | −2.15042E−01 | 5.09567E+01 | −9.26178E+01 | −7.31615E−01 |
| A4 = | −1.305238E−04 | 4.382971E−04 | −4.658402E−03 | −9.848944E−03 |
| A6 = | 2.973712E−06 | −2.214398E−05 | 9.028321E−04 | 1.498091E−03 |
| A8 = | −4.928156E−07 | 2.888402E−07 | −1.160745E−04 | −1.848447E−04 |
| A10 = | — | — | 1.029059E−05 | 1.752168E−05 |
| A12 = | — | — | −5.903177E−07 | −1.145631E−06 |
| A14 = | — | — | 1.954155E−08 | 4.355529E−08 |
| A16 = | — | — | −2.809967E−10 | −7.202408E−10 |

| Surface # | 6 | 7 | 13 | 14 |
|---|---|---|---|---|
| k = | −3.20549E+00 | −9.90000E+01 | −9.90000E+01 | 3.01386E+01 |
| A4 = | −2.109116E−03 | −1.168840E−04 | 7.859794E−04 | −1.419844E−03 |
| A6 = | 2.454173E−04 | 5.796627E−05 | −2.033914E−04 | 3.243673E−04 |
| A8 = | −6.908214E−06 | −2.367616E−07 | 6.515382E−06 | −4.951104E−05 |
| A10 = | — | — | — | 1.927022E−06 |

| Surface # | 15 | 16 |
|---|---|---|
| k = | 1.21670E+00 | 1.02705E+01 |
| A4 = | −5.974463E−03 | −8.193628E−01 |
| A6 = | 1.135747E−03 | 3.121138E+00 |
| A8 = | −1.758946E−04 | −1.463700E+01 |
| A10 = | 1.863110E−05 | 5.043713E+01 |
| A12 = | −5.596214E−07 | −1.199198E+02 |
| A14 = | −1.794516E−07 | 1.977845E+02 |
| A16 = | 2.703928E−08 | −2.221294E+02 |
| A18 = | −1.551547E−09 | 1.611044E+02 |
| A20 = | 3.341190E−11 | −6.771964E+01 |
| A22 = | — | 1.249970E+01 |

In the 6th embodiment, the equation of the axisymmetric aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Schematic Parameters

| | |
|---|---|
| f [mm] | 30.87 |
| Fno | 3.86 |
| HFOV [deg.] | 6.0 |
| R1/R2 | −0.14 |
| (R3 − R4)/(R3 + R4) | 0.87 |
| f1 [mm] | 13.27 |
| f2 [mm] | −7.62 |
| f2/f1 | −0.57 |
| f/fG1 | 1.01 |
| f1/CT1 | 7.37 |
| TD/f | 1.27 |
| TL/f | 1.33 |
| f/Lz | 2.32 |
| Ly/Lz | 1.16 |
| Lz [mm] | 13.32 |
| TL/Y11 | 9.99 |
| ET2/CT2 | 2.43 |
| Y11/ImgH | 1.27 |
| (SAG11 + SAG22)/ET12 | 2.08 |
| (LOA2 + LOA3)/(LOA1 + LOA4) | 0.84 |
| Np | 1.534 |
| θa [deg.] | 56.0 |

7th Embodiment

Figure 13:
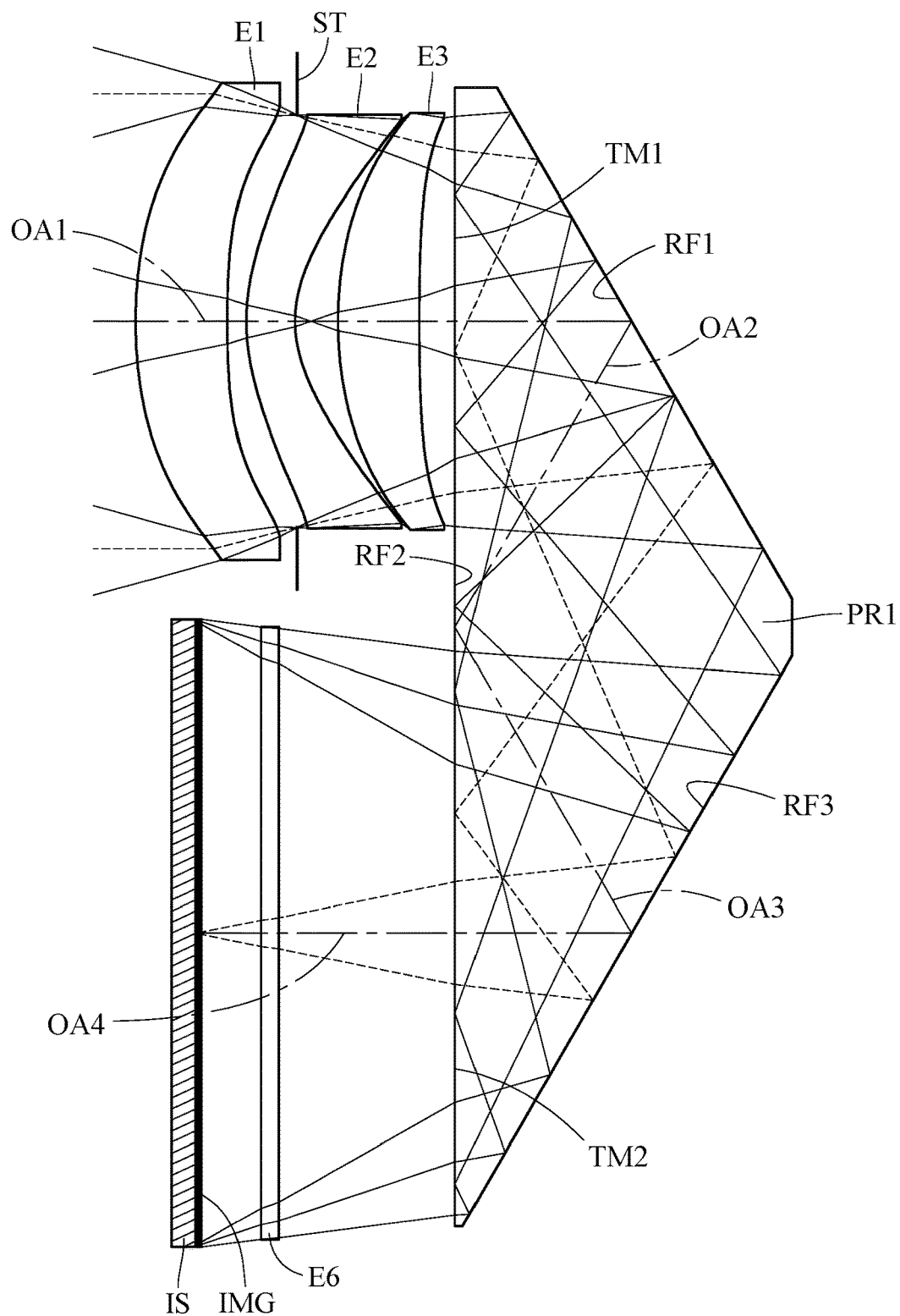
FIG. 13 is a schematic view of an image capturing unit according to the 7th embodiment of the present disclosure.
Figure 14:
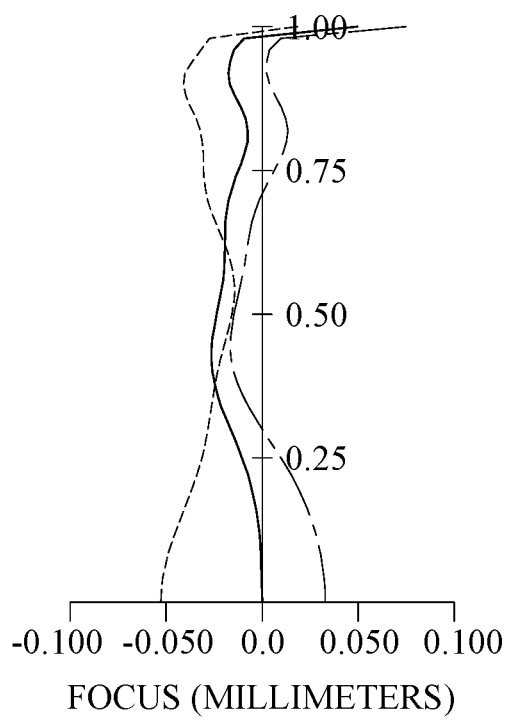
FIG. 14 shows spherical aberration curves and astigmatic field curves of the image capturing unit according to the 7th embodiment.
Figure 14:
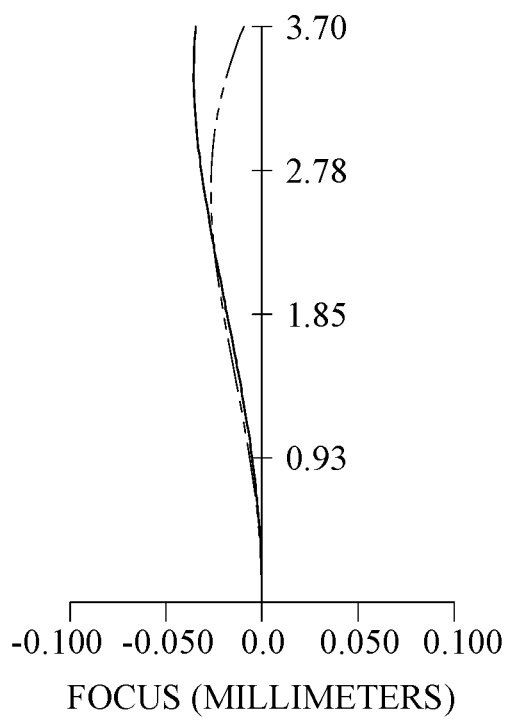

FIG. 13 is a schematic view of an image capturing unit according to the 7th embodiment of the present disclosure. FIG. 14 shows, in order from left to right, spherical aberration curves and astigmatic field curves of the image capturing unit according to the 7th embodiment. In FIG. 13, the image capturing unit 7 includes the folded optical system (its reference numeral is omitted) of the present disclosure and an image sensor IS. The folded optical system includes, in order from a light incident side to a light emitting side along a travelling direction of light on an optical path, a first lens element E1, an aperture stop ST, a second lens element E2, a third lens element E3, an optical folding assembly (its reference numeral is omitted), a filter E6 and an image surface IMG. Moreover, the said optical folding assembly includes a prism PR1 made of glass material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes three lens elements (E1, E2 and E3) with no additional lens element disposed between each of the adjacent three lens elements. Further, the first lens element E1, the second lens element E2 and the third lens element E3 are located on the first optical axis OA1.

The first lens element E1 with positive refractive power has a light incident surface being convex in a paraxial region thereof and a light emitting surface being concave in a paraxial region thereof. The first lens element E1 is made of plastic material and has the light incident surface and the light emitting surface being both aspheric.

The second lens element E2 with negative refractive power has a light incident surface being convex in a paraxial region thereof and a light emitting surface being concave in a paraxial region thereof. The second lens element E2 is made of plastic material and has the light incident surface and the light emitting surface being both aspheric.

The third lens element E3 with positive refractive power has a light incident surface being convex in a paraxial region thereof and a light emitting surface being concave in a paraxial region thereof. The third lens element E3 is made of glass material and has the light incident surface and the light emitting surface being both aspheric.

Among the three lens elements (E1, E2 and E3), the second lens element E2 and the third lens element E3 each have a refractive index larger than 1.63.

The filter E6 is made of glass material and located between the prism PR1 and the image surface IMG, and will not affect the focal length of the folded optical system. The image sensor IS is disposed on or near the image surface IMG of the folded optical system.

The detailed optical data of the 7th embodiment are shown in Table 7A and the aspheric surface data are shown in Table 7B below.

TABLE 7A

7th Embodiment
f = 13.52 mm, Fno = 2.50, HFOV = 15.4 deg.

| Surface # | | Curvature Radius | | Thickness | Material | Index | Abbe # | Refractive Power | Refractive/ Reflective |
|---|---|---|---|---|---|---|---|---|---|
| 0 | Object | | Plano | Infinity | | | | | Refractive |
| 1 | Lens 1 | 5.5087 | Convex (ASP) | 1.094 | Plastic | 1.614 | 25.6 | Positive | Refractive |
| 2 | | 15.4069 | Concave (ASP) | 0.824 | | | | | Refractive |
| 3 | Ape. Stop | | Plano | −0.604 | | | | | Refractive |
| 4 | Lens 2 | 2.4875 | Convex (ASP) | 0.580 | Plastic | 1.660 | 20.4 | Negative | Refractive |

TABLE 7A-continued

7th Embodiment
f = 13.52 mm, Fno = 2.50, HFOV = 15.4 deg.

| Surface # | | Curvature Radius | | Thickness | Material | Index | Abbe # | Refractive Power | Refractive/ Reflective |
|---|---|---|---|---|---|---|---|---|---|
| 5 | | 1.4365 | Concave (ASP) | 0.512 | | | | | Refractive |
| 6 | Lens 3 | 4.6862 | Convex (ASP) | 0.969 | Glass | 1.804 | 46.6 | Positive | Refractive |
| 7 | | 37.8931 | Concave (ASP) | 0.424 | | | | | Refractive |
| 8 | Prism | | Plano | 2.100 | Glass | 1.773 | 49.6 | | Refractive |
| 9 | | | Plano | −4.200 | | | | | Reflective |
| 10 | | | Plano | 4.200 | | | | | Reflective |
| 11 | | | Plano | −2.100 | | | | | Reflective |
| 12 | | | Plano | −2.098 | | | | | Refractive |
| 13 | Filter | | Plano | −0.210 | Glass | 1.517 | 64.2 | — | Refractive |
| 14 | | | Plano | −0.702 | | | | | Refractive |
| 15 | Image | | Plano | — | | | | | Refractive |

Note:
Reference wavelength is 587.6 nm (d-line).
The first reflective surface RF1 (Surface 9) redirects the optical path along the first optical axis OA1 counterclockwise to the second optical axis OA2 by 60°.
The second reflective surface RF2 (Surface 10) redirects the optical path along the second optical axis OA2 clockwise to the third optical axis OA3 by 120°.
The third reflective surface RF3 (Surface 11) redirects the optical path along the third optical axis OA3 counterclockwise to the fourth optical axis OA4 by 60°.

TABLE 7B

Aspheric Coefficients

| Surface # | 1 | 2 | 4 | 5 |
|---|---|---|---|---|
| k = | 1.36560E+00 | 3.14279E+01 | −3.42417E+00 | −1.31527E+00 |
| A4 = | 5.534968E−03 | 2.021064E−02 | −7.955677E−03 | −4.324820E−02 |
| A6 = | −1.026561E−03 | −5.932088E−03 | −1.818846E−03 | 1.252400E−02 |
| A8 = | 2.489644E−04 | 2.570771E−03 | 2.673621E−03 | −2.034154E−03 |
| A10 = | −2.555438E−05 | −6.798617E−04 | −9.403400E−04 | 9.818489E−05 |
| A12 = | −1.849096E−06 | 9.986459E−05 | 1.652753E−04 | 2.752834E−05 |
| A14 = | 5.253310E−07 | −8.210528E−06 | −1.512209E−05 | −5.499785E−06 |
| A16 = | −3.037525E−08 | 2.726296E−07 | 5.507657E−07 | 3.182920E−07 |

| Surface # | 6 | 7 |
|---|---|---|
| k = | −2.47099E−01 | 9.90000E+01 |
| A4 = | 4.898792E−03 | 4.635273E−03 |
| A6 = | −7.026909E−05 | 2.527364E−04 |

In the 7th embodiment, the equation of the axisymmetric aspheric surface profiles of the aforementioned lens elements is the same as the equation of the 1 st embodiment. Also, the definitions of these parameters shown in Table 70 are the same as those stated in the 1 st embodiment with corresponding values for the 7th embodiment, so an explanation in this regard will not be provided again.

Moreover, these parameters can be calculated from Table 7A and Table 7B as the following values and satisfy the following conditions:

TABLE 7C

Schematic Parameters

| f [mm] | 13.52 |
|---|---|
| Fno | 2.50 |
| HFOV [deg.] | 15.4 |
| R1/R2 | 0.36 |
| (R3 − R4)/(R3 + R4) | 0.27 |
| f1 [mm] | 13.40 |
| f2 [mm] | −6.60 |
| f2/f1 | −0.49 |
| f/fG1 | 1.00 |
| f1/CT1 | 12.25 |
| TD/f | 0.25 |

TABLE 7C-continued

Schematic Parameters

| TL/f | 1.44 |
|---|---|
| f/Lz | 1.76 |
| Ly/Lz | 0.95 |
| Lz [mm] | 7.67 |
| TL/Y11 | 6.84 |
| ET2/CT2 | 1.93 |
| Y11/ImgH | 0.77 |
| (SAG11 + SAG22)/ET12 | 11.17 |
| (LOA2 + LOA3)/(LOA1 + LOA4) | 0.76 |
| Np | 1.773 |
| θa [deg.] | 60.0 |

8th Embodiment

Figure 15:
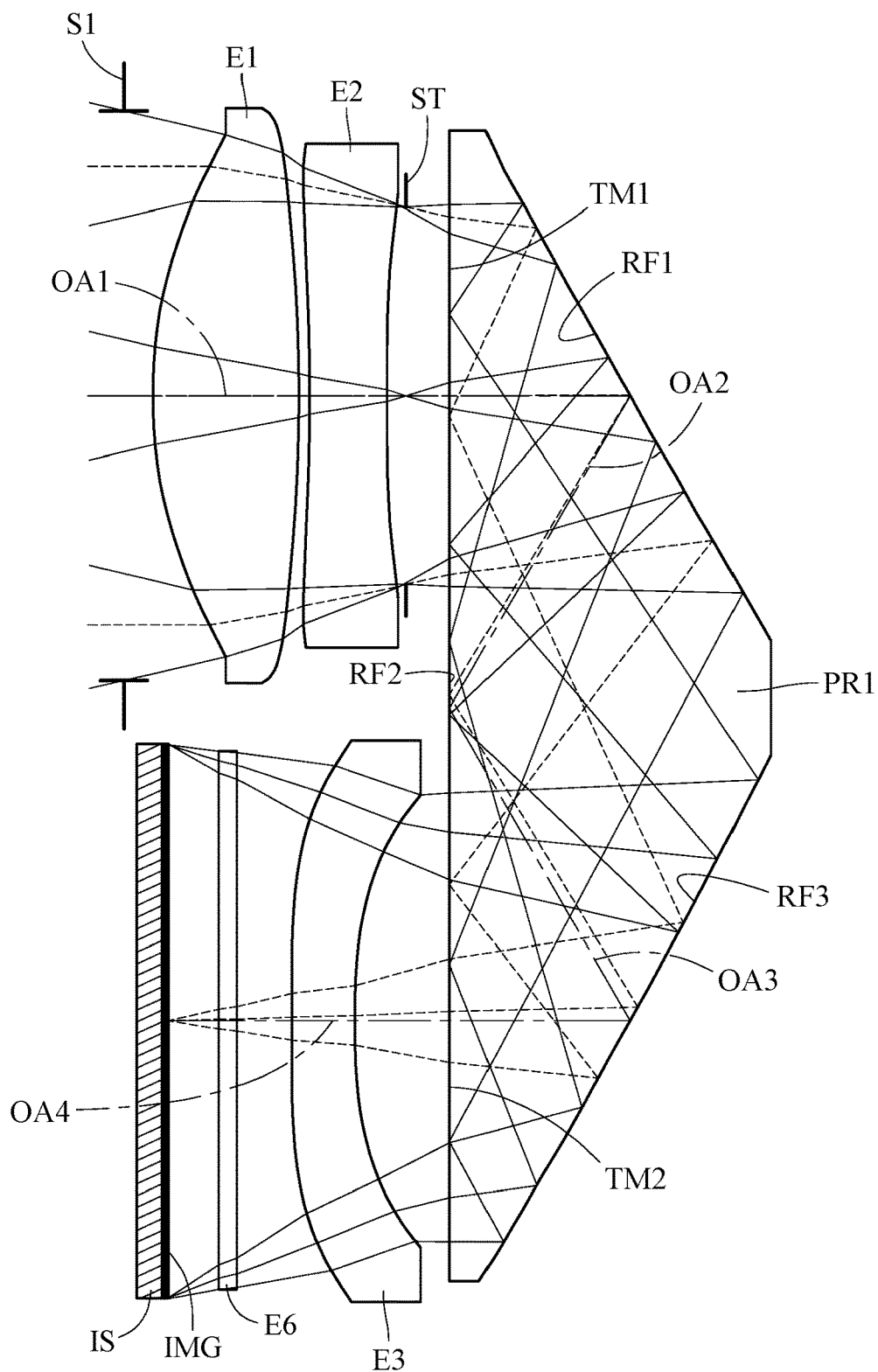
FIG. 15 is a schematic view of an image capturing unit according to the 8th embodiment of the present disclosure.
Figure 16:
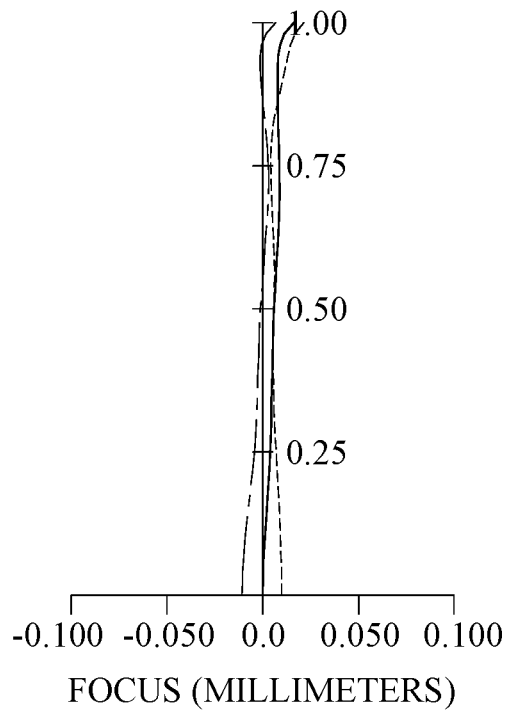
FIG. 16 shows spherical aberration curves and astigmatic field curves of the image capturing unit according to the 8th embodiment.
Figure 16:
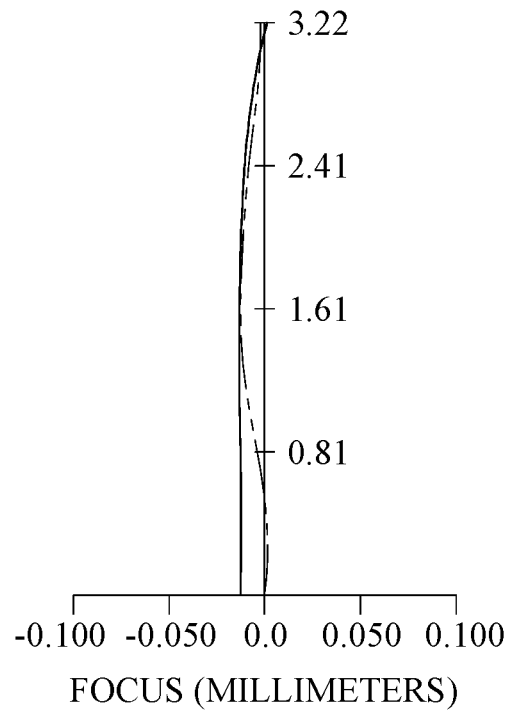

FIG. 15 is a schematic view of an image capturing unit according to the 8th embodiment of the present disclosure. FIG. 16 shows, in order from left to right, spherical aberration curves and astigmatic field curves of the image capturing unit according to the 8th embodiment. In FIG. 15, the image capturing unit 8 includes the folded optical system (its reference numeral is omitted) of the present disclosure and an image sensor IS. The folded optical system includes, in order from a light incident side to a light emitting side along a travelling direction of light on an optical path, a stop S1, a first lens element E1, a second lens element E2, an aperture stop ST, an optical folding assembly (its reference numeral is omitted), a third lens element E3, a filter E6 and an image surface IMG. Moreover, the said optical folding assembly includes a prism PR1 made of glass material. The prism PR1 has a first transmissive surface TM1, a first reflective surface RF1, a second reflective surface RF2, a third reflective surface RF3 and a second transmissive surface TM2 sequentially along the travelling direction of light on the optical path.

The optical path reaches the first reflective surface RF1 via the first transmissive surface TM1 along a first optical axis OA1, the optical path along the first optical axis OA1 is redirected to a second optical axis OA2 by the first reflective surface RF1, the optical path along the second optical axis OA2 is redirected to a third optical axis OA3 by the second reflective surface RF2, the optical path along the third optical axis OA3 is redirected to a fourth optical axis OA4 by the third reflective surface RF3, and the optical path reaches the image surface IMG via the second transmissive surface TM2 along the fourth optical axis OA4.

The first transmissive surface TM1, the second reflective surface RF2 and the second transmissive surface TM2 are substantially the same plane. The first optical axis OA1 is substantially parallel to a normal direction of the said plane where the first transmissive surface TM1, the second reflective surface RF2 and the second transmissive surface TM2 are located. The first optical axis OA1 is also substantially parallel to a normal direction of the image surface IMG. The folded optical system includes three lens elements (E1, E2 and E3) with no additional lens element disposed between each of the adjacent three lens elements. Further, the first lens element E1 and the second lens element E2 are located on the first optical axis OA1, and the third lens element E3 is located on the fourth optical axis OA4.

The first lens element E1 with positive refractive power has a light incident surface being convex in a paraxial region thereof and a light emitting surface being convex in a paraxial region thereof. The first lens element E1 is made of plastic material and has the light incident surface and the light emitting surface being both aspheric.

The second lens element E2 with negative refractive power has a light incident surface being concave in a paraxial region thereof and a light emitting surface being concave in a paraxial region thereof. The second lens element E2 is made of plastic material and has the light incident surface and the light emitting surface being both aspheric.

The third lens element E3 with negative refractive power has a light incident surface being concave in a paraxial region thereof and a light emitting surface being concave in a paraxial region thereof. The third lens element E3 is made of glass material and has the light incident surface and the light emitting surface being both aspheric.

Among the three lens elements (E1, E2 and E3), the second lens element E2 and the third lens element E3 each have a refractive index larger than 1.63.

The filter E6 is made of glass material and located between the third lens element E3 and the image surface IMG, and will not affect the focal length of the folded optical system. The image sensor IS is disposed on or near the image surface IMG of the folded optical system.

The detailed optical data of the 8th embodiment are shown in Table 8A and the aspheric surface data are shown in Table 8B3 below.

TABLE 8A

8th Embodiment
f = 13.76 mm, Fno = 2.58, HFOV = 13.2 deg.

| Surface # | | Curvature Radius | | Thickness | Material | Index | Abbe # | Refractive Power | Refractive/ Reflective |
|---|---|---|---|---|---|---|---|---|---|
| 0 | Object | Plano | | Infinity | | | | | Refractive |
| 1 | Stop | Plano | | 0.337 | | | | | Refractive |
| 2 | Lens 1 | 5.6949 | Convex (ASP) | 1.700 | Plastic | 1.544 | 56.0 | Positive | Refractive |
| 3 | | −20.4839 | Convex (ASP) | 0.120 | | | | | Refractive |
| 4 | Lens 2 | −26.3856 | Concave (ASP) | 0.900 | Plastic | 1.639 | 23.5 | Negative | Refractive |
| 5 | | 37.9878 | Concave (ASP) | 0.218 | | | | | Refractive |
| 6 | Ape. Stop | Plano | | 0.509 | | | | | Refractive |
| 7 | Prism | Plano | | 2.100 | Glass | 1.773 | 49.6 | | Refractive |
| 8 | | 190.0213 | (Q2D) | −4.200 | | | | | Reflective |
| 9 | | Plano | | 4.200 | | | | | Reflective |
| 10 | | −77.8854 | (Q2D) | −2.100 | | | | | Reflective |
| 11 | | Plano | | −1.100 | | | | | Refractive |
| 12 | Lens 3 | 9.5412 | Concave (ASP) | −0.729 | Glass | 1.923 | 18.9 | Negative | Refractive |
| 13 | | −166.7023 | Concave (ASP) | −0.636 | | | | | Refractive |
| 14 | Filter | Plano | | −0.210 | Glass | 1.517 | 64.2 | — | Refractive |
| 15 | | Plano | | −0.595 | | | | | Refractive |
| 16 | Image | Plano | | — | | | | | Refractive |

Note:
Reference wavelength is 587.6 nm (d-line).
An effective radius of the stop S1 (Surface 1) is 3.313 mm.
The first reflective surface RF1 (Surface 8) redirects the optical path along the first optical axis OA1 counterclockwise to the second optical axis OA2 by 60°.
The second reflective surface RF2 (Surface 9) redirects the optical path along the second optical axis OA2 clockwise to the third optical axis OA3 by 120°.
The third reflective surface RF3 (Surface 10) redirects the optical path along the third optical axis OA3 counterclockwise to the fourth optical axis OA4 by 60°.

TABLE 8B

| | Aspheric Coefficients | | | |
|---|---|---|---|---|
| Surface # | 2 | 3 | 4 | 5 |
| k = | −1.20019E−01 | −5.75386E+00 | −9.55890E+01 | 2.76482E+00 |
| A4 = | 1.342092E−04 | −4.699208E−03 | −4.833240E−03 | 5.345785E−04 |
| A6 = | 2.184403E−06 | 4.720875E−03 | 5.186606E−03 | 1.182779E−03 |
| A8 = | 3.190408E−05 | −2.184764E−03 | −2.522993E−03 | −6.519150E−04 |
| A10 = | −1.670216E−05 | 5.407980E−04 | 6.819916E−04 | 2.194522E−04 |
| A12 = | 3.194050E−06 | −7.223334E−05 | −1.022927E−04 | −4.183357E−05 |
| A14 = | −2.725931E−07 | 4.901887E−06 | 8.354733E−06 | 4.577391E−06 |
| A16 = | 8.276194E−09 | −1.330134E−07 | −3.411756E−07 | −2.791764E−07 |
| A18 = | — | — | 5.404709E−09 | 7.880482E−09 |

| Surface # | 12 | 13 |
|---|---|---|
| k = | −8.01903E+00 | −9.10720E+01 |
| A4 = | 1.033150E−02 | 8.383430E−03 |
| A6 = | −1.647143E−04 | −1.954016E−04 |

In the 8th embodiment, the equation of the axisymmetric aspheric surface profiles of the aforementioned lens elements is the same as the equation of the 1st embodiment.

Further, each of the first reflective surface RF1 and the third reflective surface RF3 of the optical folding assembly is a non-axisymmetric freeform surface (Q2D), and the equation of the non-axisymmetric Q2D freeform aspheric surface profiles thereof is expressed as follows:

$$\tilde{Z}(\tilde{X}, \tilde{Y}) = \tilde{Z}_{base}(\tilde{X}, \tilde{Y}) + \frac{\delta(\tilde{u}, \tilde{\theta})}{\sigma(\tilde{r})},$$

where, $\tilde{Z}(\tilde{X},\tilde{Y})$ is a total sag (in lens units) in the direction of the surface normal at a specified coordinate origin on the conic base surface, where the coordinate origin may be shifted from the vertex of the conic base surface in the Y-Z plane;

$\tilde{r}, \tilde{\theta}$ is the coordinates of a point on the surface in cylindrical coordinates, in the off-axis coordinate system;

$\tilde{X}, \tilde{Y}$ is the coordinates of a point on the surface in Cartesian coordinates in the off-axis coordinate system. For a given $\tilde{r}$, $\tilde{\theta}$, $\tilde{x}=\tilde{r}\cos\tilde{\theta}$; $\tilde{y}=\tilde{r}\sin\tilde{\theta}$; and $\tilde{u}$, as a variable that represents the radial distance from the center of the added aspheric departure, relative to the normalization radius, in the off-axis coordinate system. And, $$\tilde{u} = \frac{\sqrt{(\tilde{X}-\tilde{X}_0)^2 + (\tilde{Y}-\tilde{Y}_0)^2}}{r_{norm}},$$

where, $r_{norm}$ is the normalization radius; and $\tilde{X}_0, \tilde{Y}_0$ is the offset value of $\tilde{X}, \tilde{Y}$ (x- and y-offset terms);

$$\tilde{Z}_{base}(\tilde{X}, \tilde{Y}) = \frac{\sqrt{k_1}(\tilde{X}^2 + k_1\tilde{Y}^2)/R}{1 - k_2\tilde{Y} + \sqrt{1 - 2k_2\tilde{Y} - k_1/R^2\left[(1+k\cdot\cos^2\omega)\tilde{X}^2 + (1+k)\tilde{Y}^2\right]}},$$

where, $\tilde{Z}_{base}(\tilde{X},\tilde{Y})$ is a sag (in lens units) of the conic base surface in the direction of the surface normal at the specified coordinate origin;

$k_1 = 1 + k\cdot\sin^2\omega$;

$k_2 = k/R\cdot\cos\omega\cdot\sin\omega\sqrt{k_1}$;

$\omega$ is the off-axis angle; for an off-axis point on the surface that defines the coordinate origin, it is the angle that the surface normal at the off-axis point makes with the axis of the conic;

R is the curvature radius;

k is the conic constant; and $\delta(\tilde{u},\tilde{\theta})/\sigma(\tilde{r})$ is an additive sag departure from the base conic surface, in the direction of the surface normal at the coordinate origin.

The freeform surface data of the first reflective surface RF1 and the third reflective surface RF3 are respectively shown in Table 8C and Table 8D below.

TABLE 8C

Q2D freeform surface aspheric coefficients
of the first reflective surface RF1 (Surface 8)
conic constant (k) = −9.90000E+01
off-axis angle (ω) = 0.00000E+00
offset value of $\tilde{X}$ = 0.00000E+00
offset value of $\tilde{Y}$ = 0.00000E+00

| max radial order | sin(t) | azimuth independent | cos(2t) |
|---|---|---|---|
| R**0 (Piston) | | | |
| R**1 (Tilt) | 2.409835E−02 | | |
| R**2 (Power) | | | 3.589048E−03 |
| R**3 | 8.741128E−04 | | |
| R**4 | | −1.160437E−03 | −9.373279E−05 |
| R**5 | −1.255020E−04 | | |
| R**6 | | 1.006216E−04 | −2.587756E−05 |
| R**7 | 6.983854E−05 | | |
| R**8 | | 1.921862E−06 | 3.243695E−05 |
| R**9 | −4.310972E−05 | | |
| R**10 | | −2.611853E−05 | −1.779565E−05 |
| R**11 | 1.754755E−05 | | |
| R**12 | | 4.448962E−06 | 6.024022E−06 |
| R**13 | −5.207257E−06 | | |
| R**14 | | 9.510314E−06 | |
| R**16 | | −5.734686E−06 | |

TABLE 8D

Q2D freeform surface aspheric coefficients
of the third reflective surface RF3 (Surface 10)
conic constant (k) = −8.22154E+01
off-axis angle (ω) = 0.00000E+00
offset value of $\tilde{X}$ = 0.00000E+00
offset value of $\tilde{Y}$ = 0.00000E+00

| max radial order | sin(t) | azimuth independent | cos(2t) |
|---|---|---|---|
| R**0 (Piston) | | | |
| R**1 (Tilt) | −5.745426E−02 | | |
| R**2 (Power) | | | −1.217817E−02 |
| R**3 | −6.862479E−03 | | |
| R**4 | | 1.185929E−02 | 3.072810E−04 |
| R**5 | 2.293637E−03 | | |
| R**6 | | −1.928593E−03 | 2.829795E−04 |
| R**7 | −9.740233E−04 | | |
| R**8 | | 4.383554E−04 | −2.814260E−04 |
| R**9 | 4.215150E−04 | | |
| R**10 | | −5.103496E−05 | 1.546457E−04 |
| R**11 | −1.330012E−04 | | |
| R**12 | | −4.550955E−05 | −1.425205E−05 |
| R**13 | 1.549464E−05 | | |
| R**14 | | 4.519074E−05 | |
| R**16 | | −2.737356E−05 | |

Also, the definitions of these parameters shown in Table 8E are the same as those stated in the 1st embodiment with corresponding values for the 8th embodiment, so an explanation in this regard will not be provided again.

Moreover, these parameters can be calculated from Table 8A through Table 8D as the following values and satisfy the following conditions:

TABLE 8E

| Schematic Parameters | |
|---|---|
| f [mm] | 13.76 |
| Fno | 2.58 |
| HFOV [deg.] | 13.2 |
| R1/R2 | −0.28 |
| (R3 − R4)/(R3 + R4) | −5.55 |
| f1 [mm] | 8.38 |
| f2 [mm] | −24.25 |
| f2/f1 | −2.89 |
| f/fG1 | 1.16 |
| f1/CT1 | 4.93 |
| TD/f | 1.30 |
| TL/f | 1.40 |
| f/Lz | 1.87 |
| Ly/Lz | 0.99 |
| Lz [mm] | 7.38 |
| TL/Y11 | 6.36 |
| ET2/CT2 | 1.20 |
| Y11/ImgH | 0.94 |
| (SAG11 + SAG22)/ET12 | 3.97 |
| (LOA2 + LOA3)/(LOA1 + LOA4) | 0.77 |
| Np | 1.773 |
| θa [deg.] | 60.0 |

9th Embodiment

Figure 17:
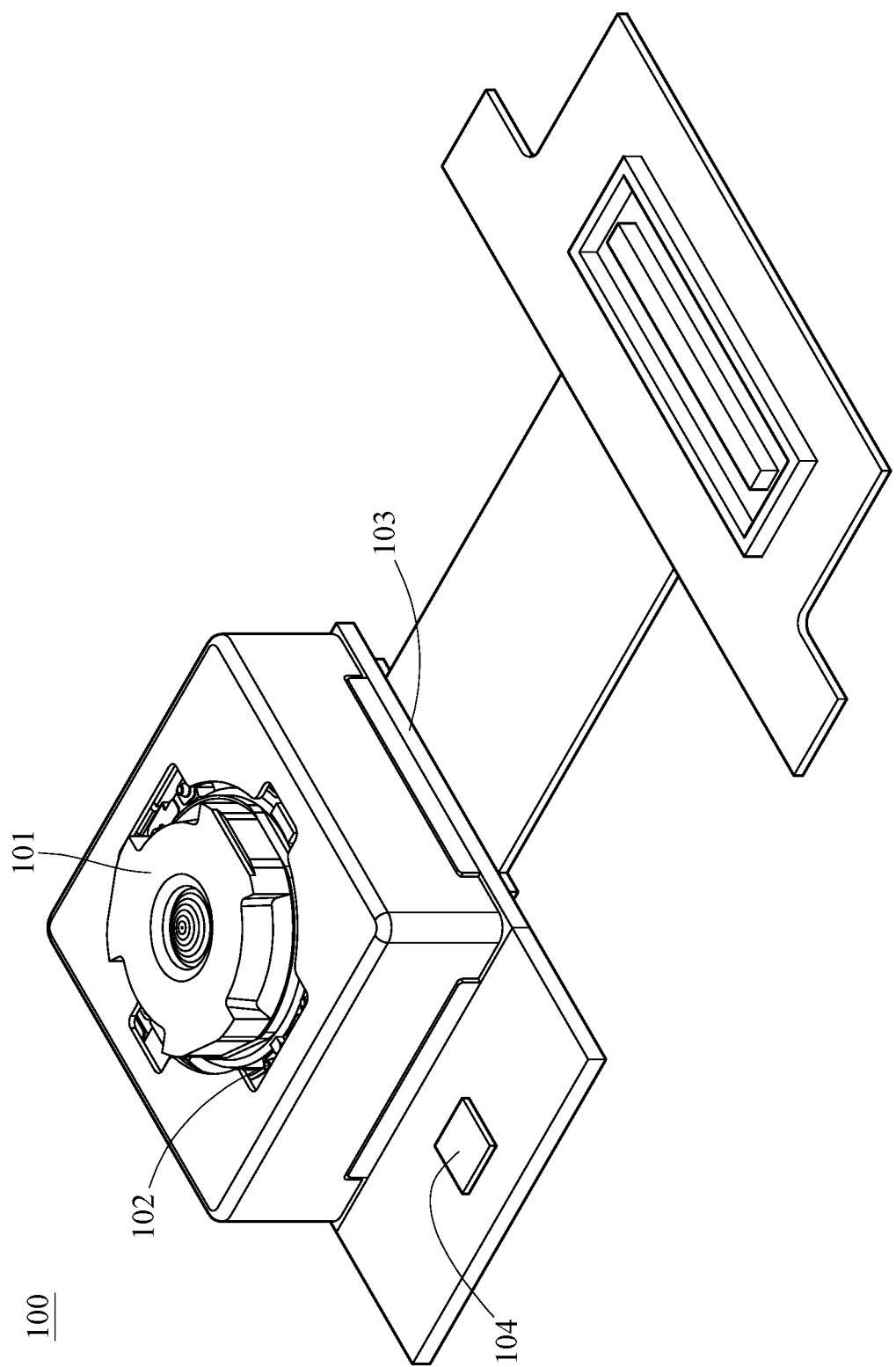
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the folded optical system disclosed in the 1st embodiment, a barrel and a holder member (their reference numerals are omitted) for holding the folded optical system. However, the lens unit 101 may alternatively be provided with the folded optical system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the folded optical system to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of each lens element or the optical folding assembly in the folded optical system to reduce blurring associated with motion during exposure. In some cases, the compensation can be provided by electronic image stabilization (EIS) with image processing software, thereby improving image quality while in motion or low-light conditions. Preferably, when the optical folding assembly includes two or more prisms, the image stabilizer 104 can be used for controlling the position of the prism which has the third reflective surface so as to achieve image optimization.

10th Embodiment

Figure 18:
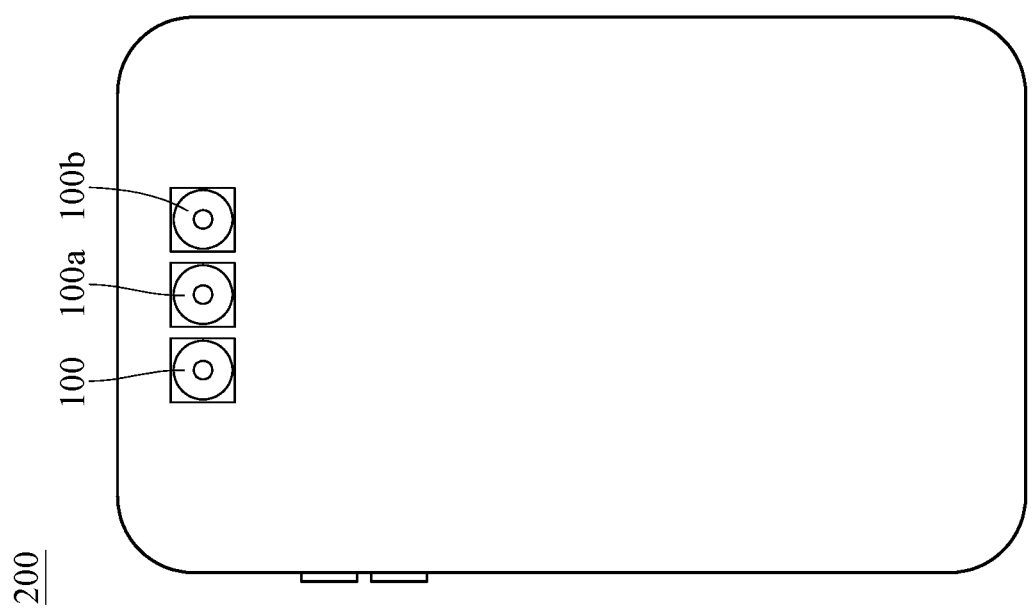
FIG. 18 is one perspective view of an electronic device according to the 10th embodiment of the present disclosure.
Figure 19:
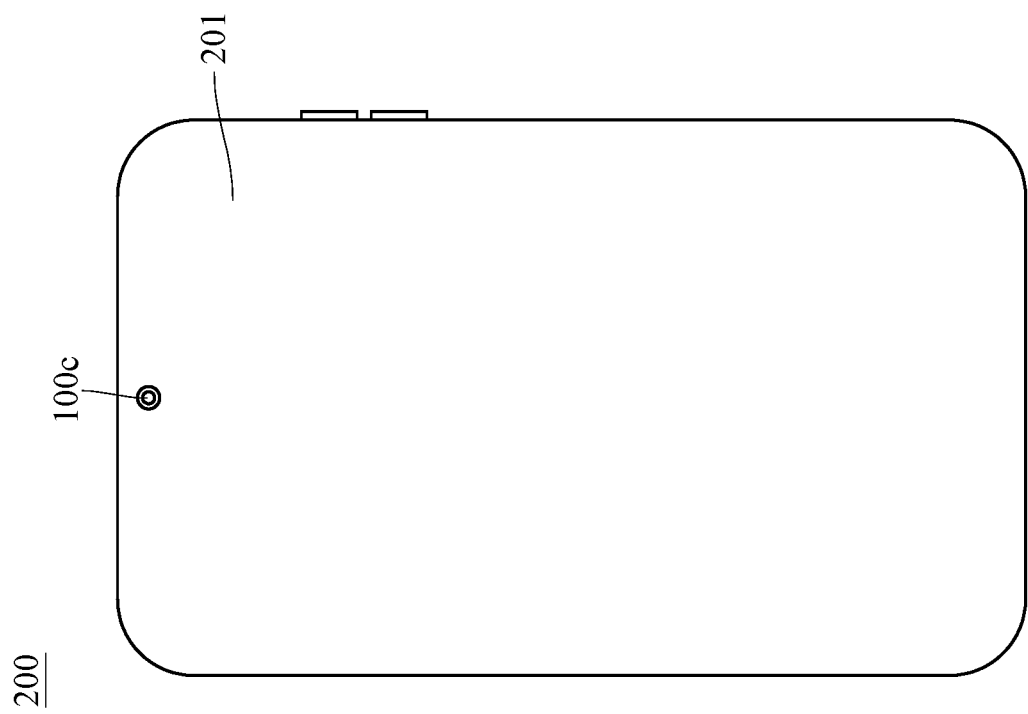
FIG. 19 is another perspective view of the electronic device in FIG. 18.
Figure 20:
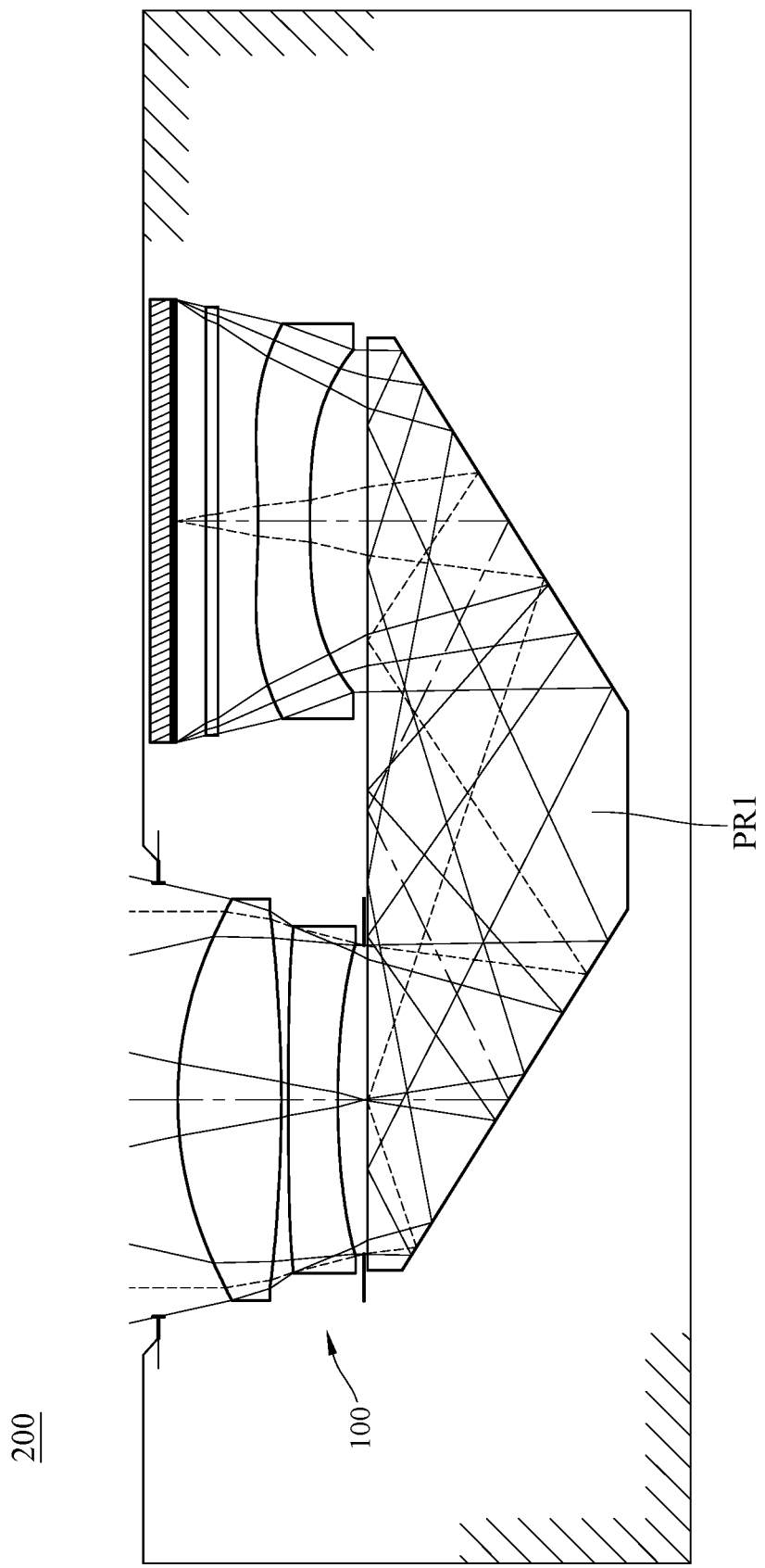
FIG. 20 is a cross-sectional view of the electronic device in FIG. 18.

FIG. 18 is one perspective view of an electronic device according to the 10th embodiment of the present disclosure. FIG. 19 is another perspective view of the electronic device in FIG. 18. FIG. 20 is a cross-sectional view of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c and a display unit 201. As shown in FIG. 18, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 19, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. In FIG. 20, the image capturing unit 100 with the optical folding assembly which includes the prism PR1 is exemplarily shown. The optical folding assembly, as an optical path folding element, is able to make the folded optical system to be more flexible in space arrangement, and therefore the dimensions of the electronic device 200 is not restricted by the optical total track length of the folded optical system. Furthermore, each of the image capturing units 100a, 100b and 100c can include the folded optical system of the present disclosure and can have a configuration similar to that of the image capturing unit 100. In detail, each of the image capturing units 100a, 100b and 100c can include a lens unit, a driving device, an image sensor, an image stabilizer and an optical folding assembly as an optical path folding element, and each of the lens unit can include a folded optical system such as the folded optical system of the present disclosure, a barrel and a holder member for holding the folded optical system.

The image capturing unit 100 is a telephoto image capturing unit, the image capturing unit 100a is a wide-angle image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, the edge of the lens barrel or the lens element in the folded optical system of the image capturing unit 100, 100a, 100b or 100c can be cut so as to enhance the feature of compact size in one dimension thereof, such that the overall size can be reduced and the module miniaturization is further easier to be performed. In this embodiment, the electronic device 200 includes multiple image capturing units 100, 100a, 100b and 100c, but the present disclosure is not limited to the number and arrangement of image capturing units.

11th Embodiment

Figure 21:
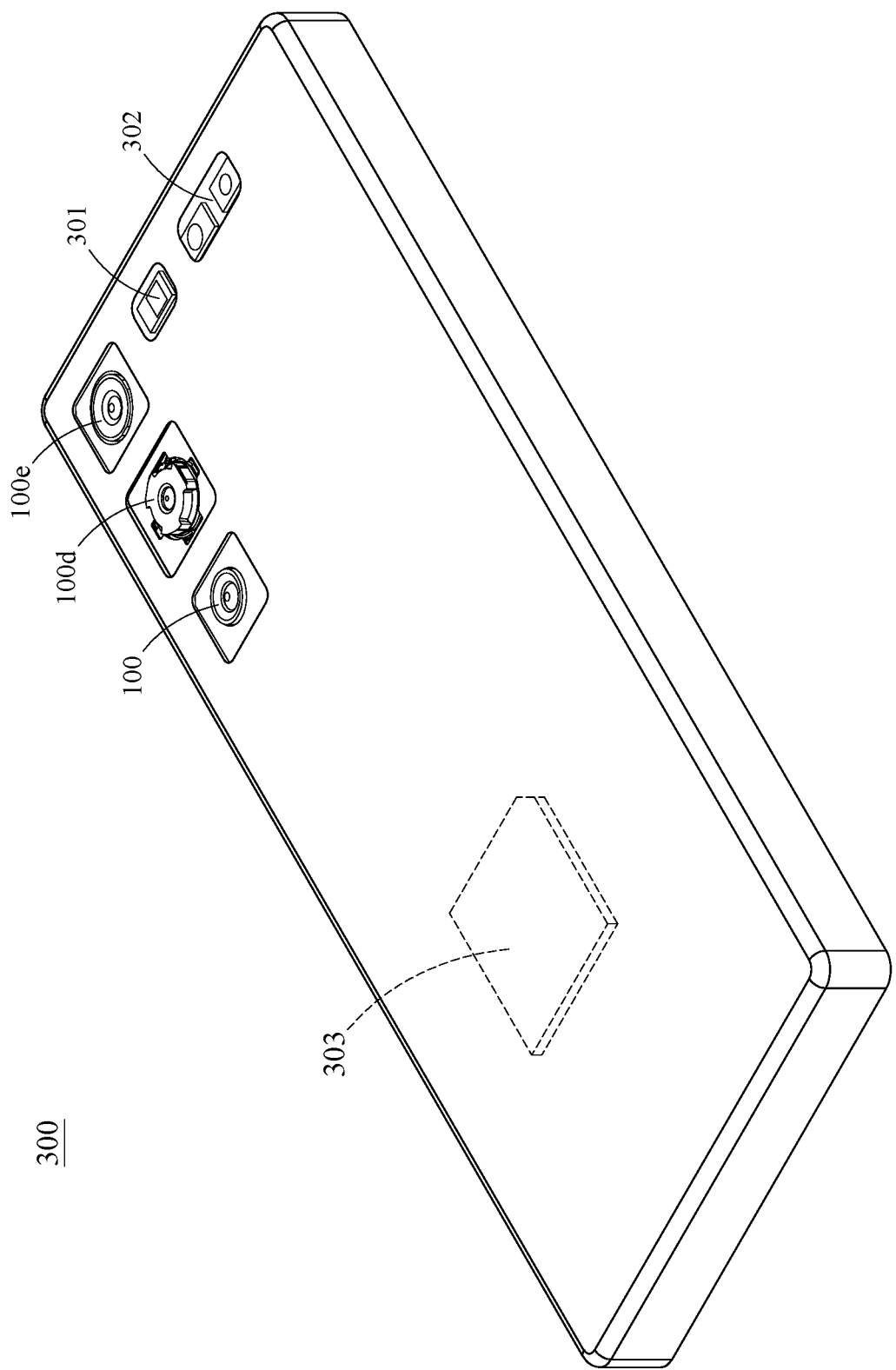
FIG. 21 is one perspective view of an electronic device according to the 11th embodiment of the present disclosure.
Figure 22:
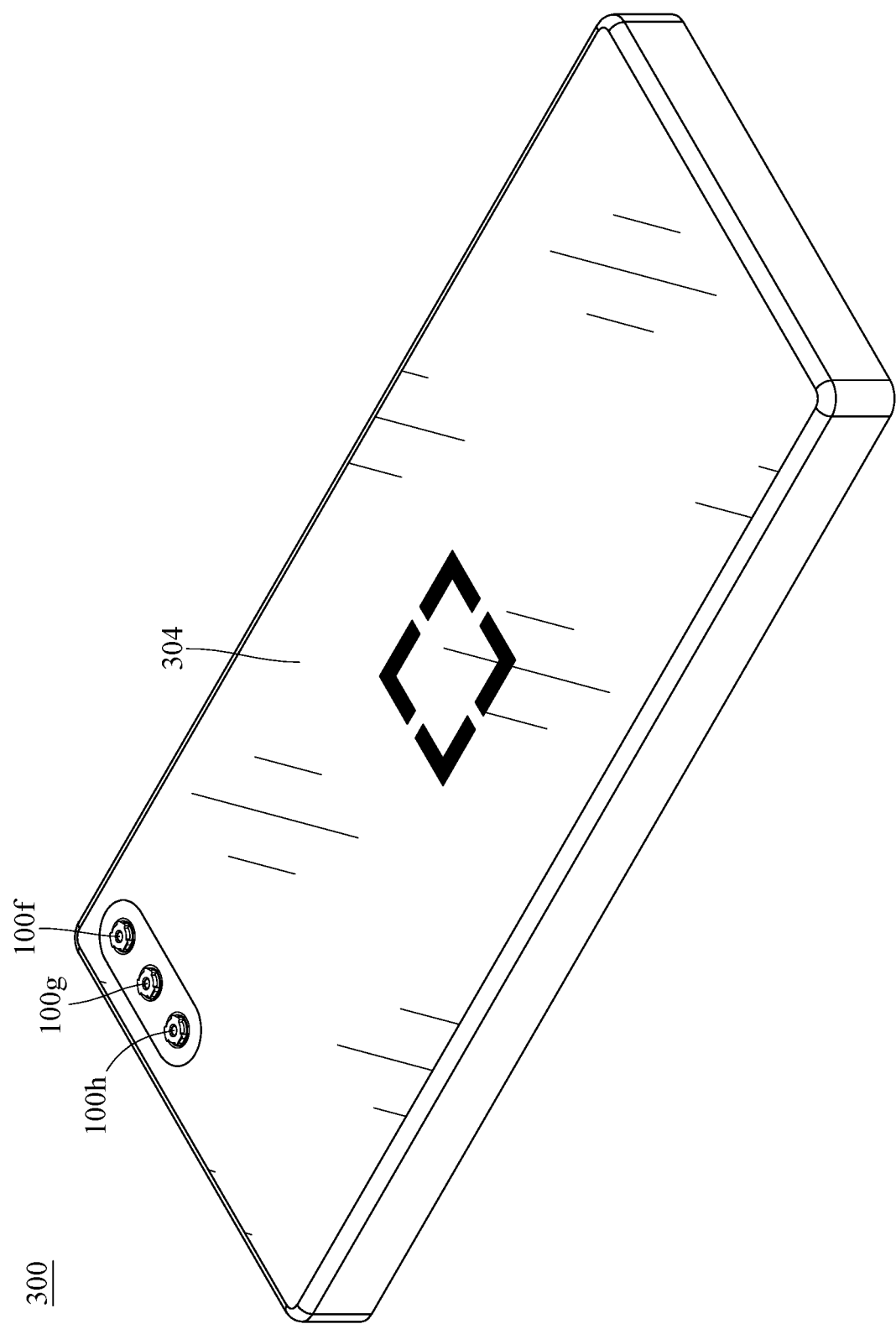
FIG. 22 is another perspective view of the electronic device in FIG. 21.
Figure 23:
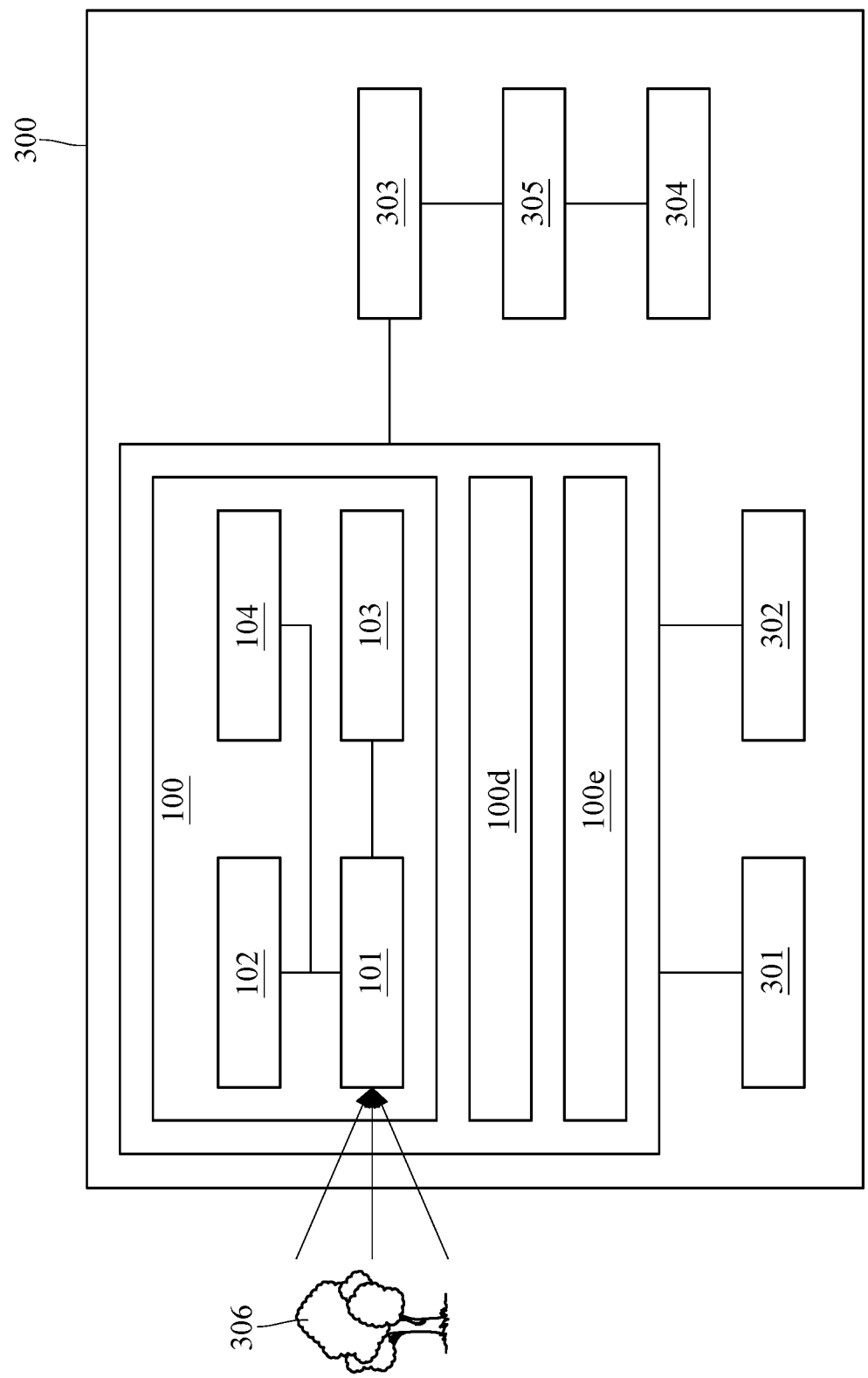
FIG. 23 is a block diagram of the electronic device in FIG. 21.

FIG. 21 is one perspective view of an electronic device according to the 11th embodiment of the present disclosure. FIG. 22 is another perspective view of the electronic device in FIG. 21. FIG. 23 is a block diagram of the electronic device in FIG. 21.

In this embodiment, an electronic device 300 is a smartphone including the image capturing unit 100 disclosed in the 9th embodiment, an image capturing unit 100d, an image capturing unit 100e, an image capturing unit 100f, an image capturing unit 100g, an image capturing unit 100h, a flash module 301, a focus assist module 302, an image signal processor 303, a display module 304 and an image software processor 305. The image capturing unit 100, the image capturing unit 100d and the image capturing unit 100e are disposed on the same side of the electronic device 300. The focus assist module 302 can be a laser rangefinder or a ToF (time of flight) module, but the present disclosure is not limited thereto. The image capturing unit 100f, the image capturing unit 100g, the image capturing unit 100h and the display module 304 are disposed on the opposite side of the electronic device 300, and the display module 304 can be a user interface, such that the image capturing units 100f, 100g, 100h can be front-facing cameras of the electronic device 300 for taking selfies, but the present disclosure is not limited thereto. Furthermore, each of the image capturing units 100d, 100e, 100f, 100g and 100h can include the folded optical system of the present disclosure and can have a configuration similar to that of the image capturing unit 100. In detail, each of the image capturing units 100d, 100e, 100f, 100g and 100h can include a lens unit, a driving device, an image sensor, an image stabilizer and an optical folding assembly as an optical path folding element, and each of the lens unit can include a folded optical system such as the folded optical system of the present disclosure, a barrel and a holder member for holding the folded optical system.

The image capturing unit 100 is a telephoto image capturing unit with the optical folding assembly, the image capturing unit 100d is a wide-angle image capturing unit, the image capturing unit 100e is an ultra-wide-angle image capturing unit, the image capturing unit 100f is a wide-angle image capturing unit, the image capturing unit 100g is an ultra-wide-angle image capturing unit, and the image capturing unit 100h is a ToF image capturing unit. In this embodiment, the image capturing units 100, 100d and 100e have different fields of view, such that the electronic device 300 can have various magnification ratios so as to meet the requirement of optical zoom functionality. In addition, the image capturing unit 100h can determine depth information of the imaged object. In this embodiment, the electronic device 300 includes multiple image capturing units 100, 100d, 100e, 100f, 100g and 100h, but the present disclosure is not limited to the number and arrangement of image capturing units.

When a user captures images of an object 306, the light rays converge in the image capturing unit 100, the image capturing unit 100d or the image capturing unit 100e to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100f, 100g or 100h to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

12th Embodiment

Figure 24:
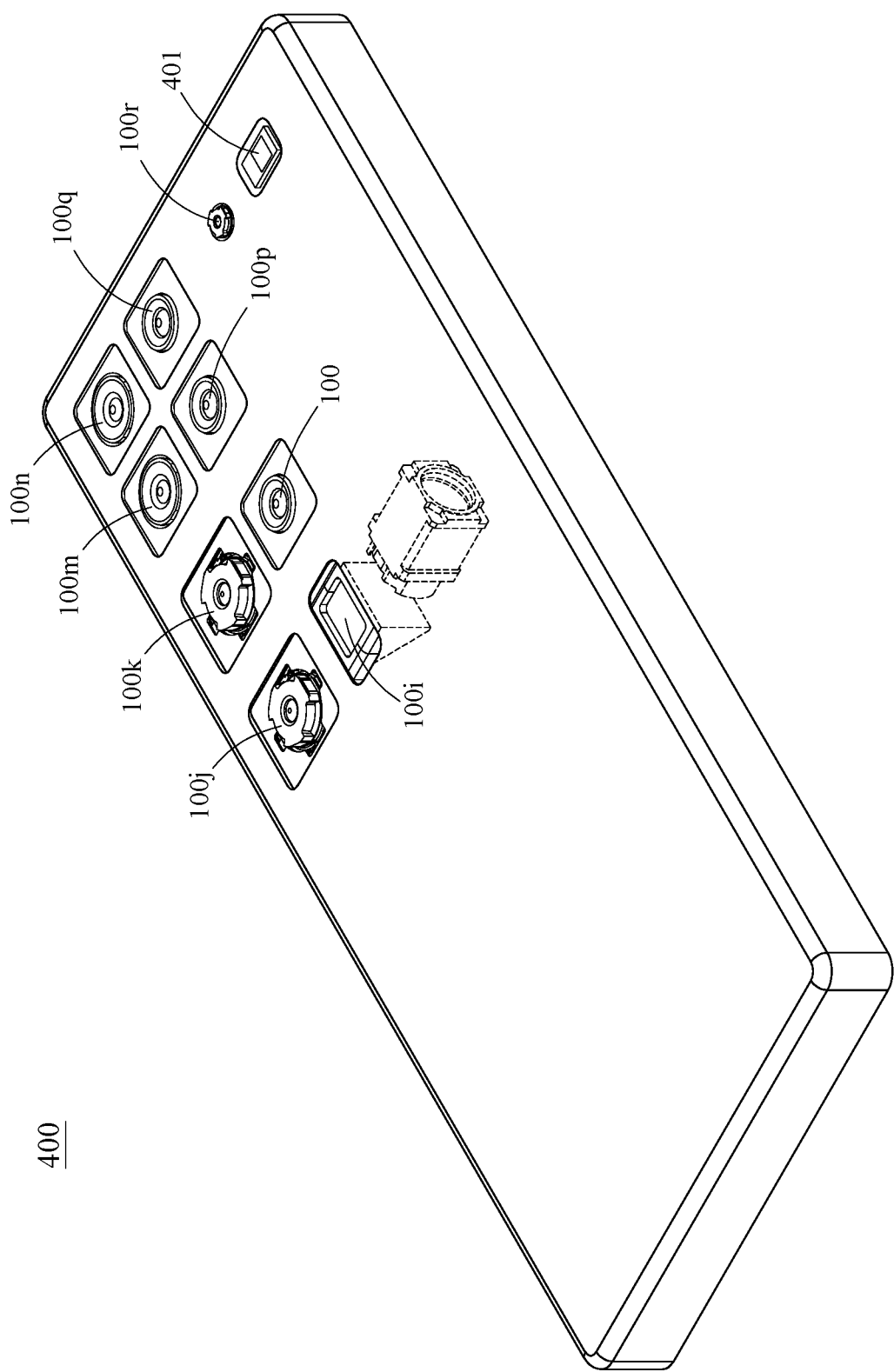
FIG. 24 is one perspective view of an electronic device according to the 12th embodiment of the present disclosure.

FIG. 24 is one perspective view of an electronic device according to the 12th embodiment of the present disclosure.

In this embodiment, an electronic device 400 is a smartphone including the image capturing unit 100 disclosed in the 9th embodiment, an image capturing unit 100i, an image capturing unit 100j, an image capturing unit 100k, an image capturing unit 100m, an image capturing unit 100n, an image capturing unit 100p, an image capturing unit 100q, an image capturing unit 100r, a flash module 401, a focus assist module, an image signal processor, a display module and an image software processor (not shown). The image capturing units 100, 100i, 100j, 100k, 100m, 100n, 100p, 100q and 100r are disposed on the same side of the electronic device 400, while the display module is disposed on the opposite side of the electronic device 400. Furthermore, each of the image capturing units 100i, 100j, 100k, 100m, 100n, 100p, 100q and 100r can include the folded optical system of the present disclosure and can have a configuration similar to that of the image capturing unit 100, and the details in this regard will not be provided again.

The image capturing unit 100 is a telephoto image capturing unit with an optical folding assembly, the image capturing unit 100i is a telephoto image capturing unit with an optical folding assembly, the image capturing unit 100j is a wide-angle image capturing unit, the image capturing unit 100k is a wide-angle image capturing unit, the image capturing unit 100m is an ultra-wide-angle image capturing unit, the image capturing unit 100n is an ultra-wide-angle image capturing unit, the image capturing unit 100p is a telephoto image capturing unit, the image capturing unit 100q is a telephoto image capturing unit, and the image capturing unit 100r is a ToF image capturing unit. In this embodiment, the image capturing units 100, 100i, 100j, 100k, 100m, 100n, 100p and 100q have different fields of view, such that the electronic device 400 can have various magnification ratios so as to meet the requirement of optical zoom functionality. Moreover, the optical folding assembly configuration of the image capturing unit 100 can be similar to, for example, the structure shown in FIG. 20, which can be referred to foregoing descriptions corresponding to FIG. 20, and the details in this regard will not be provided again. In addition, the image capturing unit 100r can determine depth information of the imaged object. In this embodiment, the electronic device 400 includes multiple image capturing units 100, 100i, 100j, 100k, 100m, 100n, 100p, 100q and 100r, but the present disclosure is not limited to the number and arrangement of image capturing units. When a user captures images of an object, the light rays converge in the image capturing unit 100, 100i, 100j, 100k, 100m, 100n, 100p, 100q or 100r to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the folded optical system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-8E show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A folded optical system comprising:
an optical folding assembly, having a first transmissive surface, a first reflective surface, a second reflective surface, a third reflective surface and a second transmissive surface sequentially along a travelling direction of light on an optical path, wherein the first transmissive surface and the second reflective surface are substantially a same interface; the optical path reaches the first reflective surface via the first transmissive surface along a first optical axis, the optical path along the first optical axis is redirected to a second optical axis by the first reflective surface, the optical path along the second optical axis is redirected to a third optical axis by the second reflective surface, the optical path along the third optical axis is redirected to a fourth optical axis by the third reflective surface, and the optical path reaches an image surface via the second transmissive surface along the fourth optical axis; and
a plurality of lens elements, each having a light incident surface and a light emitting surface sequentially along the travelling direction of light on the optical path, wherein the plurality of lens elements at least comprise a first lens element, the first lens element is located on the first optical axis, the first lens element has positive refractive power, and the light incident surface of the first lens element is convex in a paraxial region thereof;
wherein a distance perpendicular to the first optical axis between an axial vertex of the light incident surface of the first lens element on the first optical axis and an intersection point of the image surface and the fourth optical axis is Ly, a maximum displacement of the optical path parallel to the first optical axis from a surface through which the optical path extends into the folded optical system to the image surface is Lz, an f-number of the folded optical system is Fno, and the following conditions are satisfied:

$0.70 < Ly/Lz < 1.30$; and $2.00 < Fno < 4.00$.

2. The folded optical system of claim 1, wherein the first optical axis is substantially parallel to a normal direction of the image surface, and each of the plurality of lens elements is located on the first optical axis or the fourth optical axis.

3. The folded optical system of claim 1, wherein a curvature radius of the light incident surface of the first lens element is R1, a curvature radius of the light emitting surface of the first lens element is R2, and the following condition is satisfied:

$-1.50 < R1/R2 < 0.90$.

4. The folded optical system of claim 1, wherein the plurality of lens elements comprise the first lens element and a second lens element sequentially along the travelling direction of light on the optical path, the second lens element is located on the first optical axis, a focal length of the first lens element is f1, a focal length of the second lens element is f2, and the following condition is satisfied:

$-5.00 < f2/f1 < -0.03$.

5. The folded optical system of claim 4, wherein a distance parallel to the first optical axis between a maximum effective radius position of the light incident surface of the second lens element and a maximum effective radius position of the light emitting surface of the second lens element is ET2, a central thickness of the second lens element on the first optical axis is CT2, and the following condition is satisfied:

$0.95 < ET2/CT2 < 3.50$.

6. The folded optical system of claim 1, wherein an axial distance along the first optical axis, the second optical axis, the third optical axis and the fourth optical axis between the light incident surface of the first lens element and the image surface is TL, a distance perpendicular to the first optical axis between a maximum effective radius position of the light incident surface of the first lens element and the first optical axis is Y11, and the following condition is satisfied:

$3.80 < TL/Y11 < 15.00$.

7. The folded optical system of claim 1, wherein half of a maximum field of view of the folded optical system is HFOV, and the following condition is satisfied:

2.00 [deg.]<HFOV<18.00 [deg.].

8. The folded optical system of claim 1, wherein the plurality of lens elements further comprise a last lens element located closest to the image surface than one or more remaining lens elements of the plurality of lens elements, an axial distance along at least one of the first optical axis, the second optical axis, the third optical axis and the fourth optical axis between the light incident surface of the first lens element and the light emitting surface of the last lens element is TD, a focal length of the folded optical system is f, and the following condition is satisfied:

0.60<TD/f<1.80.

9. The folded optical system of claim 1, wherein the maximum displacement of the optical path parallel to the first optical axis from the surface through which the optical path extends into the folded optical system to the image surface is Lz, and the following condition is satisfied:

5.00 [mm]<Lz<11.00 [mm].

10. The folded optical system of claim 1, wherein the optical folding assembly at least comprises a prism having the second reflective surface, a refractive index of the prism is Np, and the following condition is satisfied:

1.53<Np<1.95.

11. The folded optical system of claim 1, wherein an angle between the first optical axis and the second optical axis is θa, and the following condition is satisfied:

40.0 [deg.]<θa<76.0 [deg.].

12. The folded optical system of claim 1, wherein the optical folding assembly at least comprises a prism, the first transmissive surface, the second reflective surface and the second transmissive surface are substantially a same plane, and a normal direction of the same plane is substantially parallel to the first optical axis.

13. An image capturing unit, comprising:
the folded optical system of claim 1; and
an image sensor disposed on the image surface of the folded optical system.

14. An electronic device, comprising:
the image capturing unit of claim 13.

15. A folded optical system comprising:
an optical folding assembly, having a first transmissive surface, a first reflective surface, a second reflective surface, a third reflective surface and a second transmissive surface sequentially along a travelling direction of light on an optical path, wherein the first transmissive surface and the second reflective surface are substantially a same interface; the optical path reaches the first reflective surface via the first transmissive surface along a first optical axis, the optical path along the first optical axis is redirected to a second optical axis by the first reflective surface, the optical path along the second optical axis is redirected to a third optical axis by the second reflective surface, the optical path along the third optical axis is redirected to a fourth optical axis by the third reflective surface, the optical path reaches an image surface via the second transmissive surface along the fourth optical axis, and the first optical axis is substantially parallel to a normal direction of the image surface; and a plurality of lens elements, each having a light incident surface and a light emitting surface sequentially along the travelling direction of light on the optical path, wherein the plurality of lens elements at least comprise a first lens element and a second lens element sequentially along the travelling direction of light on the optical path, the first lens element and the second lens element are located on the first optical axis, the first lens element has positive refractive power, and the second lens element has negative refractive power;
wherein the plurality of lens elements further comprise a last lens element located closest to the image surface than one or more remaining lens elements of the plurality of lens elements;
wherein the optical folding assembly is located among the plurality of lens elements, or the optical folding assembly is located between the plurality of lens elements and the image surface along the travelling direction of light on the optical path;
wherein each of the plurality of lens elements is located on the first optical axis or the fourth optical axis;
wherein an axial distance along the first optical axis, the second optical axis, the third optical axis and the fourth optical axis between the light incident surface of the first lens element and the image surface is TL, an axial distance along at least one of the first optical axis, the second optical axis, the third optical axis and the fourth optical axis between the light incident surface of the first lens element and the light emitting surface of the last lens element is TD, a focal length of the folded optical system is f, and the following conditions are satisfied:

0.90<TL/f<2.00; and 0.60<TD/f<1.80.

16. The folded optical system of claim 15, wherein the light emitting surface of the second lens element is concave in a paraxial region thereof, a curvature radius of the light incident surface of the second lens element is R3, a curvature radius of the light emitting surface of the second lens element is R4, and the following condition is satisfied:

−0.05<(R3−R4)/(R3+R4)<3.00.

17. The folded optical system of claim 15, wherein the focal length of the folded optical system is f, a maximum displacement of the optical path parallel to the first optical axis from a surface through which the optical path extends into the folded optical system to the image surface is Lz, and the following condition is satisfied:

1.50<f/Lz<3.50.

18. The folded optical system of claim 15, wherein the focal length of the folded optical system is f, a composite focal length of one or more of the plurality of lens elements located on the first optical axis is fG1, and the following condition is satisfied:

0.50<f/fG1<2.00.

19. The folded optical system of claim 15, wherein an axial distance along the first optical axis between the light incident surface of the first lens element and the first reflective surface is LOA1, an axial distance along the second optical axis between the first reflective surface and the second reflective surface is LOA2, an axial distance along the third optical axis between the second reflective surface and the third reflective surface is LOA3, an axial distance along the fourth optical axis between the third reflective surface and the image surface is LOA4, and the following condition is satisfied:

$$0.55 < (LOA2+LOA3)/(LOA1+LOA4) < 1.00.$$

20. The folded optical system of claim 15, wherein a focal length of the first lens element is f1, a central thickness of the first lens element on the first optical axis is CT1, and the following condition is satisfied:

$$2.50 < f1/CT1 < 15.00.$$

21. The folded optical system of claim 15, wherein an f-number of the folded optical system is Fno, and the following condition is satisfied:

$$2.00 < Fno < 4.00.$$

22. The folded optical system of claim 15, wherein a distance perpendicular to the first optical axis between a maximum effective radius position of the light incident surface of the first lens element and the first optical axis is Y11, a maximum image height of the folded optical system is ImgH, and the following condition is satisfied:

$$0.40 < Y11/ImgH < 2.00.$$

23. The folded optical system of claim 15, wherein a displacement parallel to the first optical axis from an axial vertex to a maximum effective radius position on the light incident surface of the first lens element is SAG11, a displacement parallel to the first optical axis from an axial vertex to a maximum effective radius position on the light emitting surface of the second lens element is SAG22, a distance parallel to the first optical axis between a maximum effective radius position of the light emitting surface of the first lens element and a maximum effective radius position of the light incident surface of the second lens element is ET12, and the following condition is satisfied:

$$1.60 < (SAG11+SAG22)/ET12 < 13.00.$$

24. The folded optical system of claim 15, wherein at least one of the plurality of lens elements is made of plastic material, and the light incident surface and the light emitting surface of the at least one of the plurality of lens elements are both aspheric.

25. The folded optical system of claim 15, wherein at least one of the plurality of lens elements has a refractive power index larger than 1.63.

* * * * *